US011939159B2

(12) United States Patent
Deemter et al.

(10) Patent No.: US 11,939,159 B2
(45) Date of Patent: Mar. 26, 2024

(54) SYSTEM FOR DISPENSING INGREDIENTS

(71) Applicant: Little Caesar Enterprises, Inc., Detroit, MI (US)

(72) Inventors: Kent A. Deemter, Hudsonville, MI (US); R. William Kneifel, II, West Bloomfield, MI (US); Eric Brasseur, Detroit, MI (US); Edward Gleich, Detroit, MI (US); Anita Klopfenstein, Detroit, MI (US); David Scrivano, South Lyon, MI (US); Dana Tilley, Detroit, MI (US); Thomas Hennessy, Royal Oak, MI (US); Kyle M. Bey, Davison, MI (US); Evan Allen, Detroit, MI (US); Alex Szmatula, Detroit, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 289 days.

(21) Appl. No.: 17/410,914

(22) Filed: Aug. 24, 2021

(65) Prior Publication Data

US 2022/0063912 A1    Mar. 3, 2022

Related U.S. Application Data

(60) Provisional application No. 63/070,026, filed on Aug. 25, 2020.

(51) Int. Cl.
*B65G 1/08* (2006.01)
*A47J 47/01* (2006.01)
(Continued)

(52) U.S. Cl.
CPC ................ *B65G 1/08* (2013.01); *A47J 47/01* (2013.01); *A47J 47/08* (2013.01); *B65G 1/10* (2013.01); *B65G 54/02* (2013.01)

(58) Field of Classification Search
CPC .... A47B 71/00; A47J 47/01; F25D 2331/806; G07F 17/0071; A21C 9/04; A21C 9/083
See application file for complete search history.

(56) References Cited

U.S. PATENT DOCUMENTS 3,358,618 A * 12/1967 Vetta .................. A21C 9/04
                                                                 222/585
5,121,677 A *  6/1992 Le Claire ............. A21C 9/04
                                                                 118/18

(Continued)

OTHER PUBLICATIONS

Salad dispenser: https://www.chowbotics.com/our-solutions/.

(Continued)

*Primary Examiner* — Timothy P. Kelly
(74) *Attorney, Agent, or Firm* — Honigman LLP

(57) ABSTRACT

A system for dispensing ingredients includes a cabinet and a conveyor disposed beneath the cabinet. The conveyor includes a staging region and a dispensing region in communication with an interior of the cabinet through a dispenser opening. One or more containers are removably disposed within the cabinet, and each of the one or more containers has an outlet disposed above the dispenser opening and includes an ejector operable to dispense one of the ingredients through the outlet. One or more bins are removably received within the conveyor. The bins are operable to be moved by the conveyor between a first position in the staging region and a second position in the dispensing region. Within the dispensing region, the conveyor is configured to move the bins between dispensing positions beneath respective ones of the containers.

16 Claims, 38 Drawing Sheets

(51) Int. Cl.
*A47J 47/08* (2006.01)
*B65G 1/10* (2006.01)
*B65G 54/02* (2006.01)

(56) References Cited

U.S. PATENT DOCUMENTS

| | | | | |
|---|---|---|---|---|
| 6,062,438 | A * | 5/2000 | Ellis | A47F 1/035 |
| | | | | 222/413 |
| 6,672,246 | B2 * | 1/2004 | Pierre | A21C 9/04 |
| | | | | 118/16 |
| 8,425,959 | B2 * | 4/2013 | Westberg | A21C 9/04 |
| | | | | 426/496 |
| 10,239,742 | B2 * | 3/2019 | Dresser | B67D 1/1236 |
| 10,437,220 | B1 | 10/2019 | Ochs et al. | |
| 10,588,322 | B2 * | 3/2020 | Hamon | A21C 9/04 |
| 2021/0012606 | A1 | 1/2021 | Barnum et al. | |
| 2023/0277009 | A1 * | 9/2023 | Noja | B65B 25/00 |
| | | | | 99/325 |

OTHER PUBLICATIONS

Pizza maker vending machine: https://www.piestro.com/.
Pizza topping machine: https://xrobotics.io/.
Pizza topping machine: https://www.hellopicnic.com/.

\* cited by examiner

SYSTEM FOR DISPENSING INGREDIENTS

CROSS REFERENCE TO RELATED APPLICATIONS

This application claims priority under 35 U.S.C. § 119(e) to U.S. Provisional Application 63/070,026, filed on Aug. 25, 2020. The disclosure of this prior application is considered part of the disclosure of this application and is hereby incorporated by reference in its entirety.

TECHNICAL FIELD

This disclosure relates to systems and methods for dispensing ingredients, and more particularly, to systems and methods for dispensing toppings for a pizza.

BACKGROUND

Prepared foods are often offered to customers with a variety of options for ingredients. Food preparation servicers, such as restaurants, have competing interests in maximizing the number of ingredient options to satisfy customer demands and minimizing the number of ingredient options to simplify inventories and recipes. Accordingly, there exists a need in the art for a system configured to store and automatically dispense ingredients associated with a particular food order.

DESCRIPTION OF DRAWINGS

Like reference symbols in the various drawings indicate like elements.

DETAILED DESCRIPTION

Figure 1A:
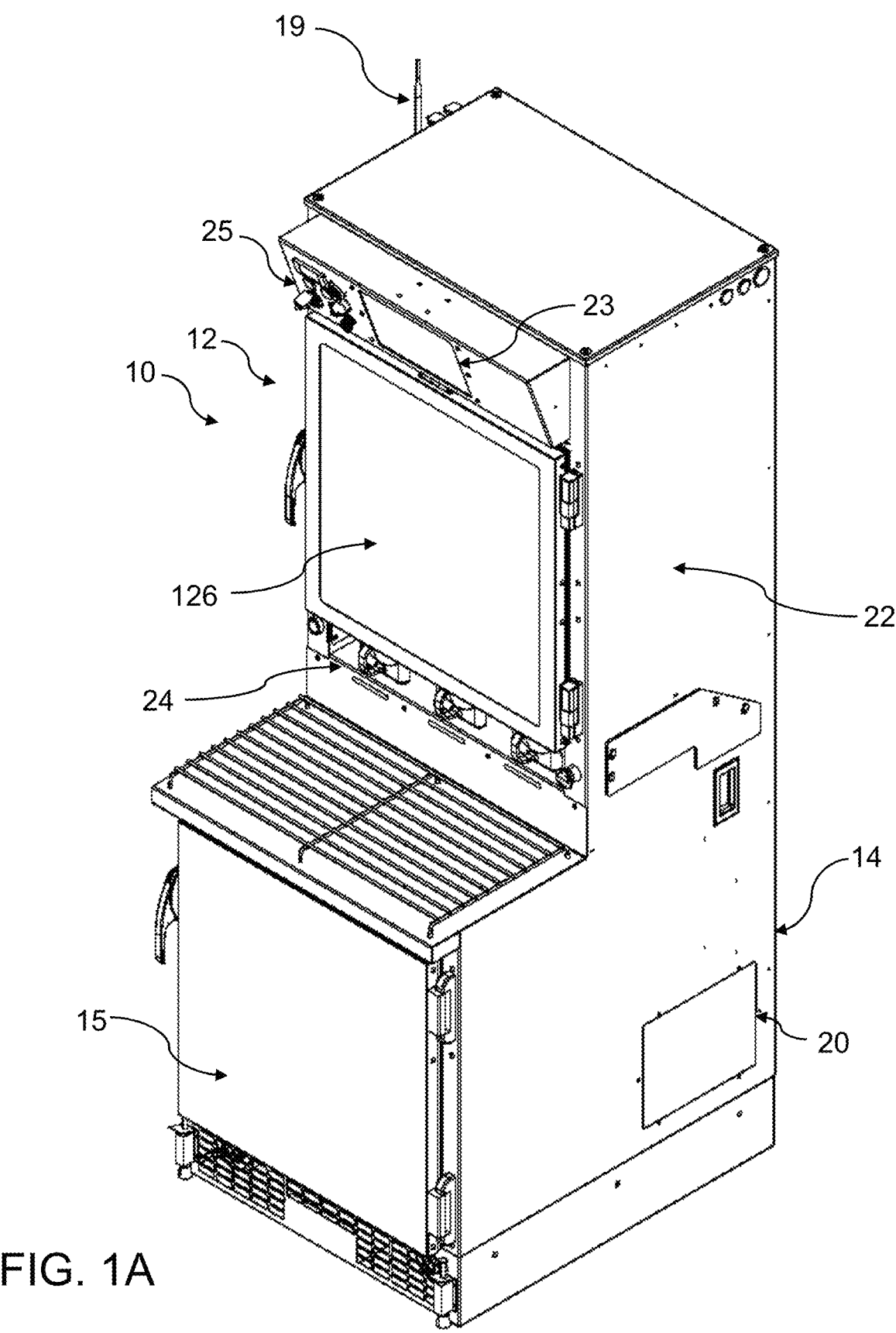
FIGS. 1A-1C are perspective views of a dispensing system according to the principles of the present disclosure.
Figure 1B:
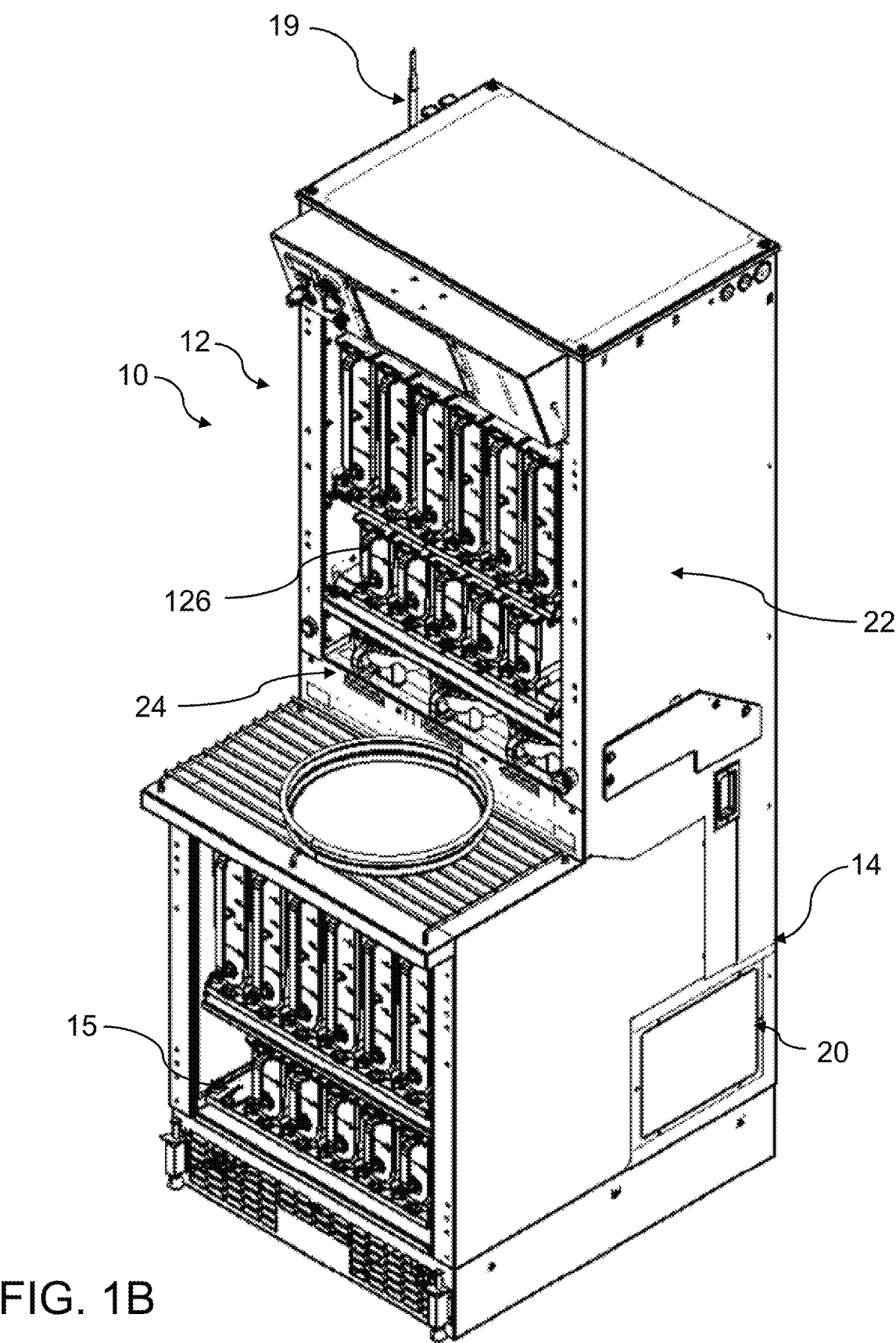
Figure 1C:
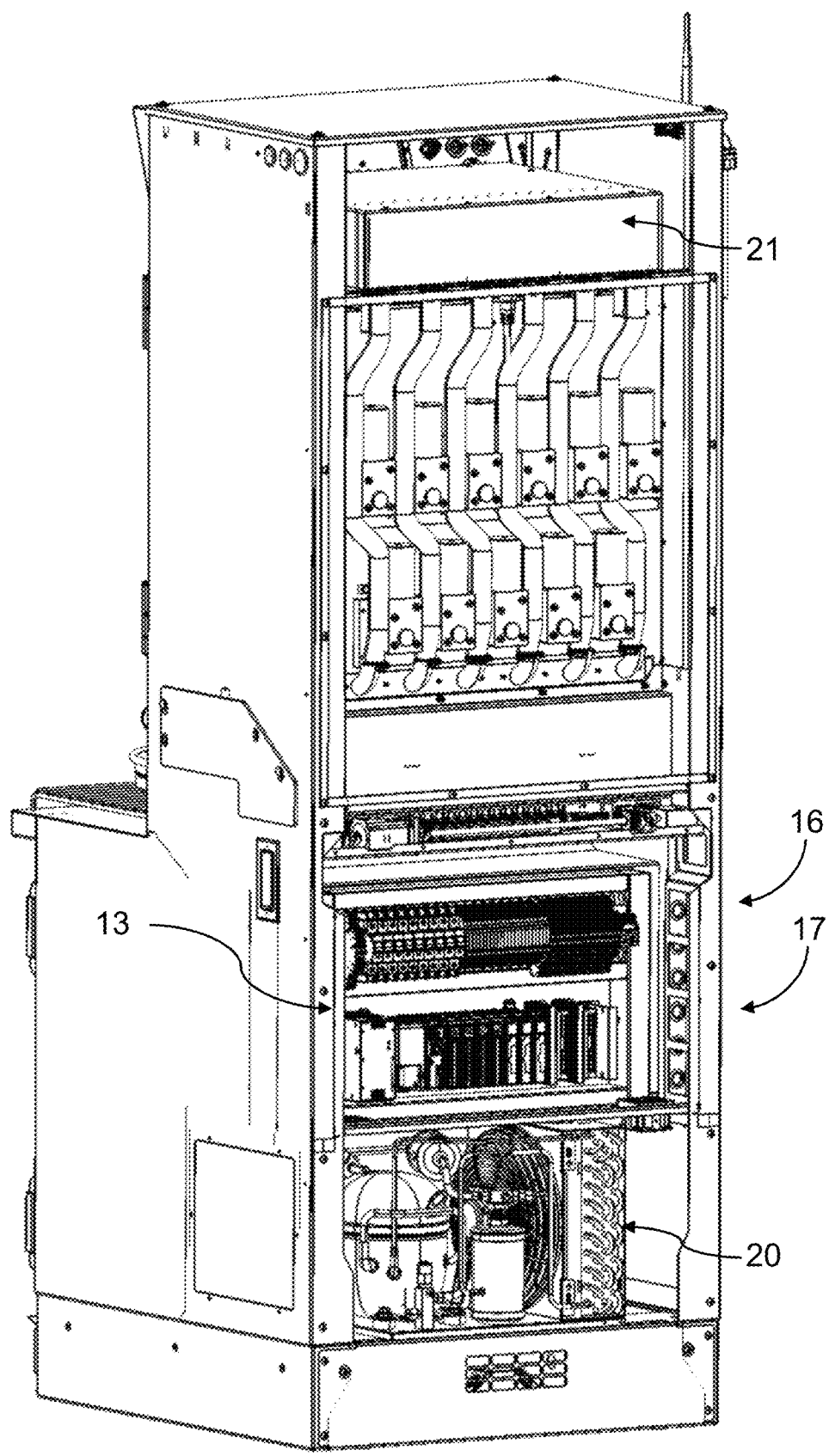
Figure 2:
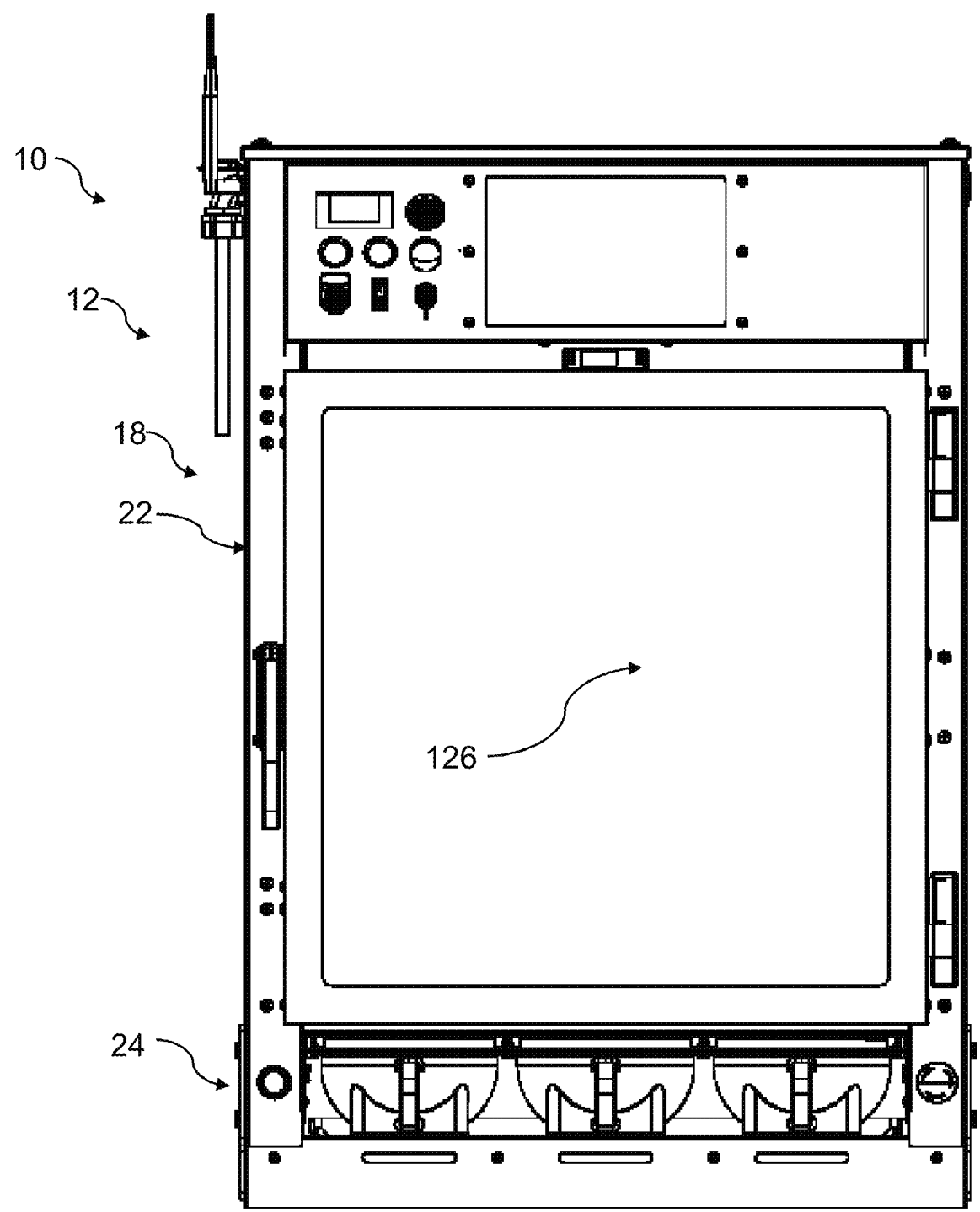
FIG. 2 is an elevation view of a dispenser according to the principles of the present disclosure.

Referring to FIGS. 1A-3, in some implementations, a system 10 for dispensing ingredients is provided. The system 10 includes a dispenser 12 and an optional stand 14 upon which the dispenser 12 is supported. The system 10 is configured to be positioned adjacent to a kitchen food preparation ("prep") area, such as a pizza prep line, and to dispense one or more ingredients for incorporation into a food product. In some examples, the stand 14 may be omitted and/or the dispenser 12 may be integrated with another piece of kitchen equipment. For example, the dispenser 12 may be attached directly to a prep table or prep cooler 15 with or without the stand 14. Here, the dispenser 12 includes a stand 14 integrated with a prep cooler 15 to allow ingredients to be retrieved from the cooler 15 without leaving the prep area.

The system 10 further includes a system controller 16 for managing the dispensing of the ingredients. In the illustrated example, the stand 14 contains a control 13 that includes a processing unit and memory hardware. Here, the control 13 hosts the system controller 16 locally at the dispenser 12 for managing instructions for operating the dispenser 12. Additionally or alternatively, a system controller 16 may be located remotely from the dispenser 12. For example, the system controller 16 may be incorporated on a restaurant management system (not shown) located locally within another area of the restaurant, or located remotely from the restaurant. In some instances, the system controller 16 may be cloud-based, such that the dispenser 12 can be monitored, controlled, and maintained from a central location, remote from the restaurant (e.g., headquarters). The system 10 includes an antenna 19 for receiving instructions from a remote controller.

Figure 31:
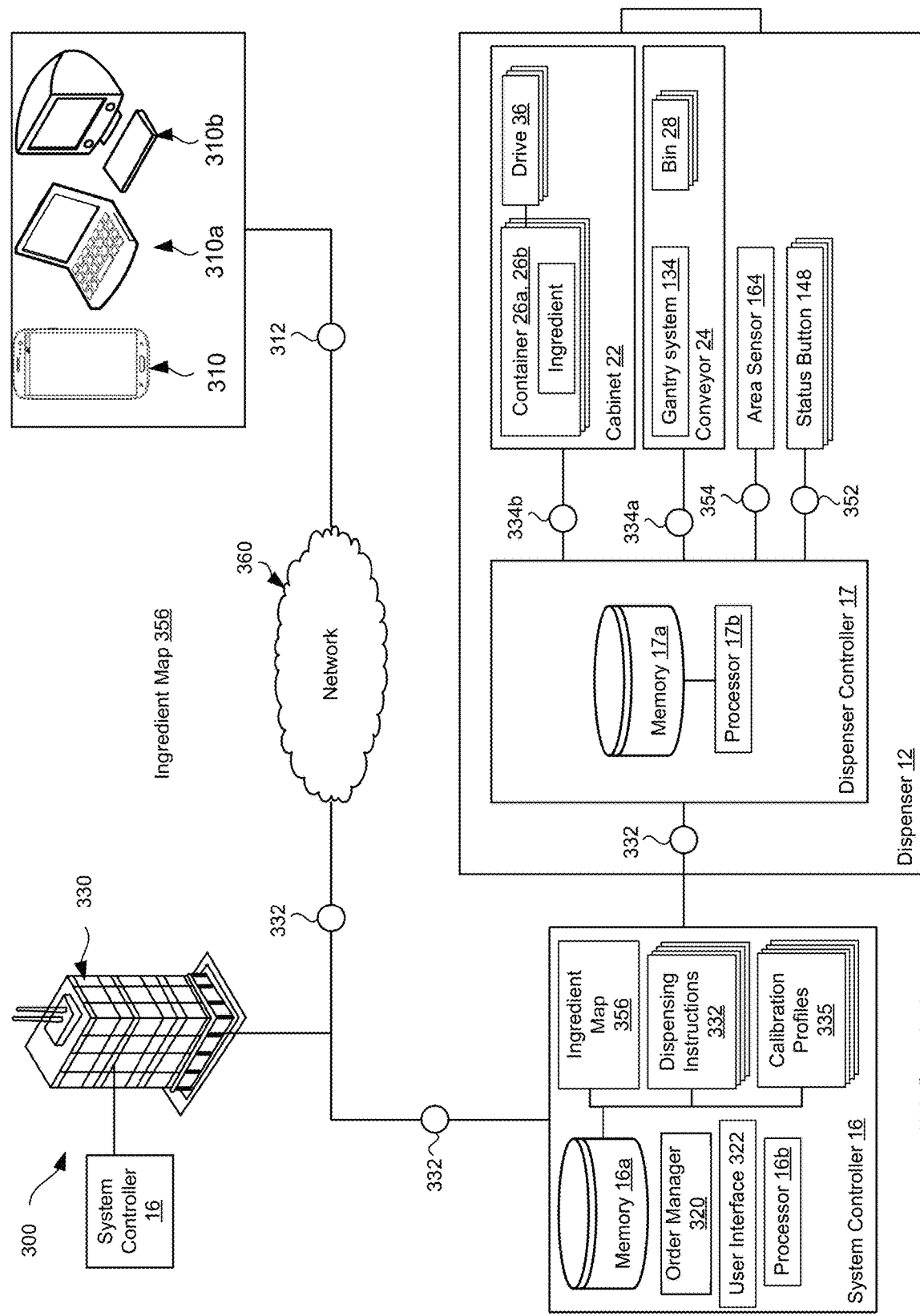

In addition to the system controller 16, which may be located at the dispenser 12 or in a remote location (e.g., POS terminal, remote monitoring and control center), the control 13 may host a dispenser controller 17 configured to receive and execute instructions from the system controller 16. The dispenser controller 17 is implemented directly on the dispenser 12, and may include a programmable logic controller (PLC). As shown in FIG. 31, the dispenser controller 17 includes memory hardware 17a and a processor 17b for executing instructions stored in the memory hardware 17a. The system 10 may include a touchscreen 23 and/or a control panel 25 at the dispenser 12 in communication with the system controller 16 and/or dispenser controller 17, such as for a user to provide instructions or information to the system 10

With reference to FIGS. 2, 3, and 6-8, the dispenser 12 includes a handling unit 18 for storing and dispensing the ingredients and a climate control unit 20 attached to the handling unit 18 for maintaining environmental conditions (e.g., temperature, humidity) within the handling unit 18. As shown, the handling unit 18 includes a cabinet 22 and a conveyor 24 disposed beneath the cabinet 22. Generally, the cabinet 22 is refrigerated by the refrigeration unit 20 and is configured to store the ingredients at a desired temperature and humidity, while the conveyor 24 is positioned beneath the cabinet 22. The refrigeration unit 20 is contained in the stand 14 so as to provide cooling to both the cabinet 22 and the cooler 15. A heat exchanger 21 is positioned atop the cabinet 22 to distribute conditioned air from the refrigeration unit 20 to the cabinet 22. Here, the conveyor 24 receives the ingredients from the cabinet 22 and presents the ingredients for retrieval from the handling unit 18. The cabinet 22 is configured to house a plurality of dispensing containers 26a, 26b that each store one of the ingredients. The conveyor 24 receives one or more bins 28 in an area beneath the cabinet 22, where the conveyor 24 is configured to move the bins 28 beneath the containers 26a, 26b for receiving the ingredients from the containers 26a, 26b.

Figure 3:
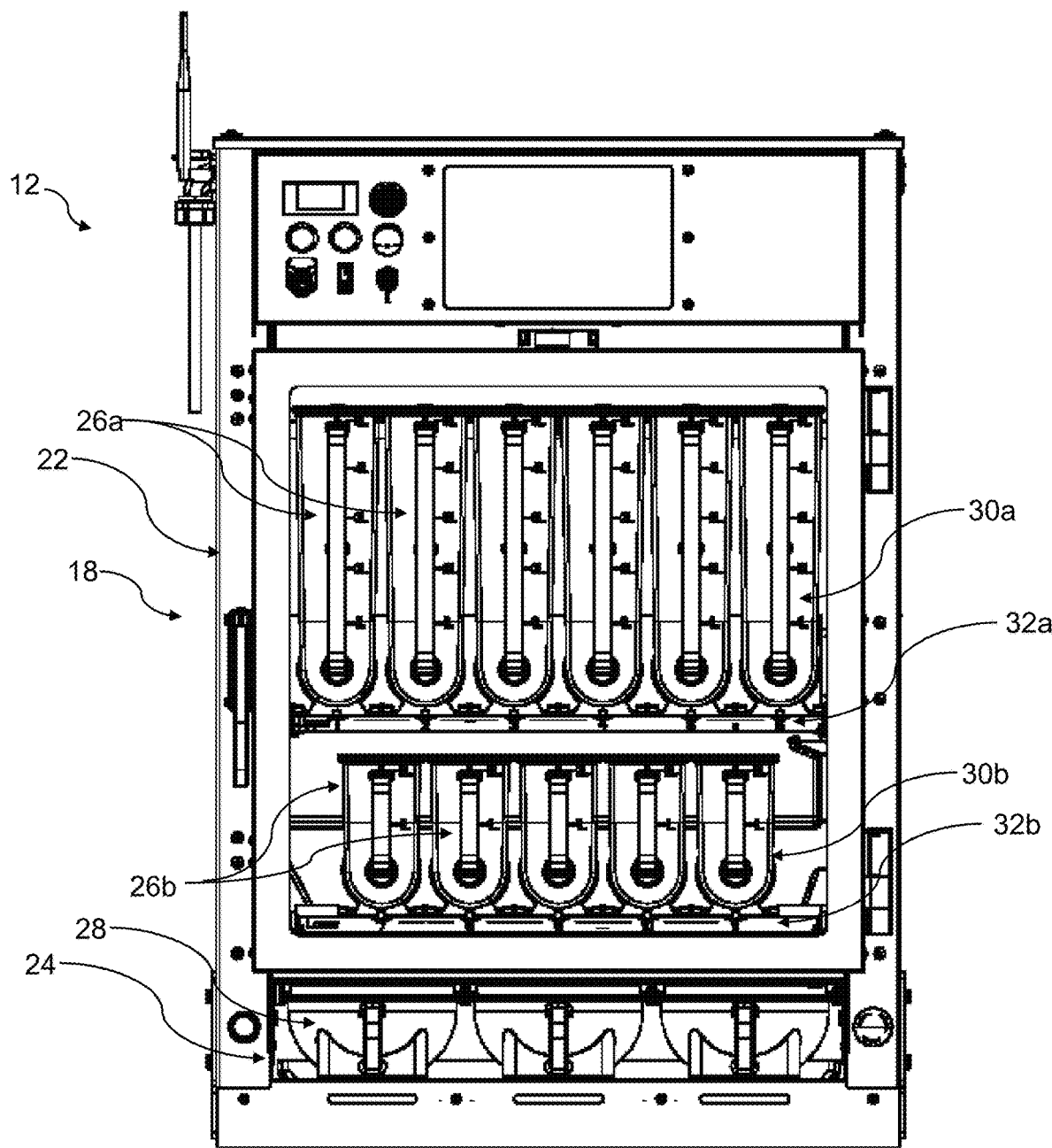
FIG. 3 is an elevation view of a dispenser according to the principles of the present disclosure, showing a door of the dispenser as transparent to illustrate internal components of the dispenser.

Referring now to FIG. 3, the cabinet 22 is configured to house a plurality of containers 26a, 26b for storing the desired ingredients to be dispensed. In the illustrated example, the cabinet 22 is arranged as a multi-level or multi-tier configuration, where a first level 30a receives a plurality of first containers 26a and a second level 30b receives a plurality of second containers 26b. In other examples, the cabinet 22 could be configured as a single-tier cabinet, or could include more than two tiers. However, the use of two tiers has been found to provide a good balance between increased complexity required for more tiers, and the increased footprint (i.e., length) required for less tiers, while also providing storage capacity for a suitable inventory of ingredients utilized in making pizzas. The cooler 15 may hold containers 26a, 26b for storage in a similar manner as the cabinet 22, discussed below.

Figure 4:
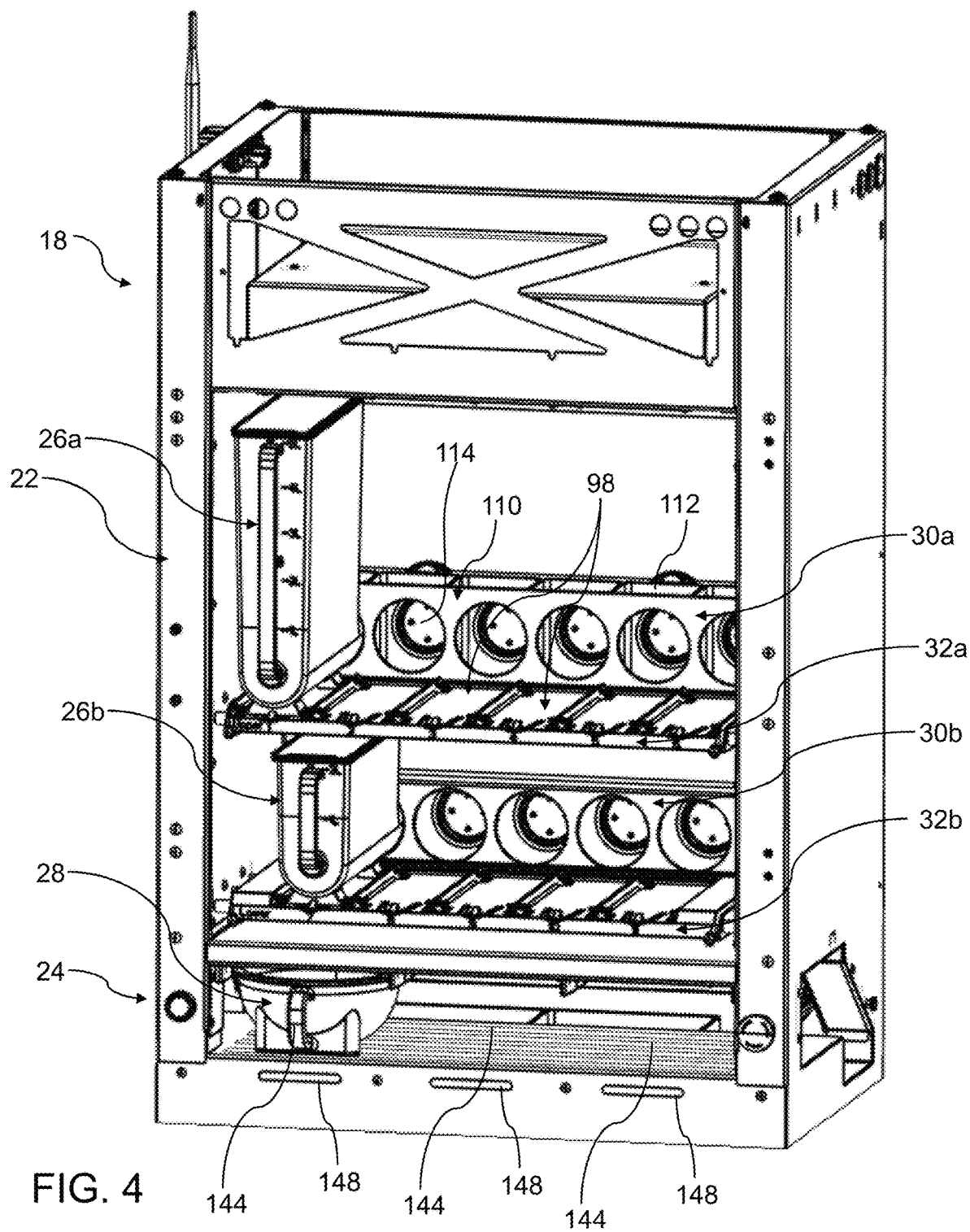
FIGS. 4 and 5 are front perspective views of a handling unit of a dispenser according to the principles of the present disclosure.
Figure 5:
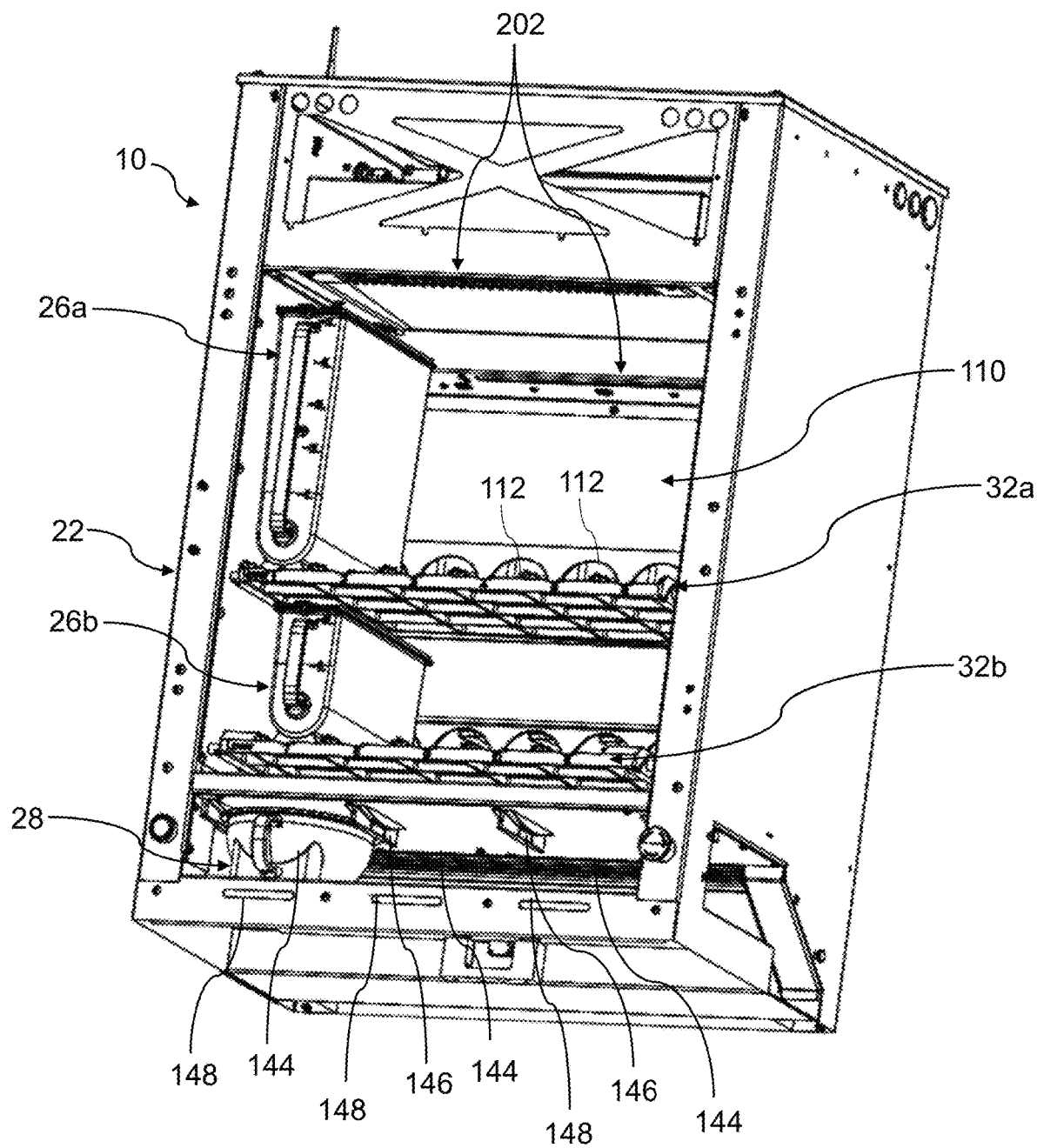
Figure 6:
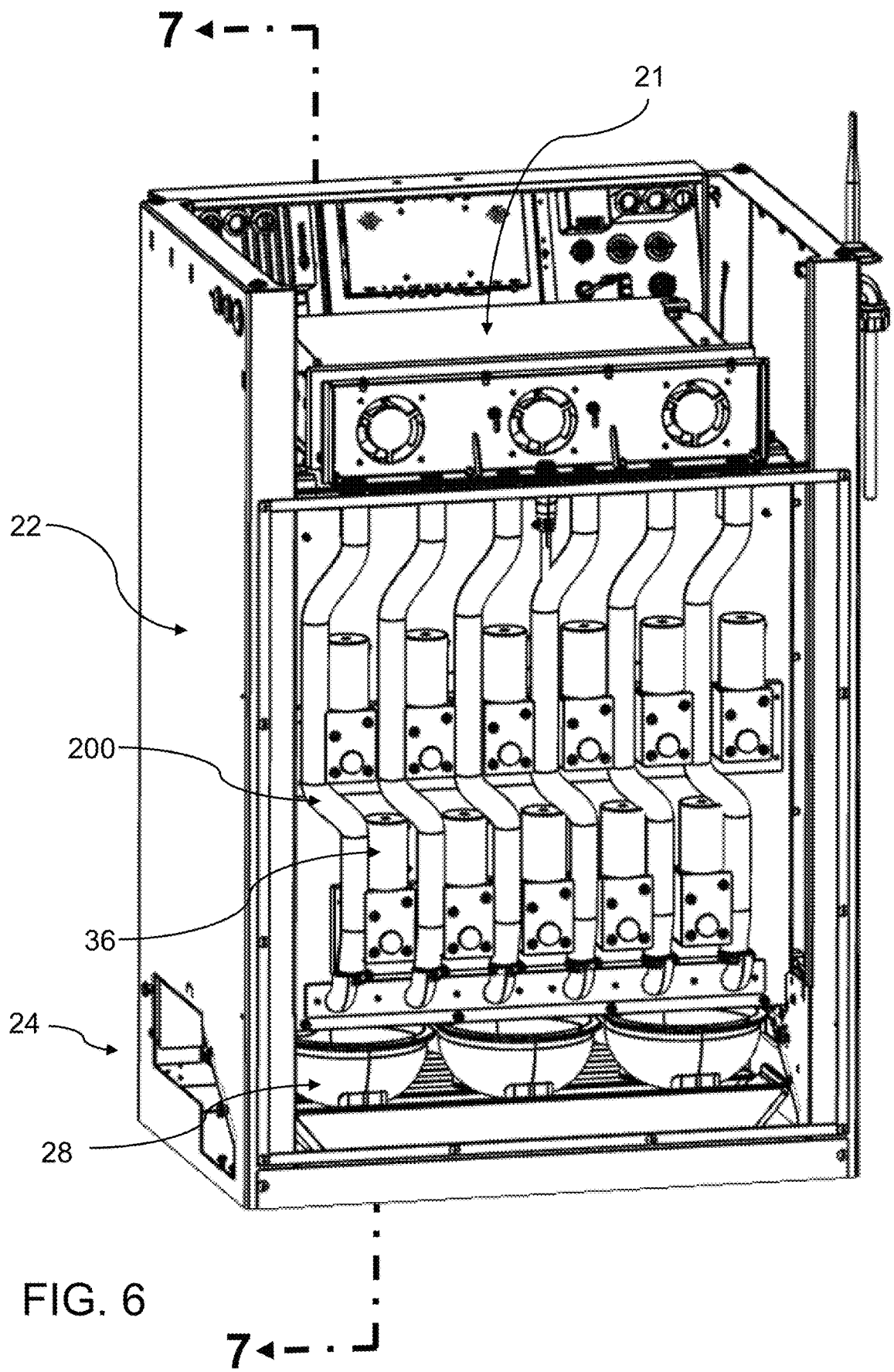
FIG. 6 is a rear perspective view of the dispenser of FIG. 3.

As shown in FIGS. 3-5, each level 30a, 30b of the cabinet 22 includes a rack 32a, 32b for supporting the respective plurality of containers 26a, 26b. For example, the plurality of first containers 26a are supported upon a first rack 32a in the upper first level 30a of the cabinet 22, and the plurality of second containers 26b are supported on a second rack 32b in the lower second level 30b of the cabinet 22. As described in greater detail below, each of the racks 32a, 32b includes a plurality of channels 98 (FIG. 4) for supporting and aligning the containers 26a, 26b within the cabinet 22. The cabinet 22 may also be provided with a chute structure 110 having a plurality of chutes 112 extending along a rear wall, which are configured to direct the ingredients from one of the containers 26a, 26b to the bin 28. As shown in FIG. 6, each level 30a, 30b of the cabinet 22 also includes a series of drives 36 each configured to interface with one of the containers 26a, 26b to dispense the ingredients from the container 26a, 26b to one of the bins 28 on the conveyor 24.

Figure 7:
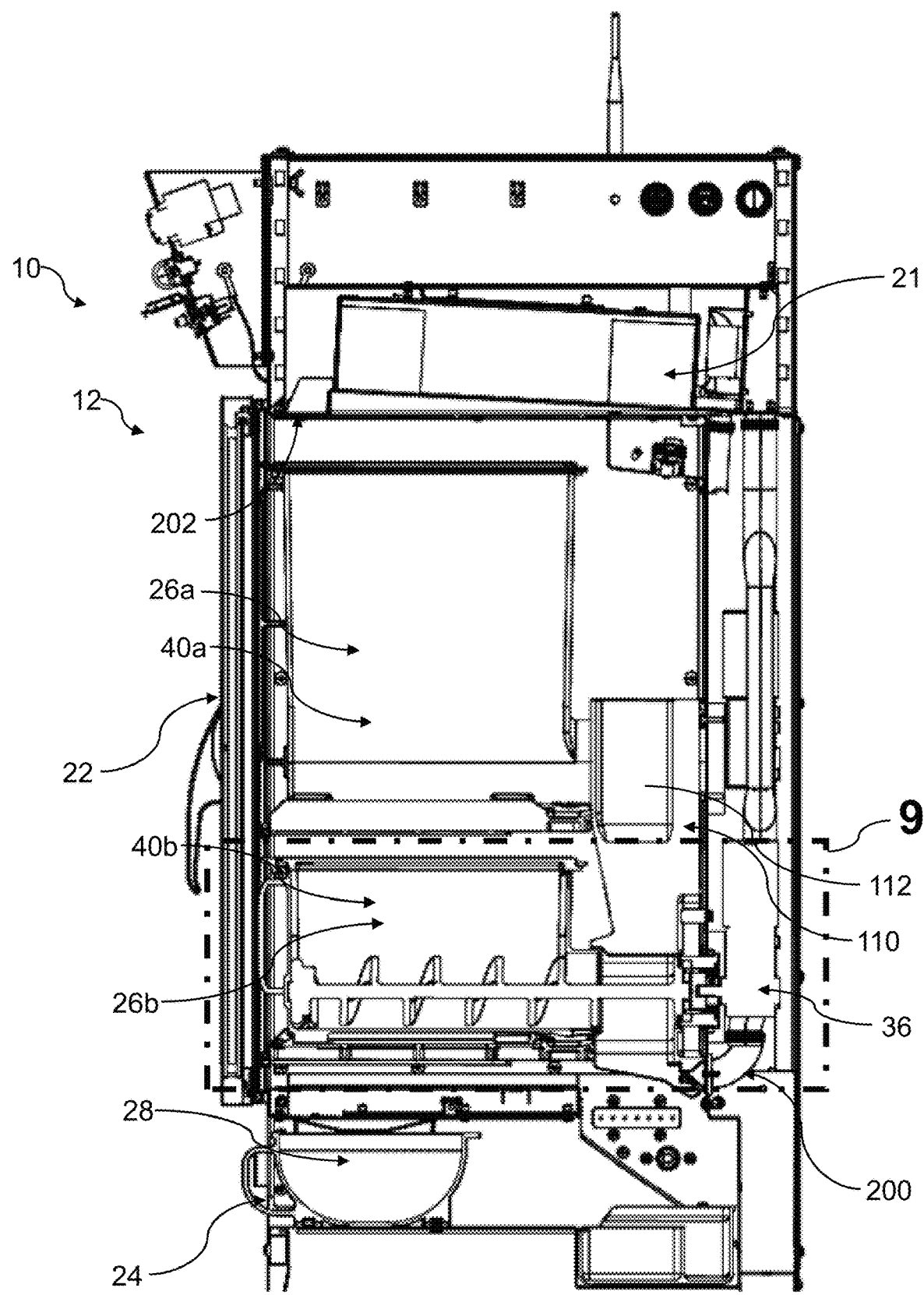
FIGS. 7 and 8 are cross-sectional views of the dispenser of FIG. 3, taken along Line 7-7 in FIG. 6.
Figure 8:
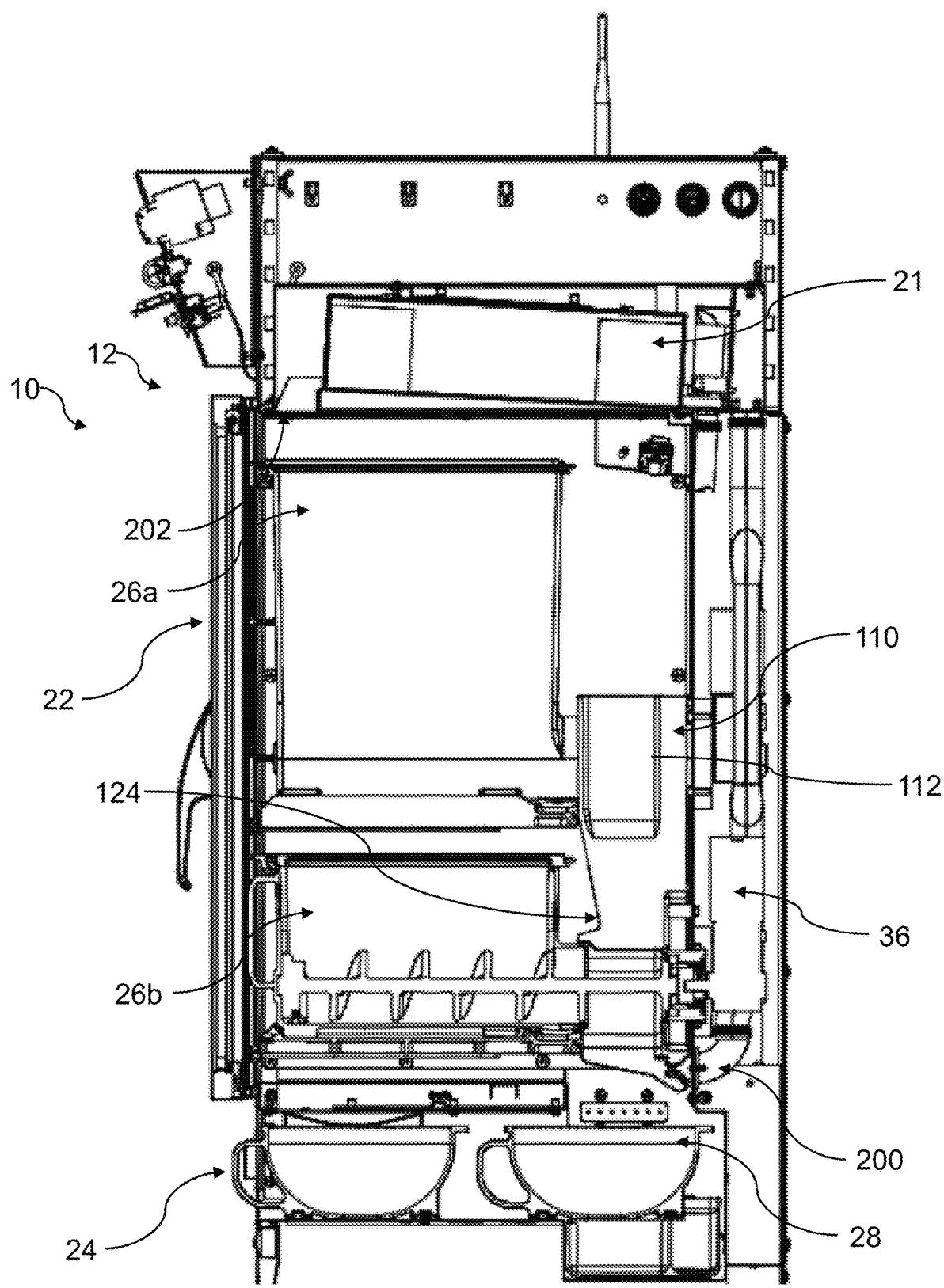

Referring now to FIGS. 16-19, one of the first containers 26a is shown in detail. The first container 26a includes a hopper 40a configured for receiving an ingredient, a lid 42 attached to the hopper 40a to selectively enclose the ingredient within the hopper 40a, and an ejector 44 disposed within the hopper 40a and configured to selectively dispense the ingredient from the hopper 40a. As shown, the ejector 44 is an auger 44 having an end rotatably connected to one of the drives 36 by a coupler 46 disposed at the end of the auger 44. As shown in FIGS. 7 and 8, the second containers 26b are substantially similar to the first containers 26a, except that the second containers 26b have a shorter hopper 40b than the first containers 26a. Accordingly, the second containers 26b will not be separately described in detail.

Referring still to FIGS. 16-19, the hopper 40a includes an inner chamber 48 defined by an arcuate base 50, a pair of sidewalls 52 extending from opposite sides of the base 50, and a pair of end walls 54 extending from opposite ends of the base 50 between the sidewalls 52. As shown, the sidewalls 52 and the end walls 54 cooperate to define an opening or inlet 56 at the top of the chamber 48. In some examples, a width of the hopper 40a (i.e., distance between the sidewalls 52) tapers continuously from the inlet 56 to the base 50, such that the width is greater at the inlet 56 than at the base 50. This configuration provides improved access for filling and cleaning, while minimizing an overall footprint of the hopper 40a.

The hopper 40a further includes an outlet 58 formed through one of the end walls 54 and a socket 60 formed in or through the opposite end wall 54. As discussed in greater detail below, the outlet 58 and the socket 60 are configured to rotatably receive opposite ends of the auger 44. In the illustrated example, the outlet 58 is formed in part by the arcuate base 50 of the hopper 40a, whereby the base 50 extends beyond the end wall 54. Accordingly, the auger 44 can dispense ingredients from the base 50 through the outlet 58. The socket 60 is configured to rotatably receive a first end of the auger 44. In the illustrated example, the socket 60 receives and retains the first end 66 of the auger 44 at an inner surface of the end wall 54 of the hopper 40a.

The auger 44 is disposed within the chamber 48 adjacent to the base 50, and extends at least partially into the outlet 58. As best shown in the cross-sectional view of FIG. 19, the auger 44 includes an elongate shaft 62 and helical fighting 64 extending along a length of the shaft 62. In the illustrated example, the shaft 62 is cylindrical and defines a minor diameter $D_{62}$ of the auger 44, while the flighting 64 defines a major diameter $D_{64}$ of the auger 44. The minor diameter $D_{62}$, the major diameter $D_{64}$, and a pitch $P_{64}$ of the fighting 64 are selected to define a space for receiving and conveying the ingredients along the base 50. For instance, a larger pitch $P_{64}$ and a larger difference between the diameters $D_{62}$, $D_{64}$ will form an increased volume within the fighting 64 for receiving and conveying ingredients, but may reduce the metering resolution of the auger 44, leading to less precise dispensing of some ingredients. Conversely, reducing the pitch $P_{64}$ and/or the difference between the diameters $D_{62}$, $D_{64}$ may improve resolution, but may prevent some larger ingredients from being fully received by the auger 44. Optionally, the fighting 64 of the auger 44 may be provided with a variable pitch. For example, the flighting 64 may have a first pitch $P_{64}$ along a first portion of the shaft 62 and a second pitch $P_{64}$ along a second portion of the shaft 62. Here, a pitch $P_{64}$ of the fighting 64 adjacent to the outlet 58 may be less than a pitch $P_{64}$ of the fighting at the opposite end of the auger 44. The variable pitch $P_{64}$ allows ingredients adjacent to the outlet 58 to be more precisely dispensed while ingredients that are farther away from the outlet 58 conveyed at a higher rate.

As introduced above, the shaft 62 extends from a first end 66 received in the socket 60 of the hopper 40a to a second end 68 extending through the outlet 58 of the hopper 40*a*. As shown, the first end 66 is received and retained by the socket 60, while the second end 68 of the shaft 62 is configured to interface with one of the drives 36 to rotate the auger 44. Optionally, the first end 66 of the shaft 62 may extend through the end wall 54 of the hopper 40*a* such as to be accessible exterior the hopper 40*a* and the end may be formed as a gripping feature or handle for allowing the auger 44 to be gripped and manually rotated by a user.

In the illustrated example, the first end 66 of the shaft 62 includes a retainer 70 configured to secure and support the first end 66 of the shaft 62 within the socket 60. As shown, the retainer 70 is cylindrical in shape and provides a rotational bearing surface for rotationally supporting the first end 66 of the shaft 62 within the socket 60. The retainer 70 may engage an inner support lip 72 of the socket 60 when the first end 66 is received at a receptacle 73 of the socket 60. The receptacle 73 of the socket 60 is defined by an inner surface of the end wall 54 of the hopper 40*a* and includes a recess or receiving feature for receiving and supporting a projection extending axially (i.e., along the rotational axis of the auger 44) from the first end 66 of the auger 44. The support lip 72 of the socket 60 is defined by a receiving wall protruding radially inwardly from the inner surface of the base 50 and is spaced inward from the end wall 54 along the base 50.

The retainer of the shaft 62 includes a flange 74 that is also received in the socket 60 between the end wall 54 and the support lip 72. When the first end 66 of the shaft 62 is inserted into the socket 60, the flange 74 sealingly abuts an interior surface of the end wall 54 at the receptacle 73 of the socket 60 to serve as a thrust bearing between the end wall 54 and the support lip 72, providing axial support against the end wall 54 as the auger 44 rotates within the hopper 40*a*. Thus, the retainer 70 defines a rotational bearing surface that interfaces with the inner bearing surface of the support lip 72 and the flange 74 is both received and retained between the support lip 72 and the end wall 54.

Figure 18:
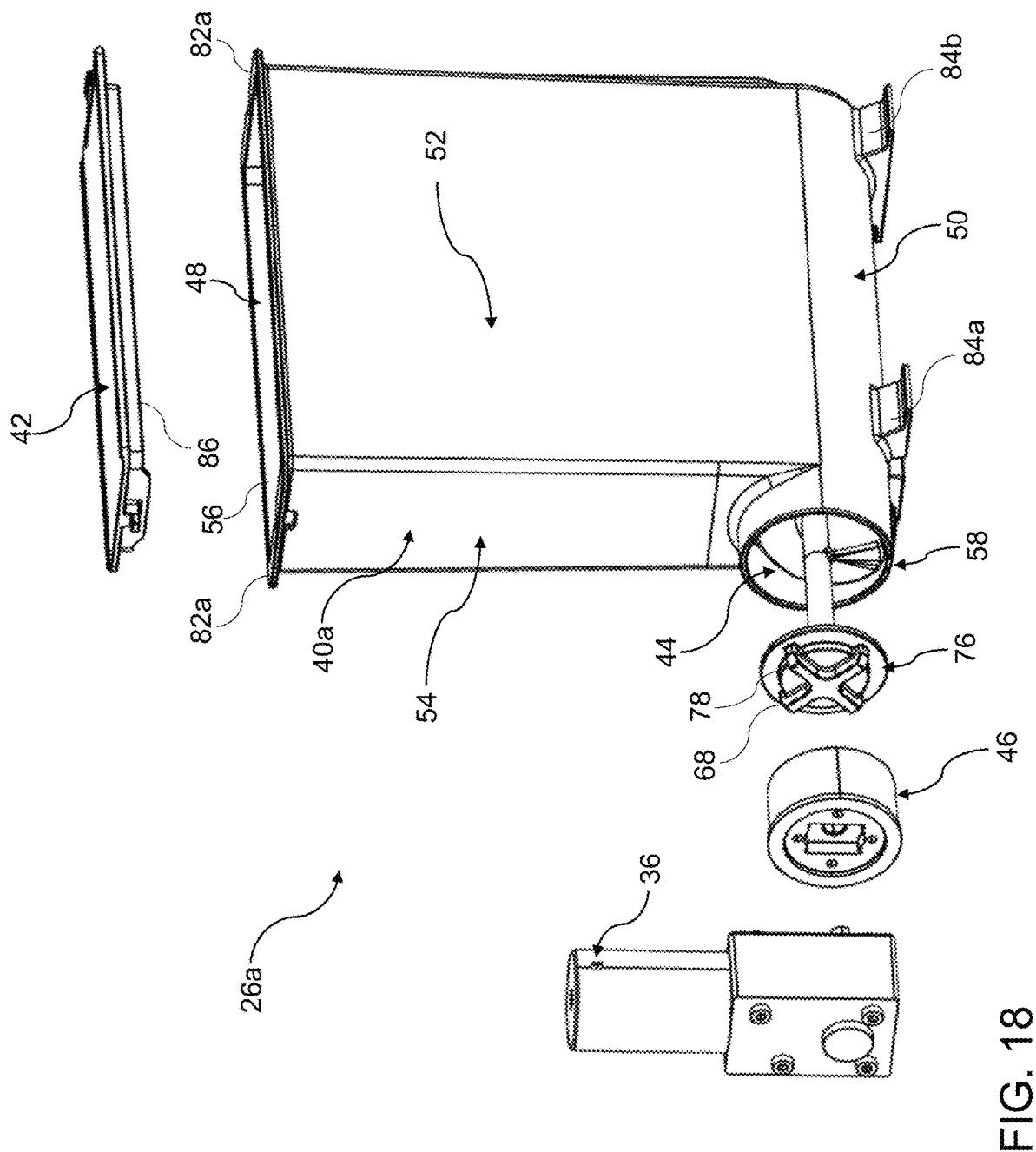
Figure 19:
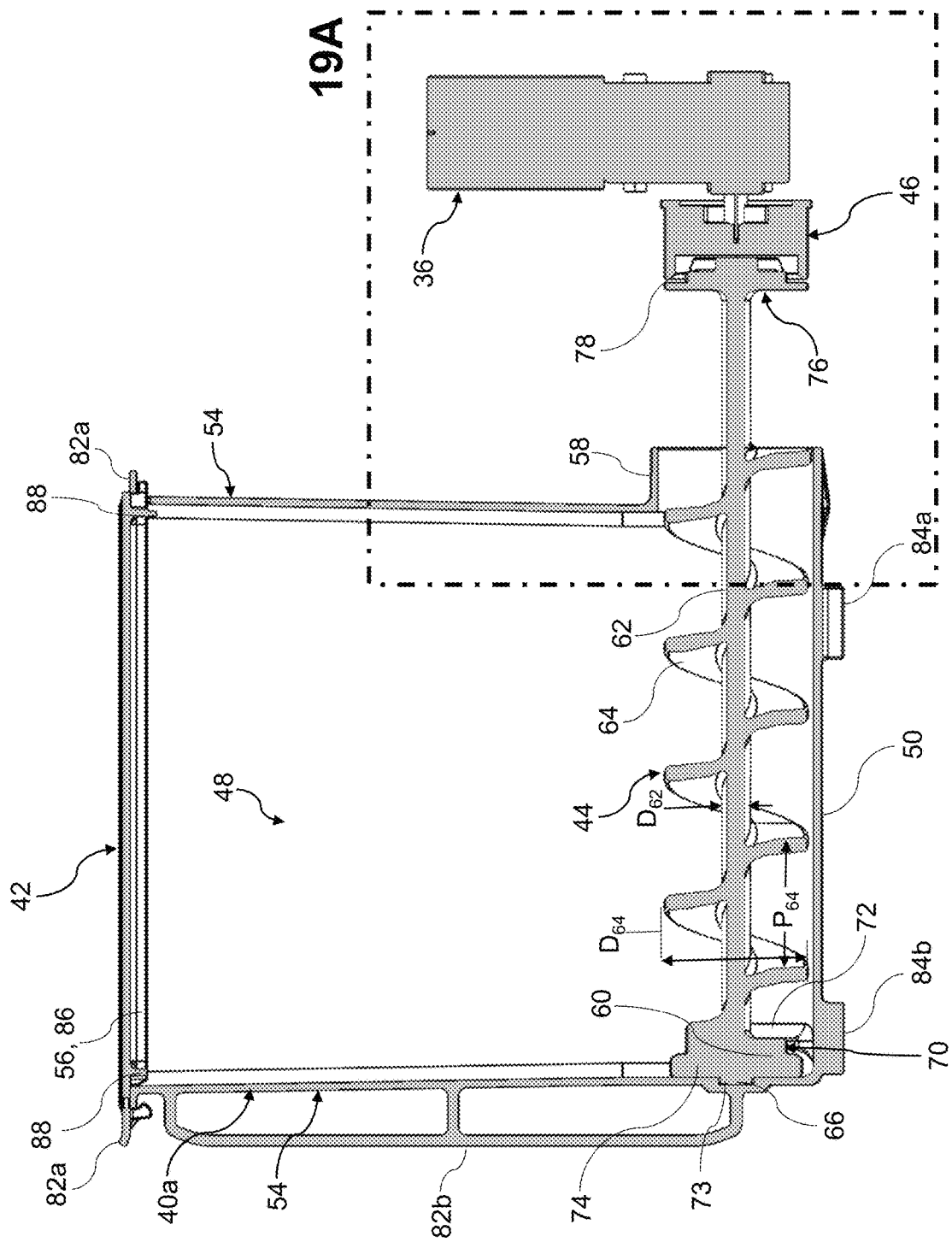
FIG. 19 is a cross-sectional view of the container of FIG. 16, taken along Line 19-19 in FIG. 16.
Figure 19A:
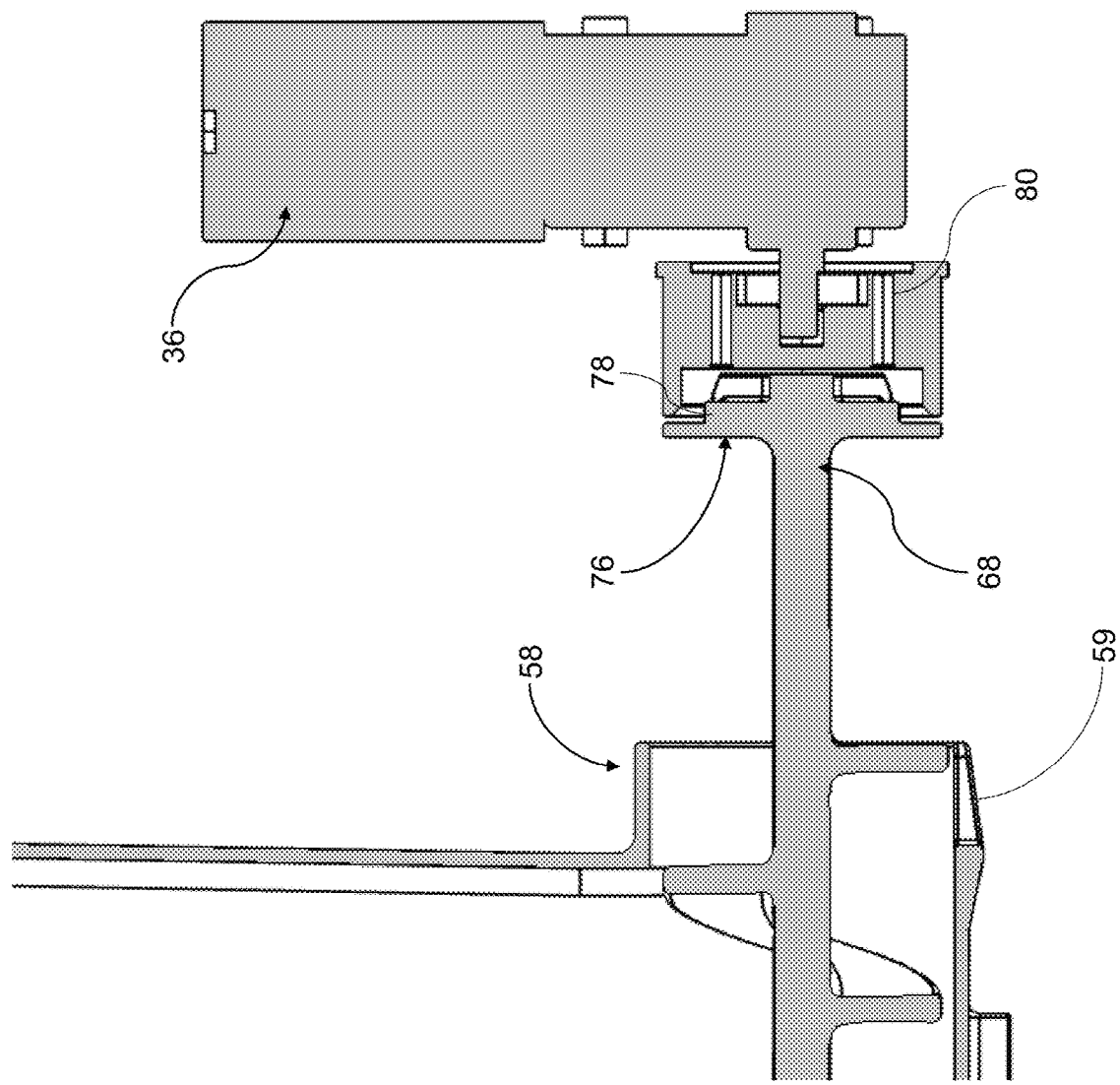
FIG. 19A is an enlarged cross-sectional view of the container and drive of FIG. 19, taken at Area 19A of FIG. 19.
Figure 20:
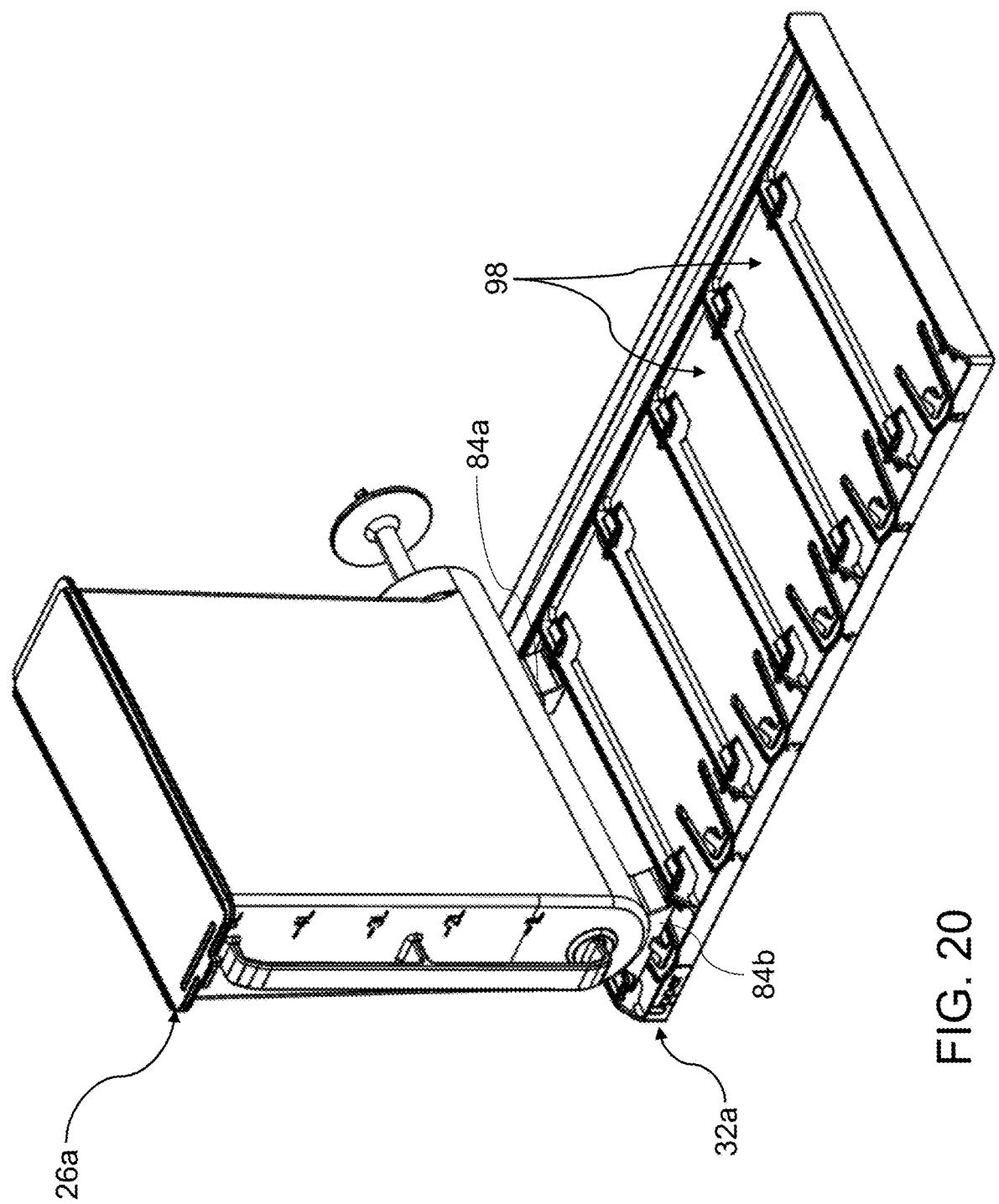
FIG. 20 is an environmental view showing the container of FIG. 16 installed within a rack according to the principles of the present disclosure.
Figure 21:
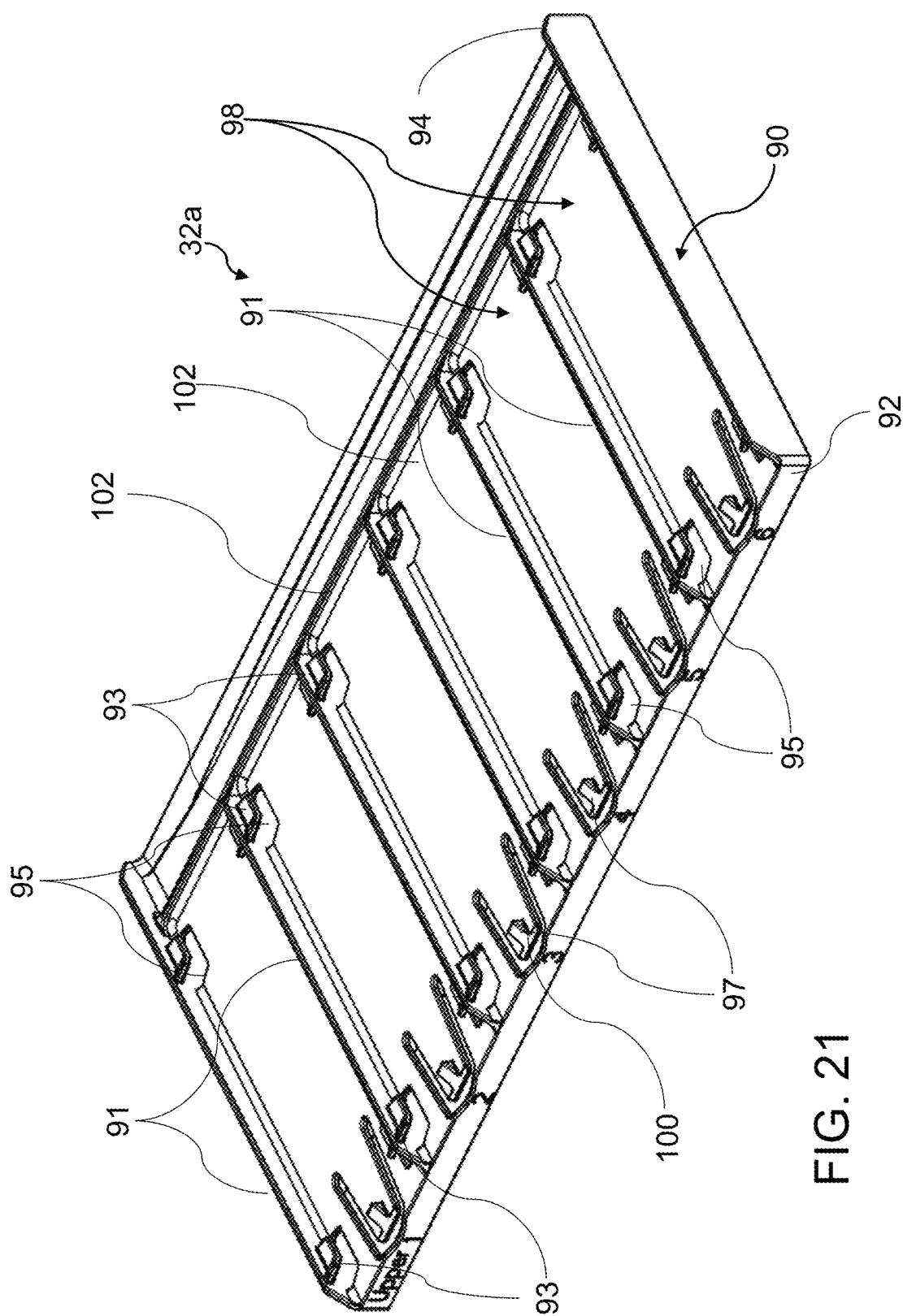
FIG. 21 is a perspective view of the rack of FIG. 20.
Figure 22:
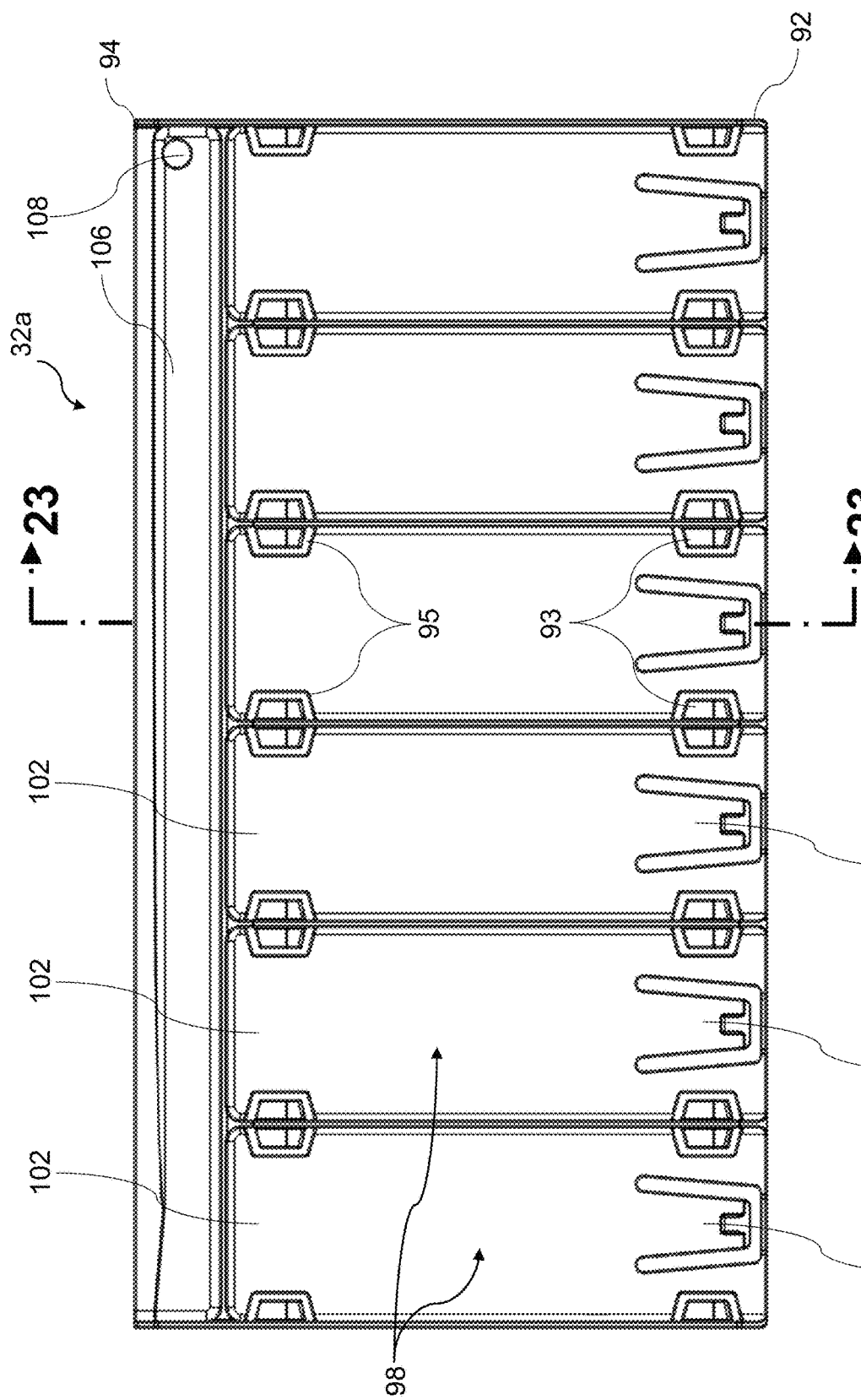
FIG. 22 is a top plan view of the rack of FIG. 20.
Figure 23:
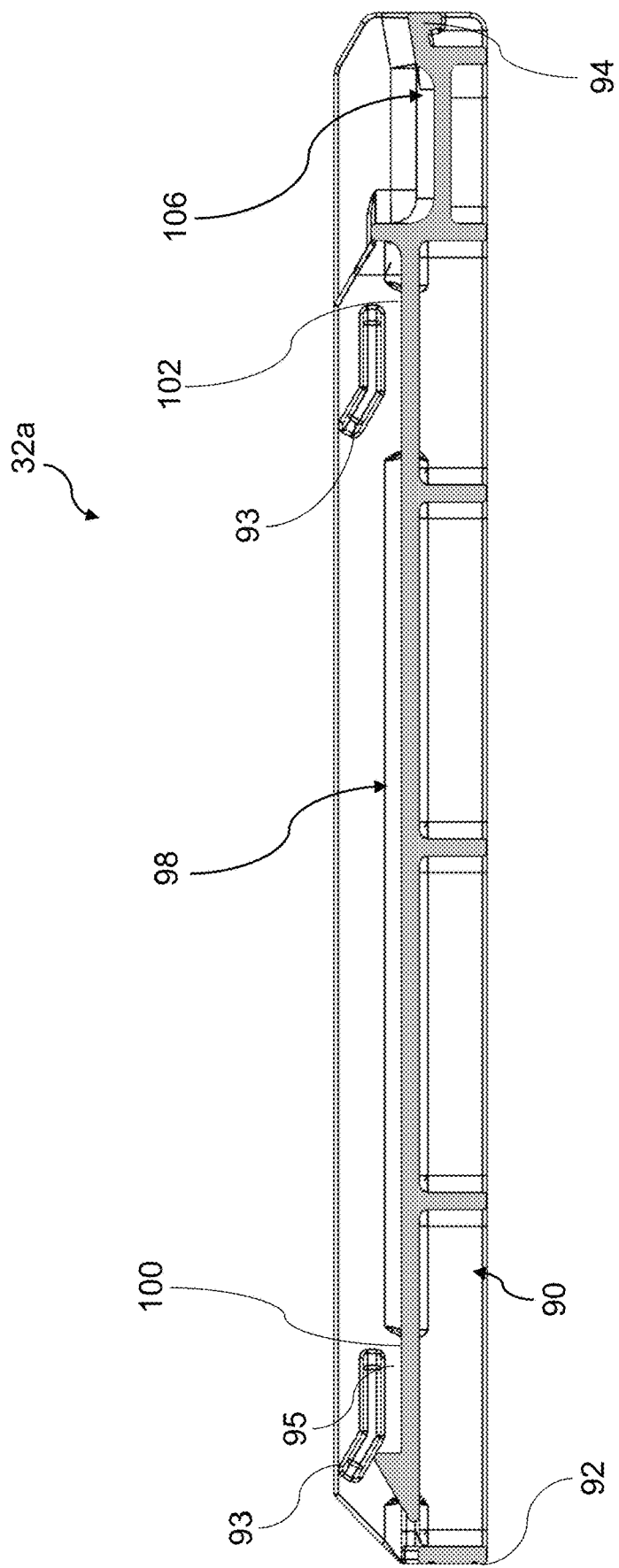
FIG. 23 is a cross-sectional view of the rack of FIG. 20, taken along section line 23-23 in FIG. 22.

Referring to FIG. 18, the second end 68 of the shaft 62 includes a gear 76 for selectively engaging the second end 68 of the auger with the coupler 46. In the illustrated example, the gear 76 is integrally formed with the second end 68 of the shaft 62 and is configured as a male portion having a plurality of radially-extending ribs 78. As best shown in FIG. 19A, the coupler 46 may include a corresponding plurality of retractable pins 80 that are spring-loaded so as to protrude from the coupler 46, and which are configured to engage the ribs 78 when the gear 76 is rotated by the coupler 46. The pins 80 of the coupler 46 are separated from each other by spaces for receiving each of the ribs 78 therebetween. The spaces between the pins 80 provide a degree of rotational freedom between the auger 44 and the coupler 46 to facilitate easier engagement between the gear 76 and the coupler 46. The pins 80 are spring-loaded so that the auger 44 may be installed and automatically aligned. In other words, when the second end of 68 of the shaft 62 is engaged with the coupler 46, the ribs 78 of the gear 76 need not be installed aligned between the pins 80 of the coupler 46. If the auger 44 is installed so that the ribs 78 are not aligned between the pins 80, the gear 76 will depress the pins 80 into the coupler 46. When the coupler 46 is operated to rotate the auger 44, the coupler 46 will rotate relative to the gear 76 until the pins 80 move into the spaces between the ribs 78 and can extend and engage the sides of the ribs 78 upon further rotation.

While the ejector 44 of the present disclosure is illustrated in the form of an auger 44, other forms of ejectors may be utilized for dispensing ingredients from the container. For example, the ejector 44 may be implemented as a paddle wheel having a plurality of radially-arranged compartments. Here, the paddle wheel rotates within or adjacent to an opening of the hopper 40*a* to receive the ingredients within each of the compartments. Each compartment has as known volume, so the paddle wheel may be rotated a predetermined amount to dispose a desired amount of the ingredient. In other examples, the ejector 44 may be embodied as a conveyor belt, such as a flat belt or a cleated belt running along the base 50 of the hopper 40*a*.

With continued reference to the hopper 40*a*, a plurality of handles 82*a*, 82*b* are formed on the end walls 54 for carrying and manipulating the container 26*a*. As shown, the hopper 40*a* includes a pair of first handles or grips 82*a* extending in opposite directions from the end walls 54 adjacent to an opening of the chamber 48. Each of the grips 82*a* are formed as solid tabs having a downwardly-curved lip at the distal end. The hopper 40 also includes a second handle 82*b* formed on the "front" end wall 54 above the socket 60. The second handle 82*b* is configured as a pull handle and allows the container 26*a* to be lifted and pulled from the front of the cabinet 22.

The hopper 40*a* further includes a pair of legs 84*a*, 84*b* attached to the base 50 for supporting the hopper 40*a* in an upright position. In the illustrated example, the legs 84*a*, 84*b* are formed integrally with the base 50 and have the same height to provide a substantially level base 50 of the hopper 40*a* with little to no decline or incline. In other implementations, the legs 84*a*, 84*b*, may have different heights to provide a decline or incline in the direction of the outlet 58. Particularly, one of the legs 84*a* closer to the outlet 58 may have a greater height than one of the legs 84*b* at the opposite end of the hopper 40*a* to provide a decline in a direction away from the outlet 58.

At the top of the container 26*a*, the lid 42 is configured to selectively enclose the chamber 48 of the hopper 40*a*. The lid 42 may include a lip 86 configured to align the lid 42 within the inlet 56 of the chamber 48. The lid 42 may also include a pair of fasteners 88 that are configured to engage a corresponding pair of detents formed in the hopper 40*a*. This allows the lid 42 to be "snapped" onto the top of the hopper 40.

Turning now to FIGS. 20-23, when the containers 26*a*, 26*b* are installed within the cabinet 22, the legs 84*a*, 84*b* of the hopper 40*a*, 40*b* are supported upon one of the racks 32*a*, 32*b*. The upper rack 32*a* used for supporting the larger hoppers 40*a* is configured substantially similar as the lower rack 32*b* used for supporting the smaller hoppers 40*b*. However, the upper rack 32*a* is configured to support six larger hoppers 40*a* and the lower rack 32*b* is configured to support five smaller hoppers 40*b*. Accordingly, only the upper rack 32*a* will be described here. Each rack 32 includes a base 90 having a first end 92 and a second end 94. The base 90 includes a plurality of channels 98, which cooperate to support and align respective ones of the containers 26*a*, 26*b* within the cabinet 22. When the containers 26*a*, 26*b* are received in respective channels 98, the outlets 58 are positioned above the second end 94 of the base 90 and the handles 82*a*, 82*b* are positioned above the first end 92 of the base 90.

The channels 98 of the rack 32 each extend from a first end 100 adjacent to the first end 92 of the base 90 to a second end 102 adjacent to the second end 94 of the base 90. The channels 98 are defined by side walls 91 extending from the first end 92 to the second end 94 of a substantially flat base 90 parallel to one another. When the containers 26*a*, 26*b* are installed at the rack 32, the legs 84*a*, 84*b* slidably engage the side walls to ensure the containers 26*a*, 26*b* are aligned with a respective channel 98. Retaining ramps 93 protrude from the side walls 91 at a height above the channels 98 at the first end 100 and second end 102. The retaining ramps 93 are configured to engage an upper surface of the legs 84*a*, 84*b* when the containers 26*a*, 26*b* are installed at the rack 32 to retain the containers 26*a*, 26*b* at the rack and prevent them from lifting up or tilting once installed. Thus, each channel 98 may include four retaining ramps 93 with two retaining ramps 93 configured to engage the front legs 84*a* and two retaining ramps 93 configured to engage the rear legs 84*b*. Optionally, the rack 32 further includes recesses or cavities 95 formed through the base 90 beneath the respective retaining ramps 93 so that a portion of the legs 84*a*, 84*b* may drop through or sit within or sit above the cavity 95. The retaining ramps 93 may guide the legs 84*a*, 84*b* into or over the respective cavities 95 as the containers 26*a*, 26*b* are installed at the rack 32. Each channel 98 may also include a flex tab 97 formed at the first end 92 of the base 90. The flex tab 97 is operable to move between an upright position protruding from the base 90 and retracted position flush with the base 90. As shown, the flex tab 97 is inclined along a direction towards the second end 94 of the base 90 such that the flex tab 97 is moved to the depressed state as the container 26*a*, 26*b* passes over the flex tab 97. When the container 26*a*, 26*b* is fully seated within the rack 32*a*, 32*b*, the flex tab 97 returns to the upright state to obstruct movement of the container 26*a*, 26*b* in the channel 98. This serves to indicate that the container 26*a*, 26*b* is seated, and to retain the container 26*a*, 26*b* within the rack 32.

As shown in FIGS. 3-5, the upper rack 32*a* and the lower rack 32*b* are configured so that the larger containers 26*a* and smaller containers 26*b* are offset from one another when installed at the respective racks 32. In other words, each larger container 26*a*, when installed at the upper rack 32*a*, is positioned between two smaller containers 26*b* located below it. As shown in FIG. 3, this offset arrangement is continued for all of the containers 26*a*, 26*b* of the first and second levels 30*a*, 30*b*. As discussed in greater detail below, this allows ingredients from the first containers 26*a* on the first level 30*a* to be dispensed between the second containers 26*b* on the second level 30*b*.

With continued reference to FIGS. 20-23, the base 90 of the rack 32 may further include a gutter 106 extending along the second end 94 adjacent to the second end 102 of each of the channels 98. Accordingly, the gutter 106 is configured for receiving fluids that may drip from the outlet 58. A drainage hole 108 may be formed through the base 90 of the rack at one end of the gutter 106 to allow the fluid to drain through the rack 32, such as to a drip pan 150 (FIG. 10) below.

As shown in FIG. 19A, the fluid may drip to the gutter 106 from the outlet 58 and/or a slot 59 formed in the bottom surface of the outlet 58 that allows fluid to drain into the gutter 106. As the auger 44 pulls ingredients out of the outlet 58, any fluid built up in the containers 26*a*, 26*b* will drip out of the slot 59 prior to the ingredients being pulled out of the outlet 58. Thus, the containers 26*a*, 26*b* do not hold a substantial amount of fluid when installed at the rack 32 and any fluid built up may drain prior to the ingredients being dispensed to improve the freshness and longevity of ingredients contained therein. Additionally, silicone caps (not shown) may be included in the containers 26*a*, 26*b* when the containers 26*a*, 26*b* are removed from the dispenser 12 to prevent fluid from leaking when outside of the cabinet 22.

The silicone caps are placed over the outlet 58 and may optionally cover the slot 59 to prevent fluid from dripping.

Referring now to FIGS. 2-6, the cabinet 22 is configured to receive and support the containers 26*a*, 26*b* therein for dispensing of the ingredients of the containers 26*a*, 26*b* to the conveyor 24. As previously discussed, the containers 26*a* of the first level 30*a* are staggered relative to the containers 26*b* of the second level 30*b*. As best shown in FIGS. 4 and 5, the cabinet 22 includes a rear chute structure 110 for guiding the ingredients to the conveyor 24.

Figure 26:
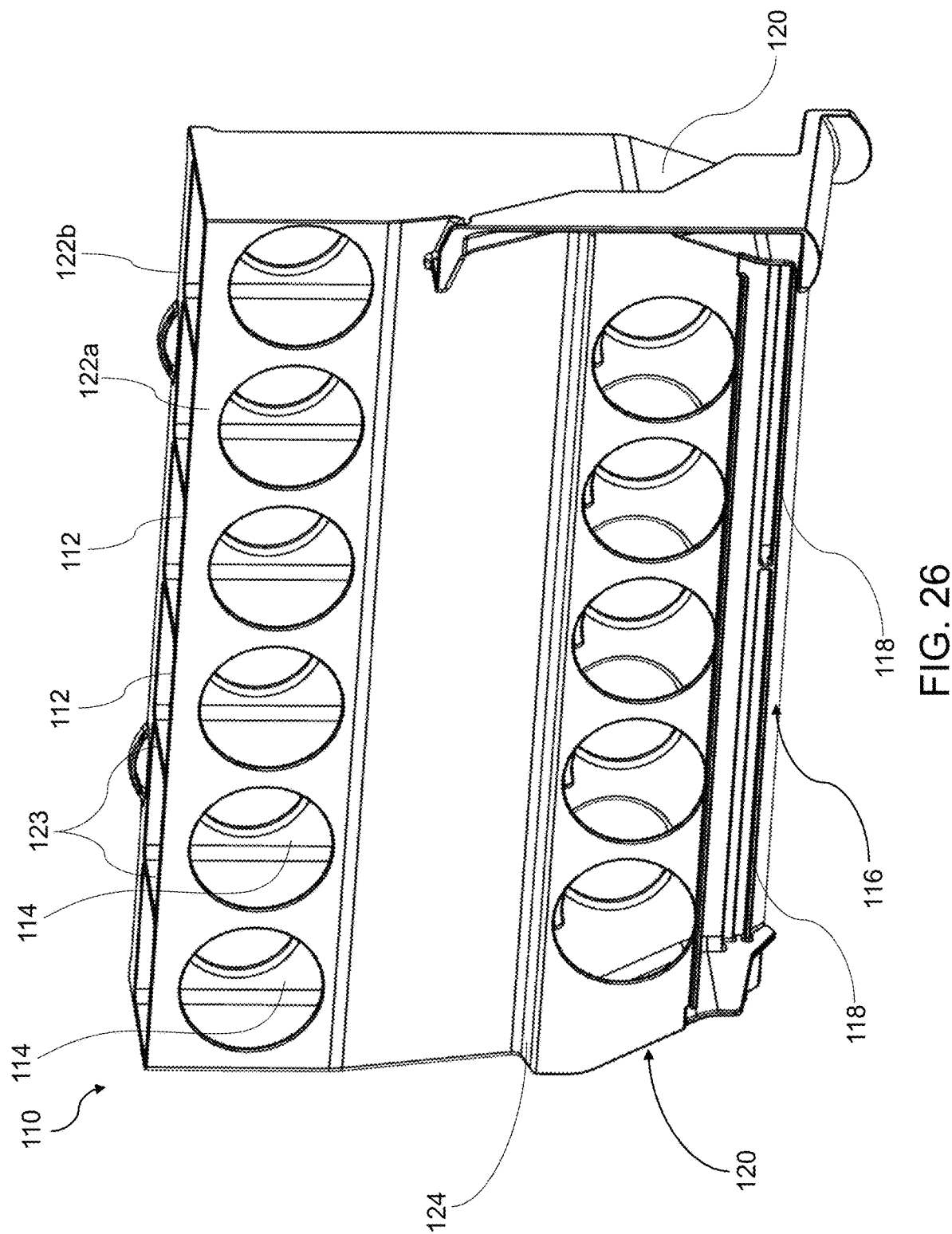
FIG. 26 is a perspective view of a chute structure for a cabinet according to the principles of the present disclosure.

With reference to FIG. 26, the chute structure 110 includes a plurality of vertical chutes 112 that extend vertically from the first level 30*a* to the second level 30*b*. The chutes 112 are configured so that the outlets 58 of the containers 26*a* on the first level 30*a* are received within the chutes 112 and the outlets 58 of the containers 26*b* on the second level 30*b* aligned between adjacent chutes 112. Accordingly, when ingredients are dispensed from the outlets 58 of the containers 26*a* on the first level 30*a*, the ingredients are guided through the chutes 112 and between adjacent ones of the outlets 58 of the containers 26*b* on the second level 30*b* to one of the bins 28 in the conveyor 24.

The chute structure 110 also includes a plurality of apertures, which define respective docking stations 114 for receiving the gear 76 at the second end 68 of the auger 44. As discussed below, the gear 76 of each auger 44 may interface with one of the drives 36 through the docking station 114 so that the auger 44 can be rotated by the drive 36 through the chute structure 110.

The bottom of the chute structure 110 may include a manifold 116 configured to receive air from the heat exchanger 21, as discussed in greater detail below. As shown, the manifold 116 includes one or more horizontal outlet slots 118 extending across the width of the chute structure 110. When pressurized air is received within the manifold 116, the air flows through the outlet slots 118 and forms a thin sheet of air or an air curtain at the bottom of the chute structure 110. Optionally, the manifold 116 may include a flow director 117 configured to direct a flow of air from the conduits 200 to the slots 118. As shown in FIG. 9B, the flow director 117 is formed as an angled lower surface of the manifold 116 between a portion of the manifold 116 receiving the conduits 200 and the slots 118. The flow director 117 may direct the air from the conduits 200 so that it flows out of the slots 118 at a desired angle to form the air curtain. As discussed below, this air curtain minimizes the flow of refrigerated air between the cabinet 22 and the conveyor 24.

The chute structure 110 may also include a pair of shoulders 120 formed on opposite sides of the chute structure 110. As shown, the shoulders 120 provide horizontal support surfaces upon which the chute structure 110 can be supported within the cabinet 22. The cabinet 22 includes a pair of pins (not shown) extending from the rear wall of the cabinet 22, which spaced apart from each other by a distance corresponding to the distance between the shoulders. The chute structure 110 can be removably installed within the cabinet 22 by resting the shoulders 120 of the chute structure 110 upon the pins.

With continued reference to FIGS. 8 and 26, the chute structure 110 may include a front panel 122*a* and a rear panel 122*b* spaced apart from one another via dividers 123, the front panel 122*a*, rear panel 122*b* and dividers 123 cooperating to define the chutes 112. The front panel 122*a* and rear panel 122*b* both define the apertures that comprise the docking stations 114. Thus, the second end 68 of the auger 44 extends through the front panel 122*a* and the rear panel 122b to join the coupler 46 at a rear surface of the rear panel 122b. When ingredients are moved from the containers 26a, 26b via the augers 44, the ingredients can drop into the chutes 112 free of interference from the coupler 46. The front panel 122a of the chute structure 110 may include a bent or shaped portion that defines an offset 124. As shown in FIG. 8, the offset 124 allows ingredients traveling through the chute structure 110 from the upper containers 26a to travel or be guided past the outlets 58 of the lower containers 26b without interfering or mixing with ingredients from the lower containers 26b.

The cabinet 22 may optionally include one or more stabilizers on each level 30a, 30b for securing the container 26a, 26b within the racks 32. The stabilizers may be implemented as stabilizer bars extending across the width of the cabinet 22 in an upper portion of each level 30a, 30b. Each of the stabilizer bars may be vertically displaceable (i.e., can be lifted) to allow the containers 26a, 26b to be inserted beneath the stabilizer. For example, the stabilizer bars may be rotatably attached at opposite sides of the cabinet 22 so that the stabilizer bar can be lifted when one of the containers 26a, 26b is inserted, and then lowered onto the lid 42 of the inserted container 26a, 26b to secure the container 26a, 26b within the rack 32. In other examples, the stabilizer may be configured as a plurality of individual stabilizers each corresponding to a respective one of the containers 26a, 26b.

Figure 16:
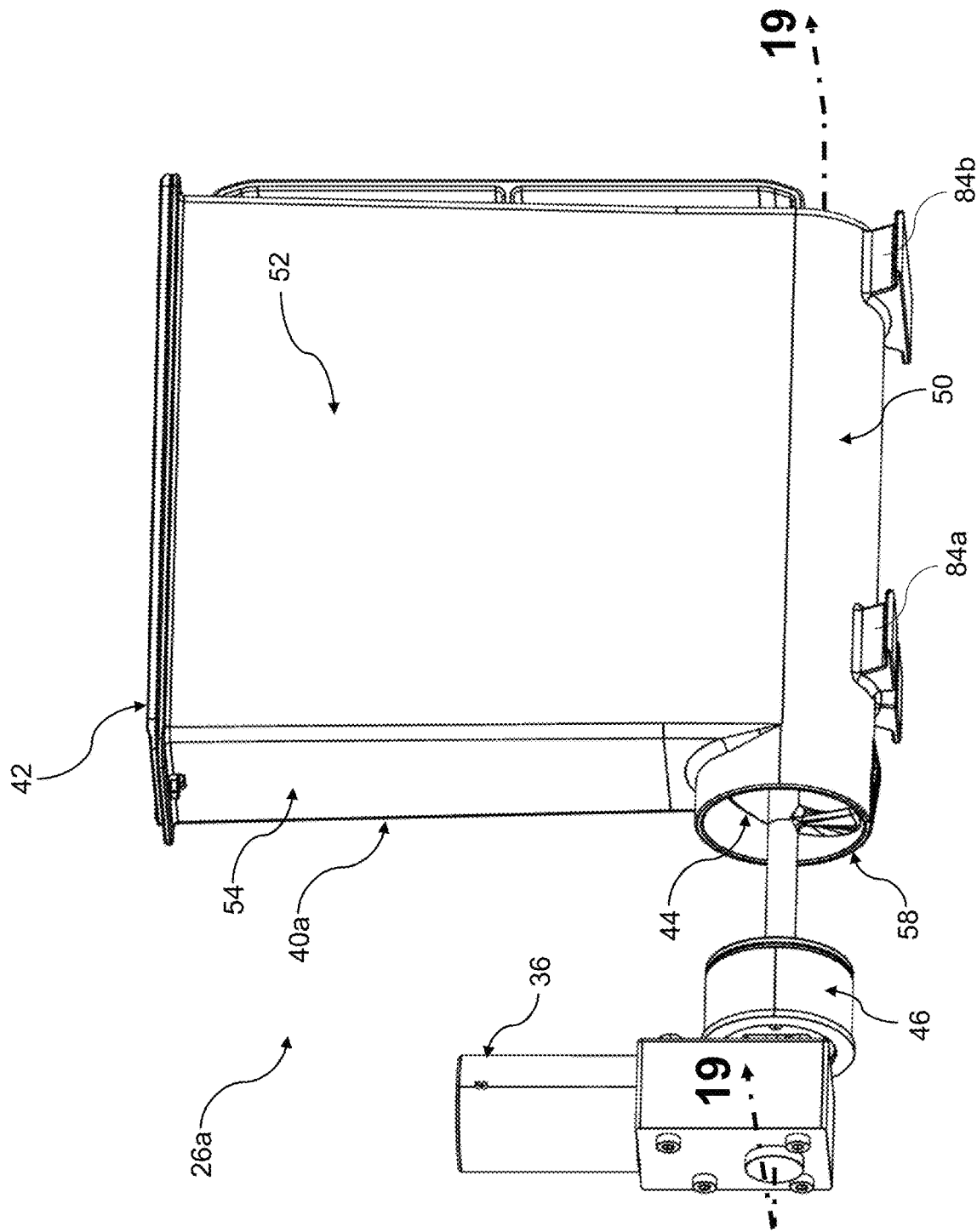
FIG. 16 is a perspective view of a container according to the principles of the present disclosure.
Figure 17:
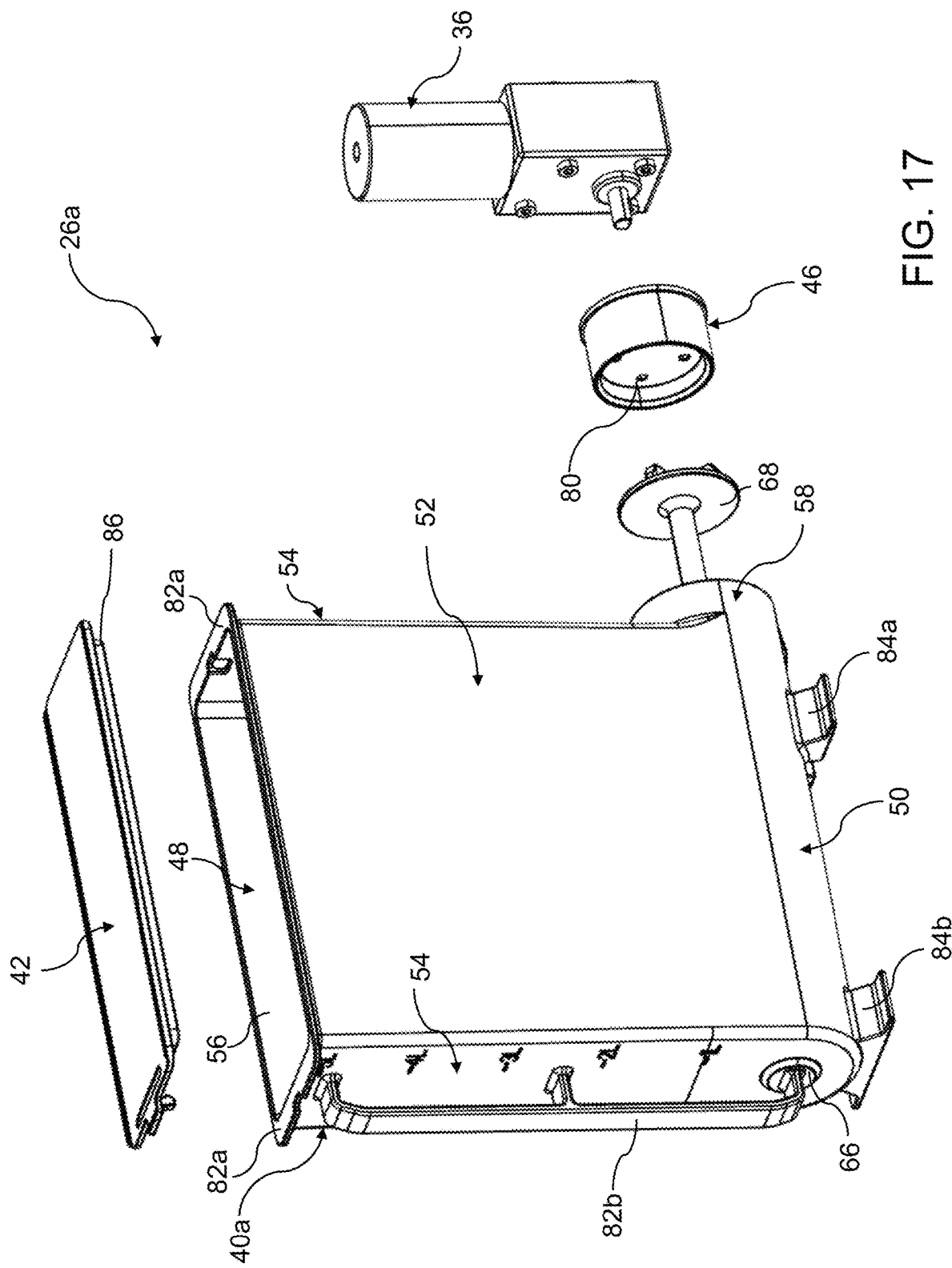
FIGS. 17 and 18 are exploded perspective views of the container of FIG. 16.

Referring to FIG. 6, at the rear of the cabinet 22 a plurality of the drives 36 are arranged to interface with each of the docking stations 114 of the chute structure 110. As best shown in FIGS. 9, 16, and 17, each drive 36 is configured as a right-angle drive including a motor and a gear reducer having an output shaft attached to the coupler 46. Each of the drives 36 is positioned so that the respective coupler 46 is positioned adjacent to one of the docking stations 114 on a back side of the chute structure 110. Thus, when the gear 76 of one of the containers 26a, 26b is inserted through the docking station 114, the gear 76 will engage one of the couplers 46 so that the gear 76 and auger 44 can be rotated by the drive 36.

Referring again to FIGS. 2-8, the handling unit 18 includes the conveyor 24 disposed beneath the cabinet 22. The conveyor 24 is configured to translate the bins 28 beneath the cabinet 22 for loading and unloading of the bins 28 and for dispensing the ingredients from the containers 26a, 26b into the bins 28. Generally, the conveyor 24 provides two-axis translation of the bins 28 beneath the cabinet 22 so that the bins 28 can move in and out, and left and right. With reference to FIGS. 10-15, the cabinet 22 of the handling unit 18 has been sectioned away to more clearly show the structure and operation of the conveyor 24. Thus, while the cabinet 22 and the conveyor 24 may be formed as integral portions of the handling unit 18, in some example the conveyor 24 may be separately constructed and attached to the cabinet 22.

As shown in FIGS. 10-13, the conveyor 24 may be described as including a staging region 130 and a dispensing region 132. Generally, the staging region 130 is configured for receiving and presenting the bins 28 at the front of the handling unit 18, while the dispensing region 132 is configured for translating the bins 28 beneath respective ones of the containers 26a, 26b for dispensing of the ingredients. As discussed in greater detail below and shown in FIGS. 13 and 14, the conveyor 24 includes a multi-axis positioning system 134 disposed within the staging region 130 and the dispensing region 132. The positioning system 134 is operable to translate the bins 28 along and between the staging region 130 and the dispensing region 132.

The dispensing region 132 includes an access opening 136 disposed at the front of the handling unit 18 beneath the cabinet 22. Unlike the cabinet 22, which includes a closure or door 126 for selectively enclosing the cabinet 22, the staging region 130 may be continuously accessible through the access opening 136 so that the bins 28 can be provided to or removed from the staging region 130 without interruption.

Figure 10:
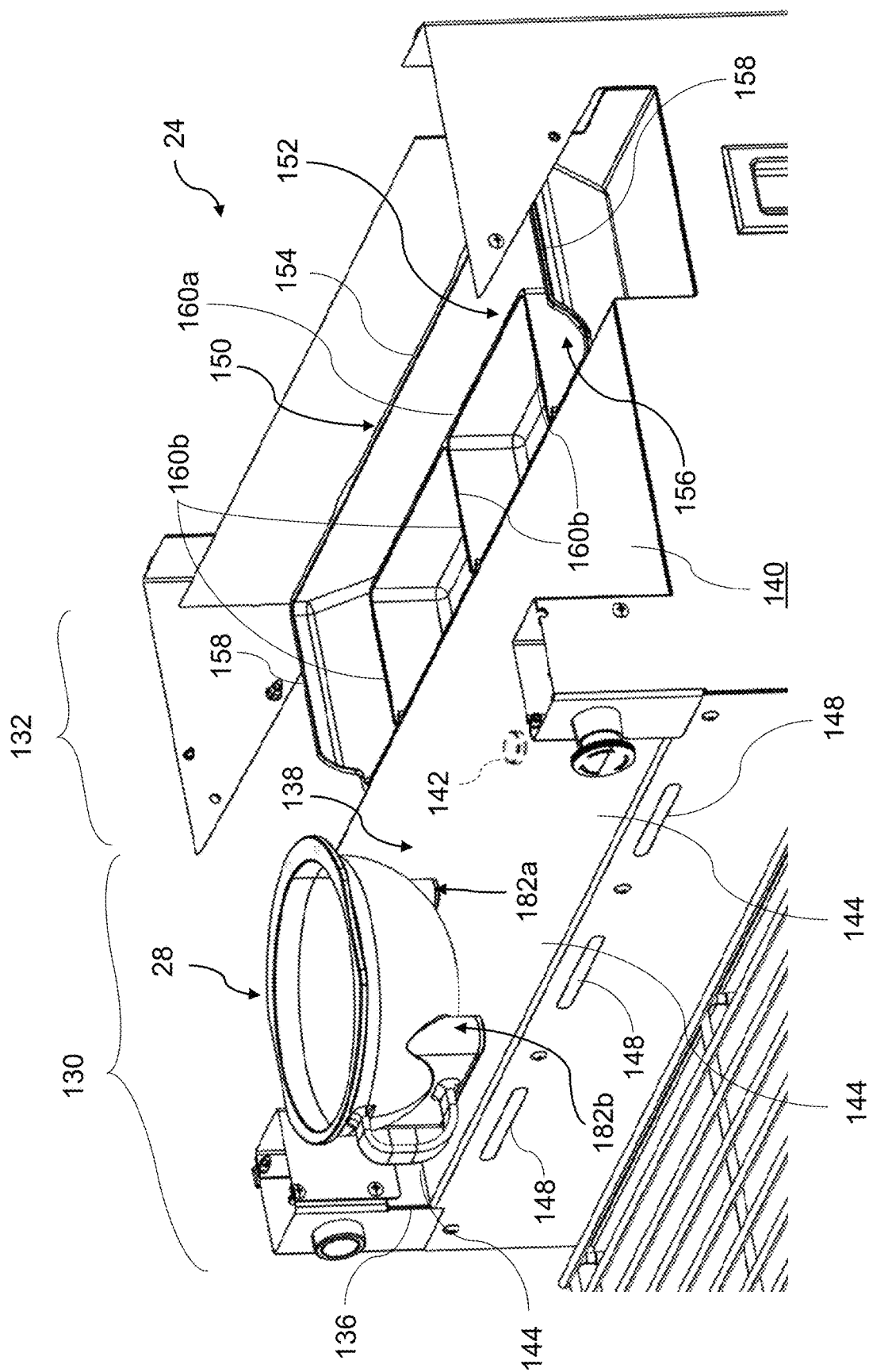
FIGS. 10-12 are perspective views of a conveyor according to the principles of the present disclosure.
Figure 11:
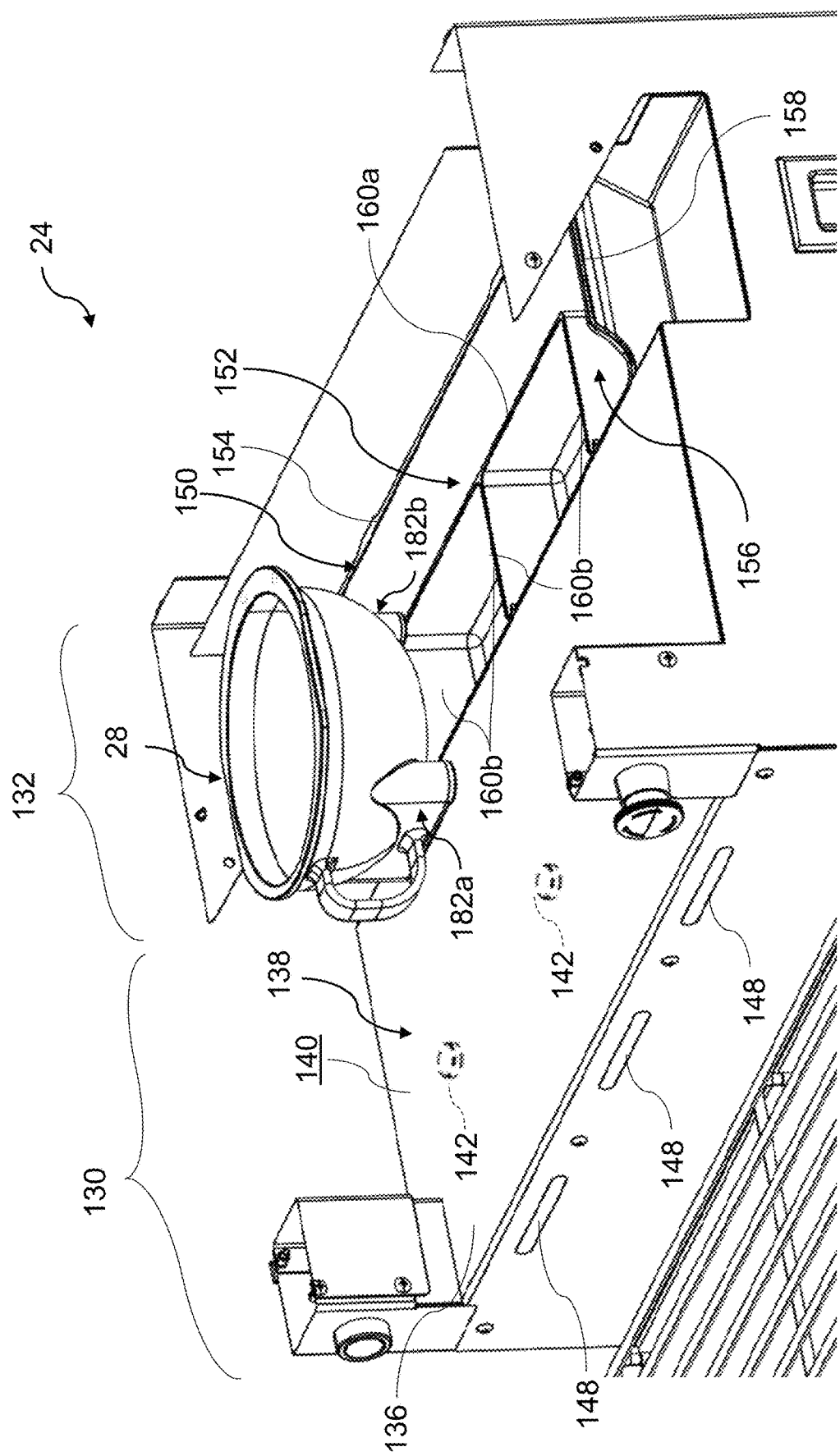
Figure 12:
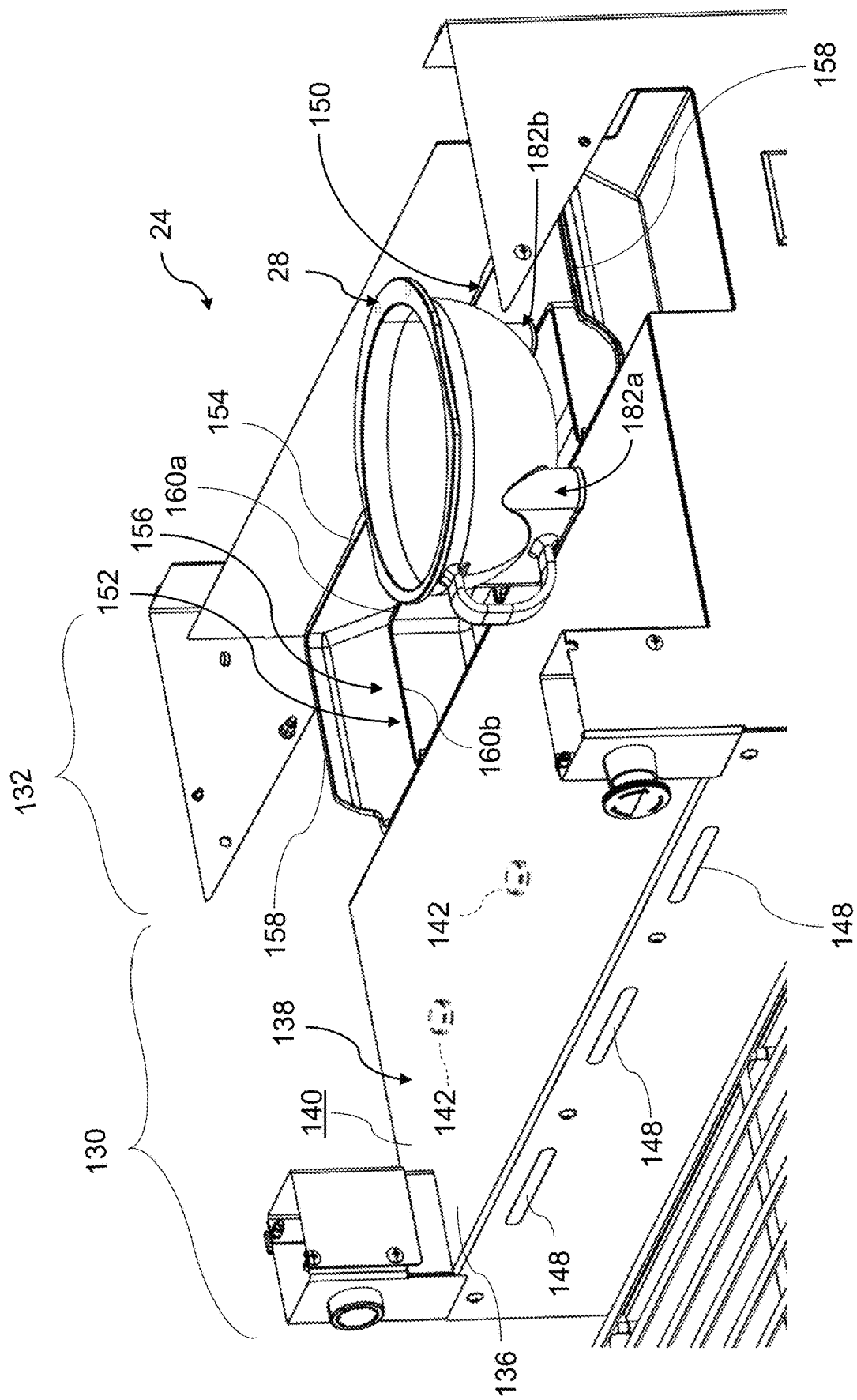

The staging region 130 further includes a support bed 138 upon which the bins 28 are supported. As shown in FIGS. 10-12, the bins 28 are configured to be slidingly translated along the top support surface 140 of the support bed 138 from the access opening 136 to the dispensing region 132. Accordingly, the support bed 138 is formed of a durable material having a relatively low coefficient of friction. For instance, the support bed 138 may include a polymeric material, such as Delrin® acetal homopolymer (Polyoxymethylene POM), ultra-high molecular weight (UHMW) polyurethane, or the like. Additionally or alternatively, the support surface 140 of the support bed 138 may be stainless steel and/or include a low-friction coating or lubricant.

Optionally, the support bed 138 may include one or more catches 142 for releasably securing the bins 28 within the staging region 130. In the illustrated example, the catches 142 are configured as magnets 142 disposed beneath the support surface 140, whereby a magnetic force of each magnet 142 is configured to selectively engage a corresponding magnet or magnetic material disposed on the bottom of one of the bins 28. The magnet 142 may be embedded within the support bed 138 flush with or below the support surface 140, or may be attached to an opposite side of the support bed 138 from the support surface 140. Accordingly, as the bins 28 are passed over the support surface 140, the magnet 142 may engage or "catch" the corresponding magnetic element on the bottom of the bin 28 to secure the position of the bin 28. In other examples, mechanical catches may be implemented, such as detents or mechanical fasteners.

The staging region 130 is configured with a plurality of staging stations 144 each configured to receive one of the bins 28. Each of the stations 144 corresponds with one of the catches 142. In other words, the magnets 142 are positioned so to locate the bins 28 at the respective staging stations 144. In the illustrated example, the staging region 130 includes three stations 144 for receiving three bins 28. However, more or less stations 144 may be included. As best shown in FIG. 5, the staging region 130 may include a plurality of guide rails 146 defining boundaries between adjacent ones of the stations 144. In the illustrated example, the guide rails 146 are suspended from a top side of the conveyor 24 and are configured to interface with an upper portion of each bin 28 to limit lateral (i.e., side-to-side) movement of the bins 28. In other examples, guide rails 146 may be attached to the support bed 138.

The conveyor 24 may include a plurality of status indicators 148 associated with each of the staging stations 144. The status indicators 148 may be illuminable in multiple modes including different colors and/or flashing patterns, where a first mode is displayed to indicate that the respective staging station 144 is empty, a second mode is displayed to indicate that the station 144 has been loaded with an empty bin 28 and is awaiting dispensing instructions, a third mode is displayed to indicate that the system 10 has been provided with dispensing instructions for filling the bin 28 in the station 144, a fourth mode is displayed to indicate that the bin 28 of the station 144 is being filled, and a fifth mode is displayed to indicate that the dispensing instructions have been completed so that the bin 28 is filled with ingredients and is ready for retrieval from the staging region 130. The status indicators 148 may be depressed by a user to signal to the system 10 that one or more steps have been completed. For example, the status indicators 148 may be depressed when an empty bin 28 is placed into a staging station 144 so that the system 10 knows it can execute dispensing instructions for the respective station 144.

Optionally, the system provides auto bin presence sensing, where the system determines presence of a bin 28 at a staging station 144 and determines a state of the bin 28 based on sensor inputs. For example, the system may determine that no bin 28 is present in the staging station 144 and indicate that the staging station 144 is empty. The system may determine and indicate that a bin 28 is present in the staging station 144 and that the bin is empty (e.g., via an imaging sensor or via a scale integrated in the conveyor 24). The system may further determine that the bin 28 associated with the staging station 144 is being filled. The system may determine that the bin 28 has been returned to the staging station 144 and is filled with ingredients.

With continued reference to FIGS. 10-12, the dispensing region 132 of the conveyor 24 includes a drip pan 150 positioned beneath the outlets 58 of the containers 26a, 26b and the chutes 112. Accordingly, the drip pan 150 is generally configured to catch any ingredients that may be dispensed from the containers 26a, 26b and are not received within one of the bins 28. The drip pan 150 may be described as including a base 152 and a peripheral wall 154 that cooperate to form a cavity 156 for receiving the ingredients. The peripheral wall 154 may define a pair of handles 158 formed at opposite sides of the drip pan 150. In addition to providing grip points for installing and removing the drip pan 150 from the dispensing region 132 of the conveyor 24, the handles 158 protrude from each side to define alignment features for ensuring proper positioning of the drip pan 150 relative to the conveyor 24. For instance, the handles 158 are configured to abut corner posts of the conveyor 24.

The base 152 of the drip pan 150 includes a plurality of rails or tracks 160a, 160b for supporting a portion of the bin 28 over the drip pan 150 when the bin 28 is moved to the dispensing region 132. In the illustrated example, the tracks 160a, 160b include a laterally-extending main track 160a extending across a width of the base 152 within the cavity 156 and a plurality of connector tracks 160b extending between the support bed 138 of the staging region 130 and the main track 160a.

The main track 160a is configured to support the bottom of the bin 28 within the cavity 156 as the bin 28 moves in a lateral direction through the dispensing region 132. For example, the bin 28 may be translated laterally through the dispensing region 132 by the positioning system 134 to position the bin 28 beneath different ones of the containers 26a, 26b. Here, the bottom of the bin 28 slides along a top edge of the main track 160a from side to side.

The connector tracks 160b are configured to link the support surface 140 of the support bed 138 to the main track 160a to facilitate movement of the bins 28 between the staging region 130 and the dispensing region 132. Accordingly, top edges of the connecting tracks 160b are flush with the support surface 140 and the top edges of the main track 160a. Each of the connecting tracks 160b corresponds to one of the staging stations 144. Thus, each of the bins 28 transitions between a particular staging station 144 and the main track 160 along a respective connecting track 160b. As illustrated in FIGS. 10-12, one of the bins 28 is shown transitioning from a first station 144 (FIG. 10), along the connecting track 160b to the main track 160a (FIG. 11), and then along the main track 160a (FIG. 12).

Figure 15:
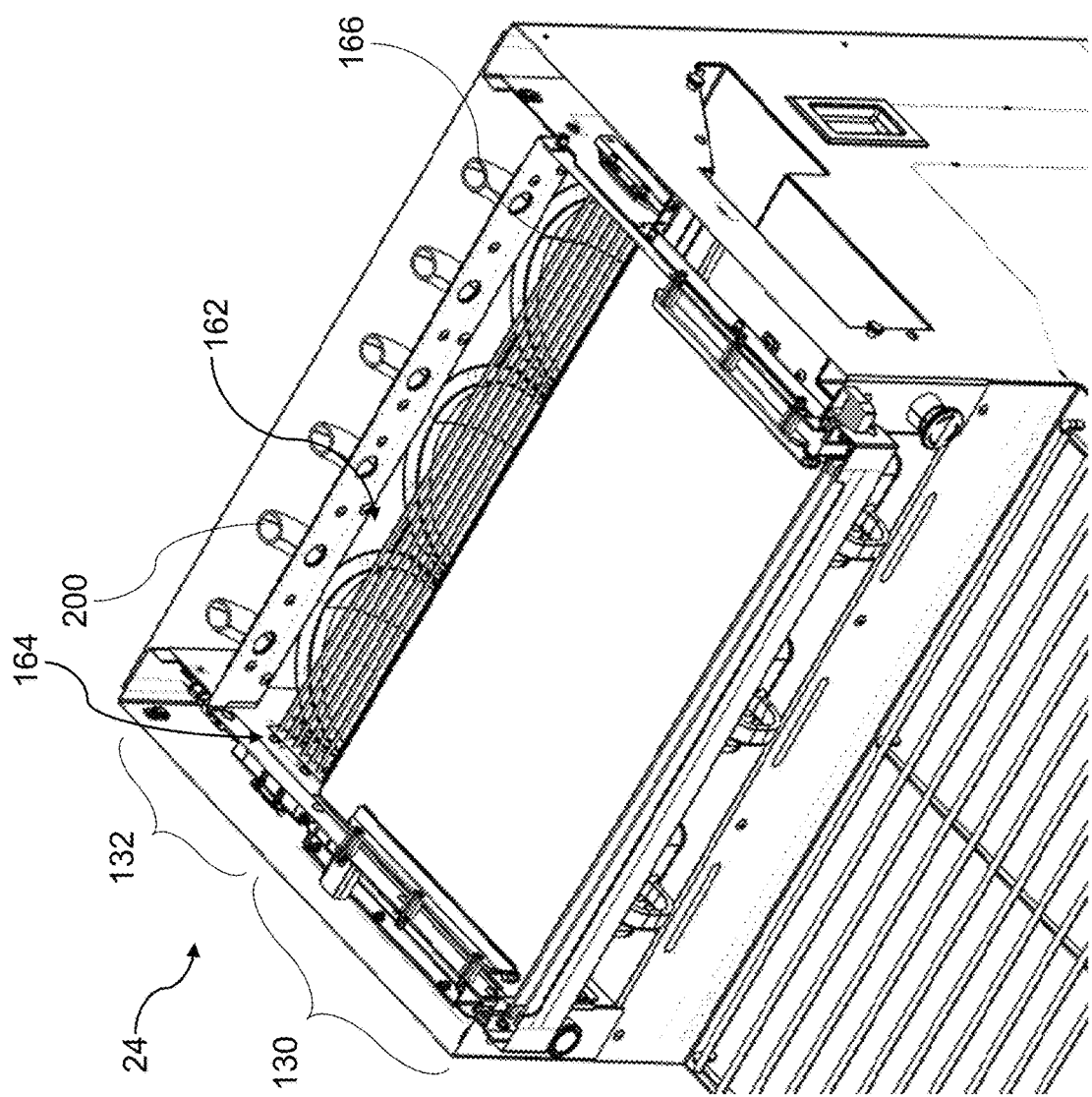
FIG. 15 is a section view of the handling unit of FIG. 3, showing a transition region between a cabinet and a conveyor of the handling unit.

Referring to FIG. 15, a cross-sectional view is shown where the cabinet 22 of the handling unit 18 has been sectioned off to show a transition from the cabinet 22 into the conveyor 24. As shown, the conveyor 24 includes a dispenser opening 162 formed in a rear portion of the conveyor 24, beneath the chute structure 110 and above the drip pan 150. In use, the ingredients drop through the dispenser opening 162 from the containers 26a, 26b and into the bins 28. As discussed above, the air curtain may be formed across the dispenser opening by exhausting air from the refrigeration unit 20 via the heat exchanger 21 through outlet slots 118 of the chute structure 110 disposed adjacent to the dispenser opening 162.

The conveyor 24 may include one or more sensors disposed adjacent to the dispenser opening 162 for measuring the flow of ingredients through the dispenser opening. In the illustrated example, the conveyor 24 includes a pair of area sensors 164 disposed on opposite sides of the dispenser opening 162. As shown in FIG. 15, the area sensors 164 form a sensor array 166 or grid including a plurality of sensor beams. The resolution of the sensor beams in the sensor array 166 may be selected depending on a desired degree of accuracy. In the illustrated example, the sensor beams are emitted across the width of the cabinet 22 and along a length of the dispenser opening 162. However, the cabinet 22 may alternatively or additionally include area sensors 164 disposed on the front and back sides of the dispenser opening 162, such that sensor beams are projected across the width of the dispenser opening 162. To provide bi-directional measurement, the sensor array 166 may include sensor beams extending side-to-side and front-to-back, thereby forming a grid. As described in greater detail below, when ingredients fall through the sensor array 166, the sensor beams are interrupted or broken. Quantities and durations of broken beams in the sensor array 166 can then be used to calculate an amount of an ingredient that has been dispensed to the conveyor 24 and/or estimate a volume of ingredient dispensed.

Figure 13:
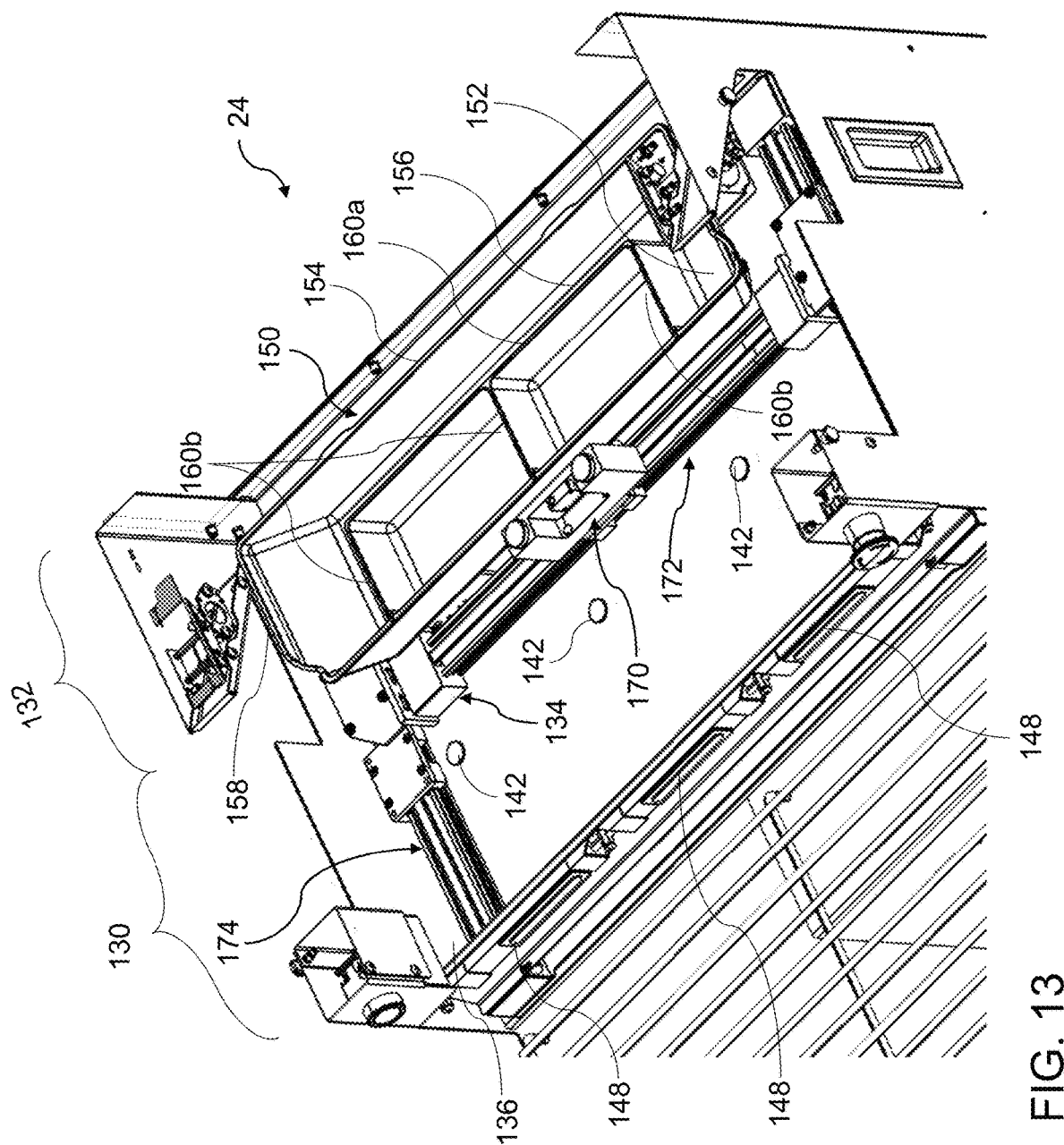
FIGS. 13 and 14 are perspective views of the conveyor of FIGS. 10-12, showing a support bed removed to expose a multi-axis positioning system of the conveyor.
Figure 14:
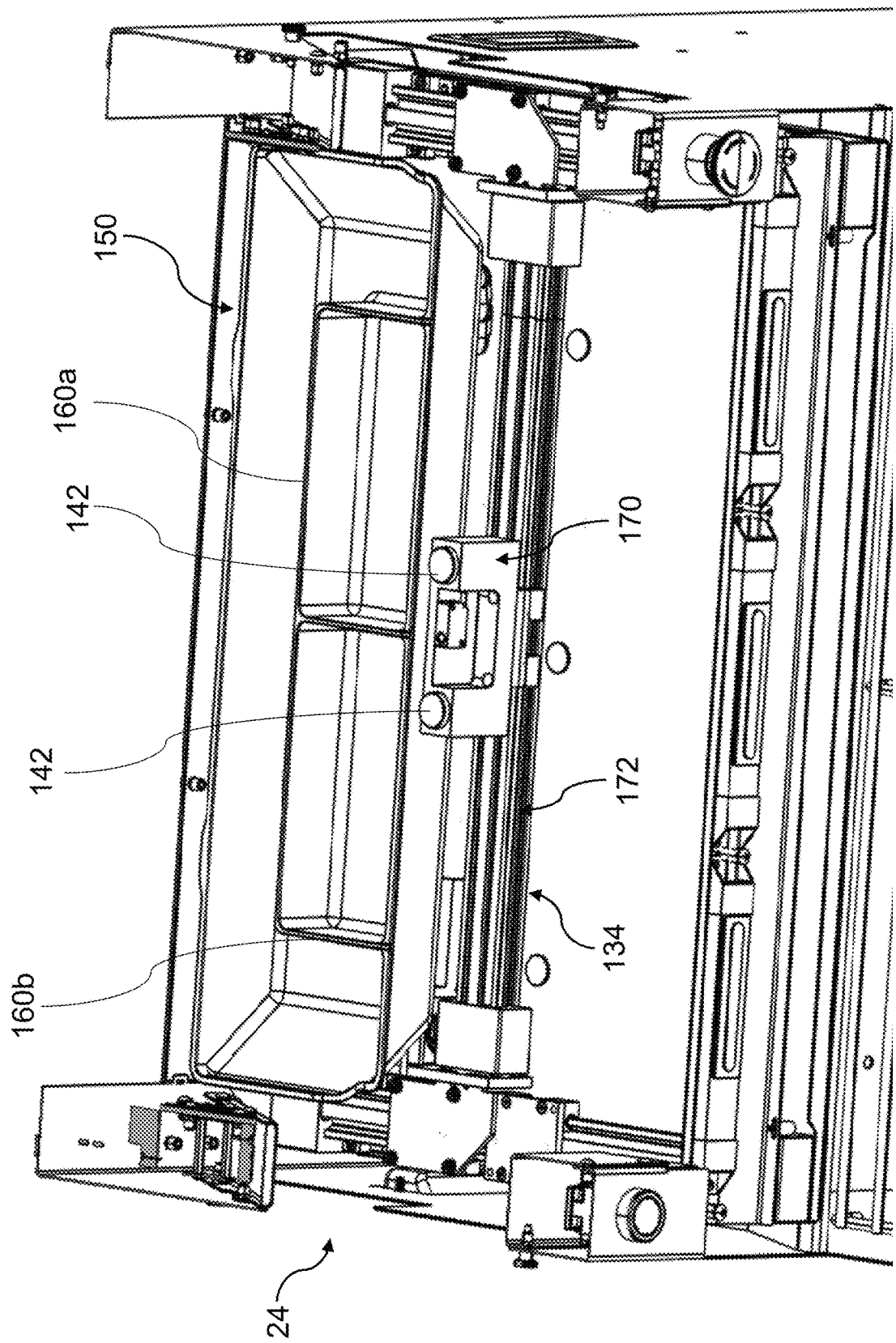

Turning now to FIGS. 13 and 14, the positioning system 134 includes a carriage 170 slidably mounted to a bridge rail 172, which is slidably mounted between a pair of runway rails 174 on opposite sides of the conveyor 24. Accordingly, the carriage 170 is configured for two-axis movement along the support bed 138 to move the bins 28 in a lateral direction (side-to-side) and in a fore-aft direction (front-to-back).

The carriage 170 is supported by the bridge rail 172 immediately adjacent to a bottom side of the support bed 138 and includes a pair of the magnets 142. The magnetic force of each of these magnets 142 is sufficient to extend through support bed 138 and to engage magnetic elements disposed on the bottom of each of the bins 28. Accordingly, the carriage 170 may be positioned beneath respective ones of the bins 28 to engage the magnets 142 of the carriage 170 with the magnetic elements 142 on the bottom of the bins 28. Once engaged, the carriage 170 is moved beneath the support bed 138 and the bin 28 is drawn along the support surface 140 by the magnetic force of the carriage 170. The use of the magnetic carriage 170 beneath the support bed 138 advantageously allows the mechanical components of the positioning system 134 to be concealed within the conveyor 24, thereby preventing the positioning system 134 from becoming contaminated with residue or debris from the ingredients.

Figure 27:
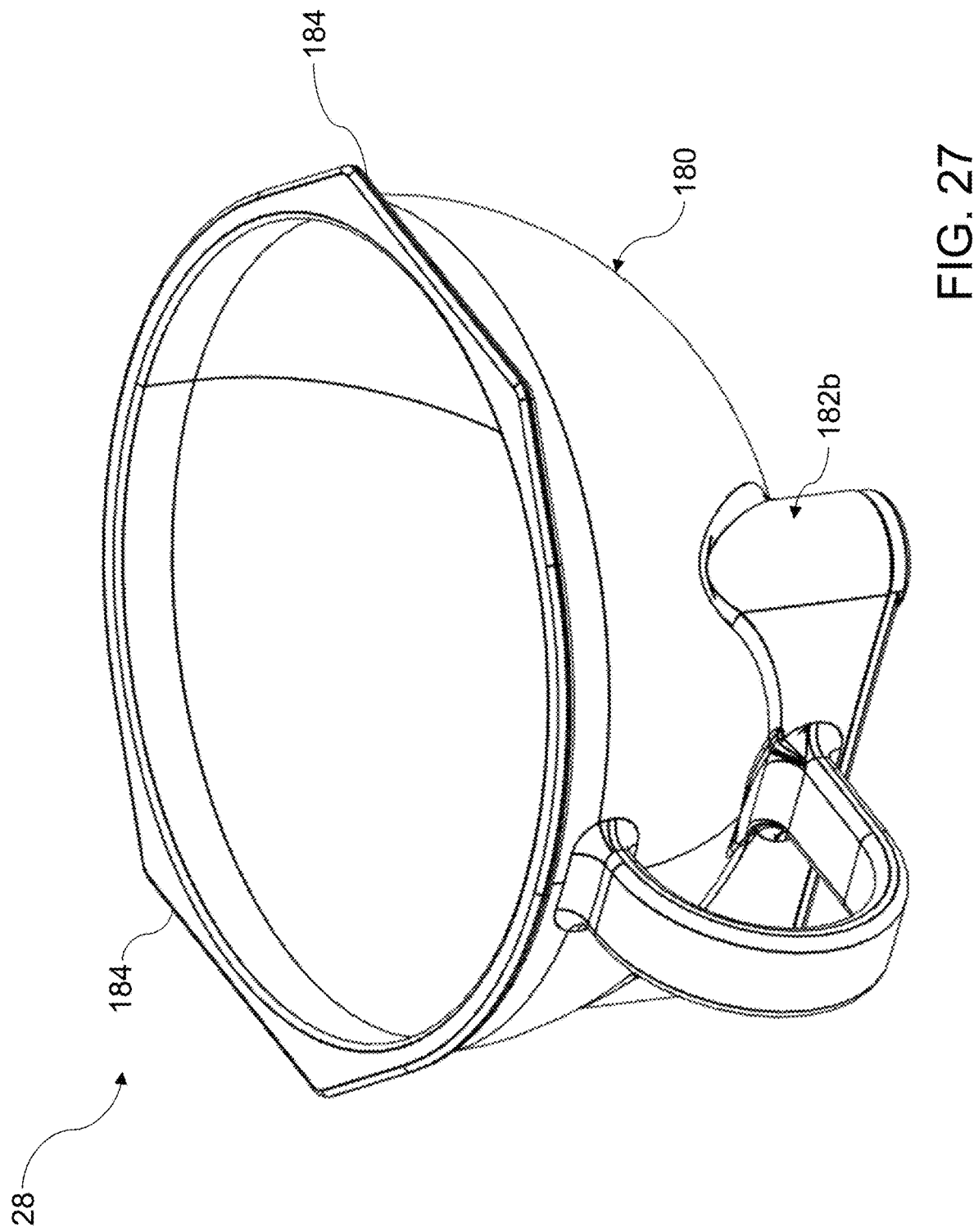
FIGS. 27-29 are perspective views of a bin according to the principles of the present disclosure.
Figure 28:
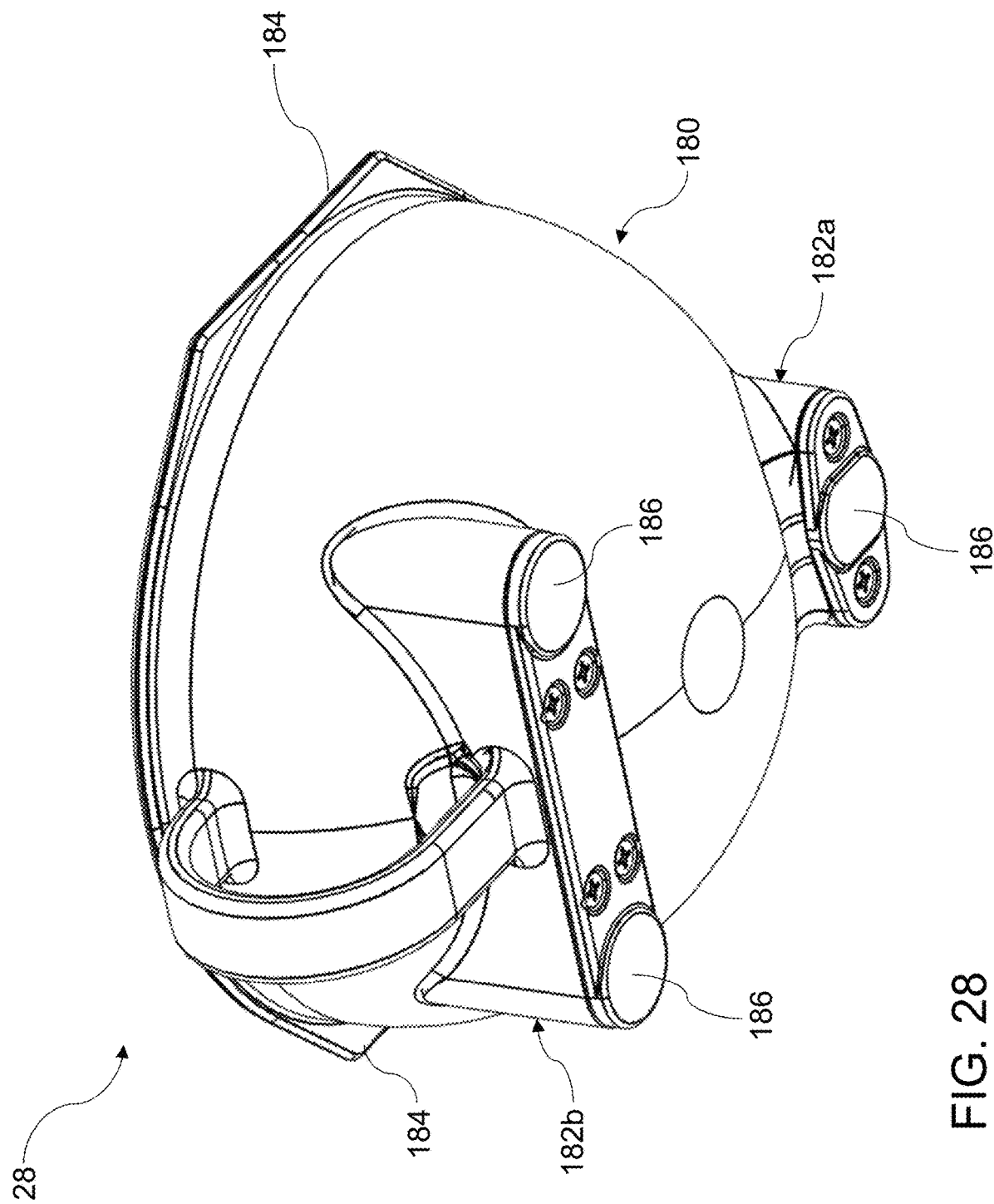
Figure 29:
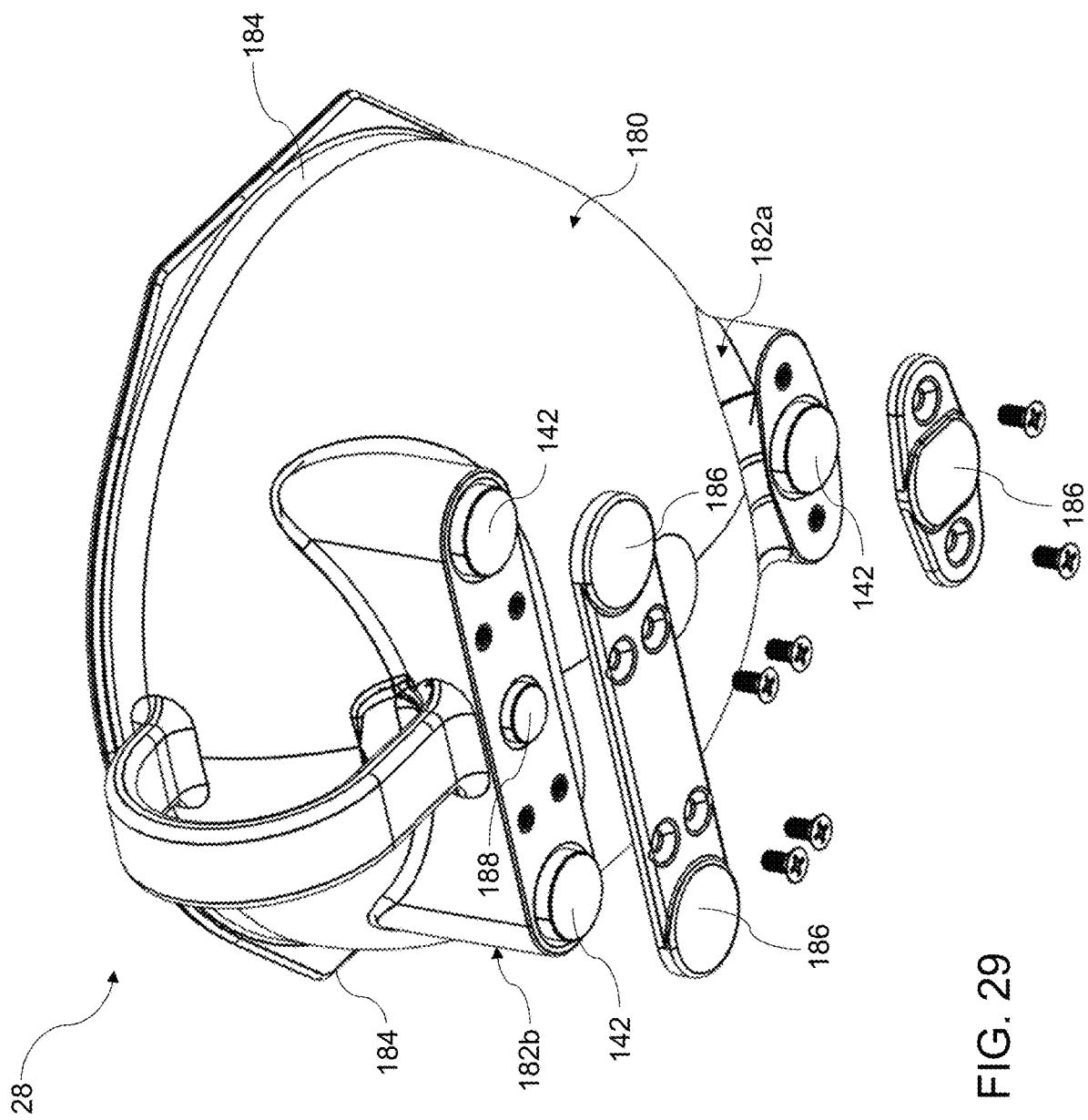

With reference to FIGS. 27-29, the bins 28 are configured for movement along the support bed 138. The bin 28 includes a bowl 180 for receiving the ingredients, and a pair of supports 182a, 182b for supporting the bowl 180 on the support bed 138 and the tracks 160a, 160b. As shown in FIG. 28, the bowl 180 is hemispherical in shape and includes a pair of bumpers 184 formed on opposite sides for guiding the bin 28 between the guide rails 146 of the staging region 130. Here, the bumpers 184 are formed as flats on opposite sides of the bowl 180. Optionally, other shapes of bowls may also be used, such as polygonal or irregular shaped bowls.

The supports 182a, 182b protrude downwardly from the bowl 180 and provide sliding surfaces for the bin 28. As shown, the supports 182a, 182b include a first support 182a at a first end (e.g., the front) of the bowl 180 and a second support 182b at the opposite end (e.g., the rear) of the bowl 180. Each of the supports 182a, 182b includes one or more feet 186 including a material having a low coefficient of friction to facilitate sliding along the support surface 140. In the illustrated example, the first support 182a includes one foot 186 and the second support 182b includes a pair of feet 186. As shown in FIG. 29, each of the feet 186 may include one of the magnets 142 or a magnetic material embedded therein. As discussed above, the magnets 142 of the feet 186 are selectively engaged with the magnets 142 of the support bed 138 or the carriage 170 to secure or move the bin 28 within the conveyor 24. The supports 182a, 182b may also include one or more sensor magnets 188 for tripping position sensors located within the conveyor, such as beneath the support bed 138.

With reference to FIG. 6, the refrigeration unit 20 is disposed below the cabinet 22, and delivers refrigerated air to the interior of the cabinet 22 and the dispensing region 132 of the conveyor 24 via the heat exchanger 21. As shown in FIGS. 6-9B, the heat exchanger 21 is configured to provide a flow of refrigerated air to one or more conduits 200 that are routed to the manifold 116 below each of the chutes 112. As shown, each of the conduits 200 extends from a first end adjacent to an upper portion of the cabinet 22 to a second end connected to the manifold 116 of the chute structure 110. As discussed above, the manifold 116 includes one or more horizontally-extending outlet slots 118 for exhausting the refrigerated air received from the conduits 200.

Figure 9A:
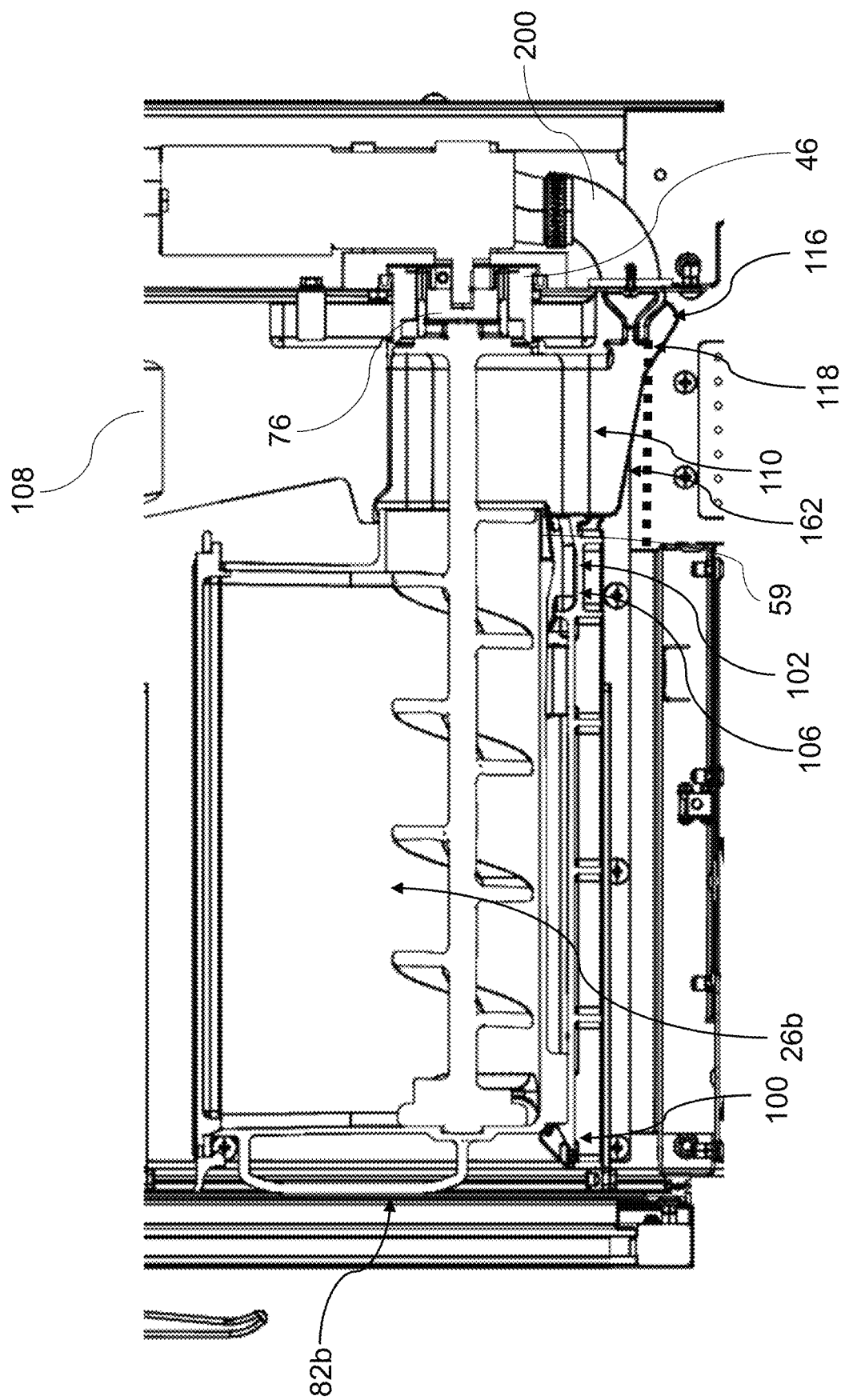
FIGS. 9A and 9B are an enlarged cross-sectional views of examples of the dispenser of FIG. 3, taken at Area 9 in FIG. 7.
Figure 9B:
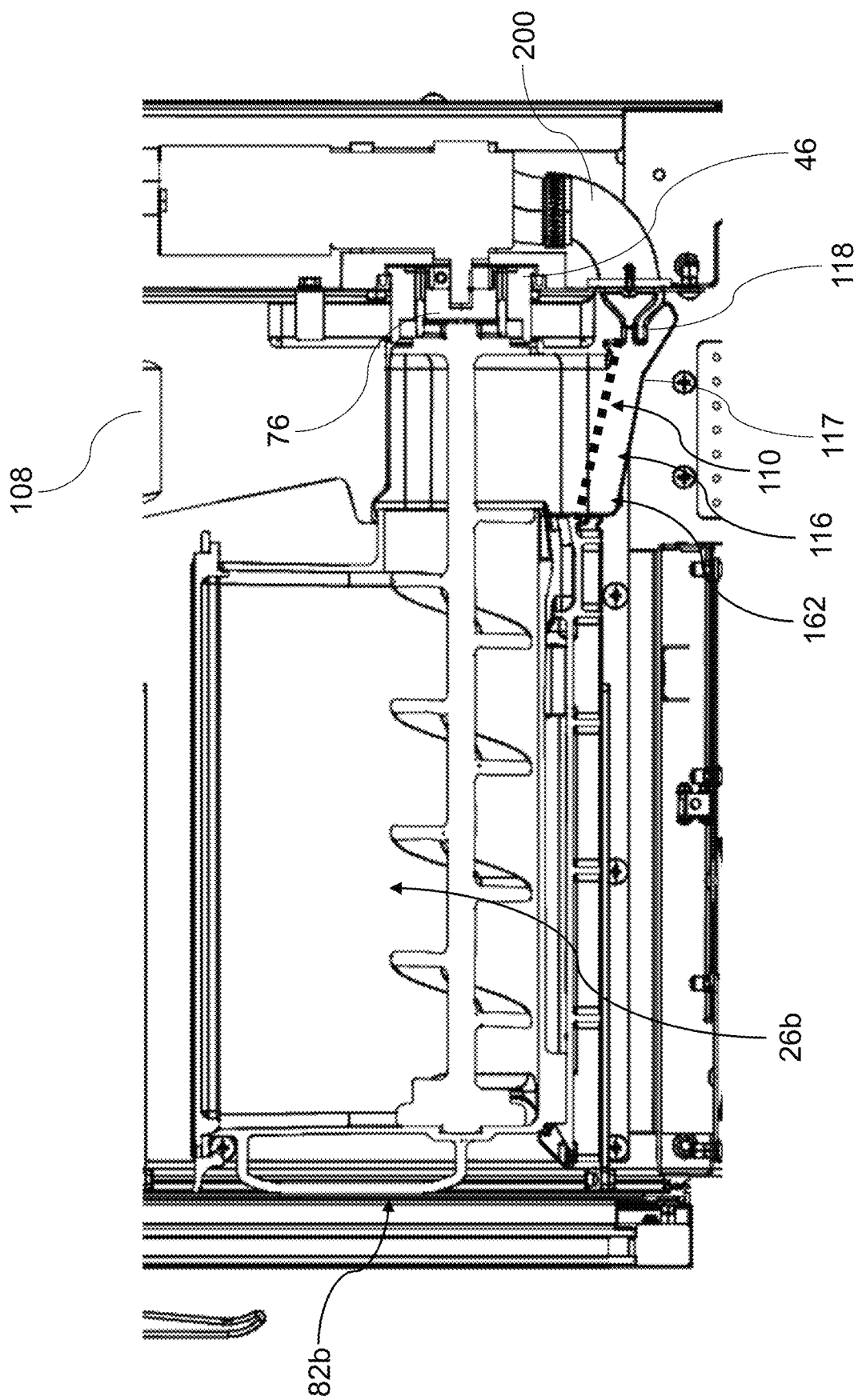

As shown in the enlarged cross-sectional views of FIGS. 9A and 9B, the slots 118 of the manifold 116 are aligned with the dispenser opening 162 formed between the cabinet 22 and the dispenser region 132 of the conveyor 24. Here, the outlet slots 118 exhaust a curtain (shown as thick dotted line in FIGS. 9A and 9B) of refrigerated air across the dispenser opening 162. The air curtain formed by the outlet slots 118 provides a barrier between the ambient air in the conveyor 24 and the refrigerated air within the cabinet 22, thereby improving energy efficiency of the cabinet 22. The air exhausted from the slots 118 flows across the dispenser opening 162 and along a lower portion of the cabinet 22 towards the front of the cabinet 22 (i.e., adjacent to the door 126). The refrigerated air then flows vertically from the lower portion of the cabinet 22 to an upper portion of the cabinet 22 and is returned to the climate control unit 20 through the vent 202 formed in the upper-front portion of the cabinet 22. Accordingly, the refrigerated air flows from the bottom-rear of the cabinet 22 to the top-front of the cabinet 22. This promotes a uniform flow of refrigerated air from bottom to top and from front to back. The uniform flow minimizes the range of temperatures at different points in the cabinet.

Optionally, the heat exchanger 21 may include one or more circulation fans and a pair of the vents 202 for circulating refrigerated air from the refrigeration unit 20. Here, the circulation fans are provided in a central region at the top of the cabinet 22 and the vents 202 are positioned at opposite ends (e.g., front and back) at the top of the cabinet 22. Accordingly, the refrigerated air will be circulated in a bi-directional manner between the circulation fans in the center of the cabinet 22 and the vents 202 on opposite sides of the circulation fans. In some examples, the circulation fans may provide a flow of the refrigerated air to the central portion of the cabinet 22, which then flows towards the bottom of the cabinet in the central portion and then back up to each of the vents 202 along the front and back of the cabinet 22. Conversely, the flow of air may be reversed so that air is pulled through the vents 202 and into the circulation fans.

In the illustrated example, the system controller 16 includes an order manager 320 and a user interface 322 for monitoring and operating the dispenser 12. While the illustrated system controller 16 is shown as being incorporated directly on the system 10, as discussed above the system controller 16 may be remotely located from the dispenser 12. For example, the system controller 16 may be incorporated on an on-site central control terminal, such as a point-of-sale (POS) system, or at an off-site control center.

Additionally or alternatively, the system 10 may include or be connected to a remote system for monitoring and operating the dispenser 12. In this scenario, the dispenser controller 17 would receive dispensing instructions 332 from the system controller 16 and would automatically execute the instructions 332 at the dispenser 12 to fill up an empty bin 28, if available, with the recipe in the dispensing instruction 332. Thus, the operation of the dispenser, loading/removing bins 28, pushing buttons, observing light flashing modes, loading empty hoppers 40, monitoring temperature, etc. would all be handled locally by dispenser controller 17.

Figure 30:
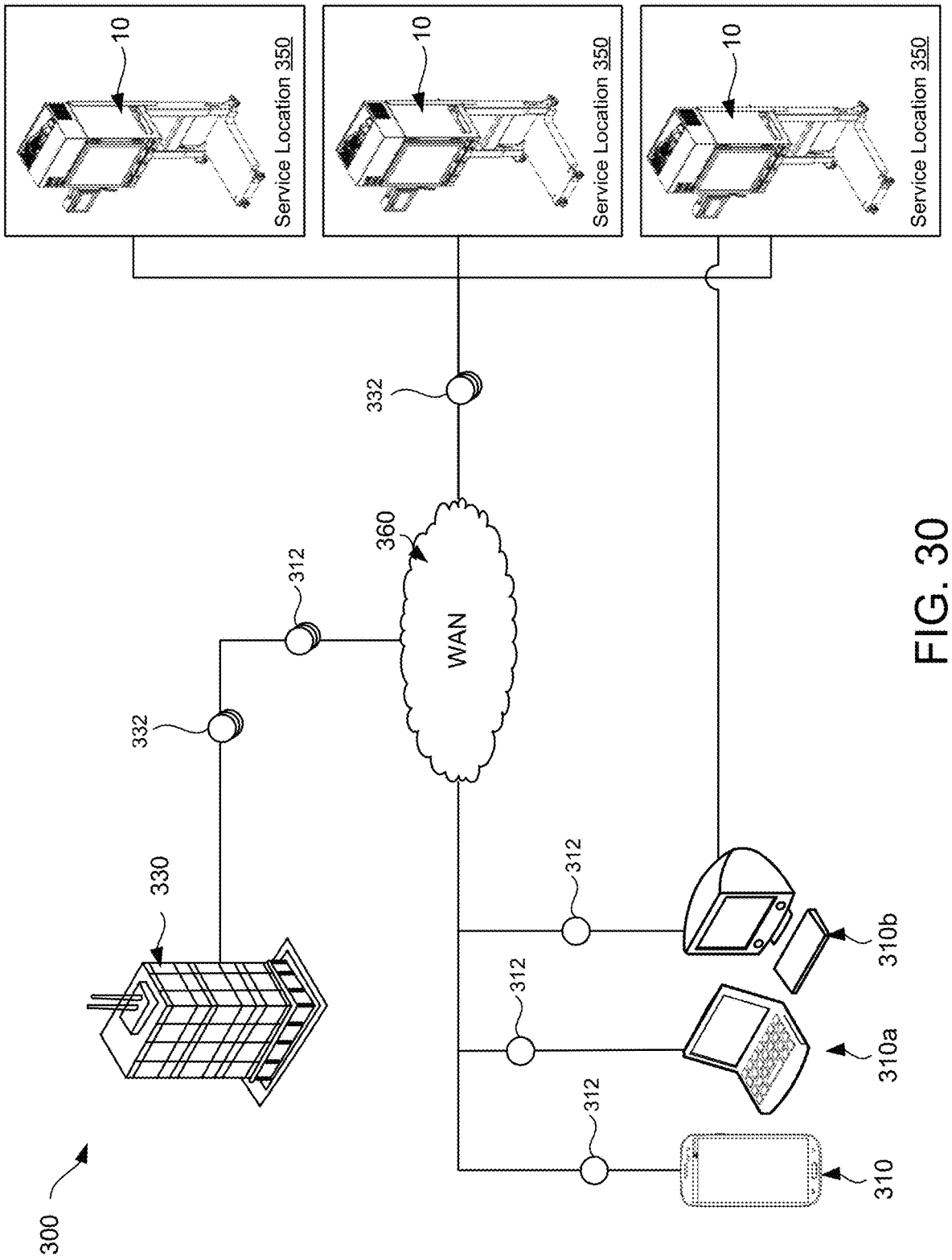
FIGS. 30-32 are schematic diagrams of a dispensing environment including the dispensing system of the present disclosure.

As shown in FIGS. 30 and 31, the system 10 may be incorporated in a dispensing environment 300, where one or more of the systems 10 are located within a service location 350, and the dispenser 12 of the system 10 is connected to a centralized control center 330 and/or one or more user devices 310 via a network 360. The system controller 16 may be stored in the network 360 or at the control center 330 and communicate with the dispenser controller 17 at the service locations 350 and/or the user devices 310. For example, the network 360 may provide an application programming interface (API) that enables communication between the system controller 16, dispenser controller 17 at the service location 350 and/or user devices 310. In other words, the system API may provide an interface for transferring information (such as customer orders, recipes, dispensing instructions, order statuses, etc.) between the service locations 350, control center 330, and/or the user devices 310. The API may also allow for centralized tracking of data throughout the production process. For example, the interface may better track frequency of product orders, product dispensing accuracy, production time, and other production factors for a control center facing interface and also provide tracking or status updates for user or customer-facing interfaces.

As described below, customer orders 312 are received by the environment 300 via the user devices 310-310b. The user devices 310-310b may include personal electronic devices controlled by the user, such a mobile phone 310 or personal computer 310b. User devices 310 may also be implemented as customer portals 310b within the service location 350. For instance, each service location 350 may include a portal 310b where users can create orders 312 at the service location 350.

Figure 32:
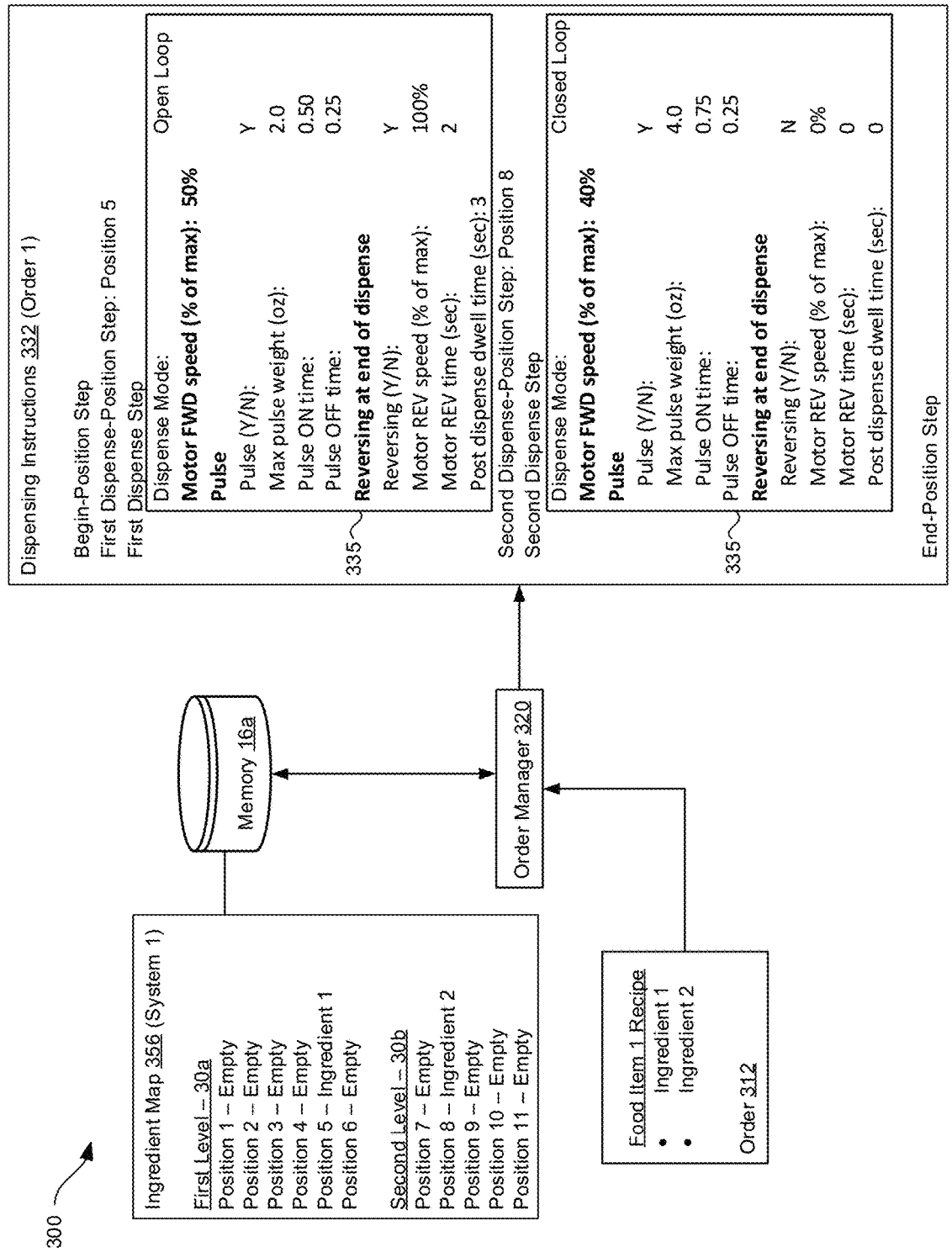

As shown in FIG. 32, individual ones of the orders 312 are then processed by an order manager 320 of the system controller 16 to generate dispensing instructions 332 based on dispensing preferences and locations of the ingredients. The dispensing instructions 332 are queued in the memory hardware 16a of the system controller 16. The dispensing instructions 332 are then communicated to and executed by the dispenser controller 17 to dispense ingredients from the containers 26a, 26b to the bins 28.

In use, customer orders 312 are placed by users via the one or more user devices 310-310b. The user devices 310-310b may include personal computers, tablets, mobile phones, or any other device capable of providing a user interface and communicating with the dispensing environment 300. Accordingly, the user device 310-310b may include a user interface, memory hardware, and data processing hardware for receiving inputs from a user. Additionally or alternatively, customer orders 312 may be generated by the control center 330 based on an order schedule or an order algorithm. For instance, the control center 330 may push orders to the system controller 16 based on a learned order history for a particular service location 350. For example, where a particular service location 350 consistently experiences increased demand for walk-in orders for a particular food item (e.g., pepperoni pizza) during a particular period (e.g., Thursday evenings), the control center 330 may preemptively generate orders 312 for the particular food item during the particular period. The schedule may be fixed (e.g., based on order histories over a fixed period of time) or dynamic (e.g., adjusted in real-time to accommodate environmental factors such as weather or events). In some instances, a demand prediction algorithm may be implemented to generate order schedules for a particular location.

Each order 312 may include a recipe for each of one or more food items, such as a pizza or sandwich. Accordingly, a single order 312 may include multiple recipes each corresponding to a respective food item of the order 312. Each recipe may identify one or more optional ingredients to be included on the respective food item. For the sake of explanation, the current example will be based on a food order 312 having a single food item with a first ingredient and a second ingredient. The recipes may be stored at the system controller 16 (i.e., not programmed into the dispenser controllers 17 of the individual service locations) and communicated to the dispenser controller via the network 360 when the recipe is included in an order 312. Thus, the recipes may be managed and located remote from the service location 350, such as at the control center 330, to assist in product consistency between service locations 350.

The order 312 is received by the order manager 320 of the system controller 16 at the control center 330 and/or the service location 350. Here, the order manager 320 generates dispensing instructions 332 corresponding with the food order 312. For instance, in the current example the dispensing instructions 332 will include dispensing position steps 334a for moving the bins 28 and dispense steps 334b for dispensing the first ingredient and the second ingredient into the bin 28.

The dispensing instructions 332 generated by the system controller 16 may not be released to the dispenser controller 17 until an input or signal is received from the service location 350. For example, the system controller 16 may not release the dispensing instructions 332 for an order 312 to the dispenser controller 17 until an empty bin 28 is placed in the conveyor 24 and/or a user indicates, such as at the touchscreen 23 or the instrument panel 25, that the service location 350 should proceed with preparing the order 312. In that instance, after the system controller 16 receives the signal, the system controller will release the dispensing instructions 332 to the dispenser controller 17. Optionally, the system controller 16 and dispenser controller 17 may communicate and/or require user input throughout a dispensing or food production process, such as to track the food order for a customer-facing or control center facing interface. For example, in implementations where the system controller 16 is hosted at the control center 330, the dispenser controller 17 may communicate with the system controller 16 regarding the ingredient map 356, dispensing instructions 332, and calibration profiles 335.

In generating the dispensing instructions 332, the system controller 16 may query an ingredient map 356 for the respective dispenser 12 to which the dispensing instructions 332 will be assigned. As discussed above, each of the upper containers 26a is received in a docking station 114 aligned with a respective chute 112 and each of the lower containers 26b is received in a docking station 114 aligned with a position between adjacent chutes 112. The respective positions of each of the containers 26a, 26b may correspond with a numbered position along either the upper rack 32a or the lower rack 32b. For example, the positions along the upper rack 32a are numbered between one and six and the positions along the lower rack 32b are numbered between seven and eleven.

As shown in FIG. 32, the ingredient map 356 identifies a rack position for each ingredient in the system 10. For instance, the ingredient map 356 may assign the first ingredient to a first container 26a in the fifth position on the first level 30a and the second ingredient to a second container 26b in an eighth position on the second level 30b. Accordingly, the dispensing instructions 332 will include the positioning steps 334a for positioning the bin 28 beneath the rack position corresponding to each of the first ingredient and the second ingredient, and dispense steps 334b for actuating the drive 36 associated with the respective position to dispense the first ingredient and the second ingredient from the respective containers 26a, 26b.

The dispense steps 334b for actuating the drive 36 may include dispensing periods and dispensing rates for activing the drives 36. For example, it may be predetermined that a first volume of the first ingredient is dispensed when the drive 36 is activated for a first period and at a first rotational speed, while a second volume of the second ingredient is dispensed when the drive 36 is activated for a second period at a second rotational speed. Modes of determining dispensing volumes are discussed in greater detail below.

Optionally, the dispense steps 334b may be dependent on an ingredient calibration profile 335 that sets out specific parameters for a particular ingredient to be dispensed. These parameters may include a dispensing mode (discussed below), a dispensing period, and/or a dispensing rate for the ingredient based on the type of ingredient and a desired volume of the ingredient. In some examples, each dispense step 334b may further include a reversing period following the dispensing period. In the reversing period, the auger 44 may be operated in a reverse direction for a period of time in order to back ingredients away from the outlet 58 after dispensing. The reversing period ensures that ingredients do not inadvertently fall from the container 26a, 26b after the dispensing period.

In some examples, the system controller 16 may include a plurality of source-specific ingredient calibration profiles 335 for each ingredient type. For example, green peppers may be sourced from different suppliers and/or regions, and green peppers received from a first supplier and/or region may have different ingredient characteristics (e.g., size, weight) than green peppers received from a second supplier and/or region. Accordingly, suitable dispensing parameters for green peppers from the first supplier may be different from the dispensing parameters for the green peppers from the second supplier to ensure consistent dispensing amounts (i.e., weights, volumes) for all ingredients across all ingredient sources. Calibration profiles 335 may be generated at the control center 330 and downloaded to the system controller 16 for incorporation into dispensing instructions 332, or may be generated directly at the service locations 350.

As shown in FIG. 31, the system controller 16 may store a plurality of the calibration profiles 335 for each ingredient type. When an order is placed, the system controller 16 generates the dispensing instructions 332 (FIG. 32) for the order using one of the calibration profiles 335 for each of the ingredient types included in the recipe. For instance, where the recipe includes green peppers, the system controller 16 selects a calibration profile 335 for green peppers associated with the specific source (i.e., supplier) of the green peppers. Thus, a calibration profile 335 corresponding to green peppers from a supplier in California may be selected by the system controller 16 for generating the dispensing instructions 332 associated with the supplier. The ingredient source may be manually entered into the system controller 16 by a system operator when an ingredient is added to one of the containers 26a, 26b. Alternatively, the ingredient source may be automatically entered into the system controller 16 by scanning an identification code associated with ingredient source (e.g., a barcode on an ingredient package) when the ingredient is added to one of the containers.

Depending on the ingredient source entered into the system controller 16, the system controller 16 will select the calibration profile 335 and dispensing parameters for the particular ingredient. In instances where a calibration profile 335 does not exist for a particular ingredient source, the system controller 16 may select a predetermined default calibration profile 335 for an ingredient and/or may provide a notification to the system operator and/or the control center 330 indicating that a calibration profile 335 needs to be generated and/or assigned for the ingredient source.

The use of calibration profiles 335 advantageously improves ingredient dispensing consistency across different sources of ingredients. Ultimately, the improved consistency may be relied upon in optimizing dispensing parameters, which improves dispensing efficiency and reduces waste. Additionally, calibration profiles 335 allow unlimited adjustment of ingredient amounts within recipes. For example, manual methods of ingredient dispensing may utilize manual measurement of ingredients using predetermined scoop sizes. The number of different scoop sizes used within a store may be limited in favor of minimizing inventory and recipe complexity. However, by using the current system 10 in connection with the calibration profiles 335, any amount of an ingredient may be selected for a recipe.

At the service location 350, the system 10 may initially be provided with one or more of the containers 26a, 26b each including a single ingredient. A user may provide the larger first containers 26a with ingredients that are more commonly dispensed. In some examples, more than one of the containers 26a, 26b may include the same ingredient. For instance, two of the containers may include Italian sausage or other popular ingredients. As discussed above, the containers 26a, 26b may be installed within the cabinet 22 by placing the back legs 84a (closer to the outlet 58) within the first end 100 of one of the channels 98. Using the handle 82b, the container 26a, 26b is then pushed rearward so that the legs 84a at the rear of the hopper 40 slide along the channel 98 towards the second end 102 at the rear of each channel 98. The legs 84a at the rear of the hopper 40 then drop into or rest in or over the cavities 95 and are retained via the retaining ramps 93. Similarly, when the rear legs 84a drop into or rest in or over the cavities 95 toward the second end 102 of the channel 98, the front legs 84b drop into or rest in or over the cavities 95 toward the first end 100 of the channel 98 and are retained by corresponding retaining ramps 93 to secure a fore-aft position of the container 26a, 26b. The flex tabs 97 at the first end 100 of the channels 98 are depressed downward as the containers 26a, 26b are installed into the channels 98 and spring or bias into place in front of the containers 26a, 26b once fully positioned in the channel 98 to prevent the containers 26a, 26b from pulling out of position. To remove the containers 26a, 26b, a user may press down on the flex tabs 97 to release the containers 26a, 26b. As the container 26a, 26b is slid rearward, the gear 76 at the first end 66 of the auger 44 engages the coupler 46 so that the auger 44 can be rotated by the drive 36.

Figure 24:
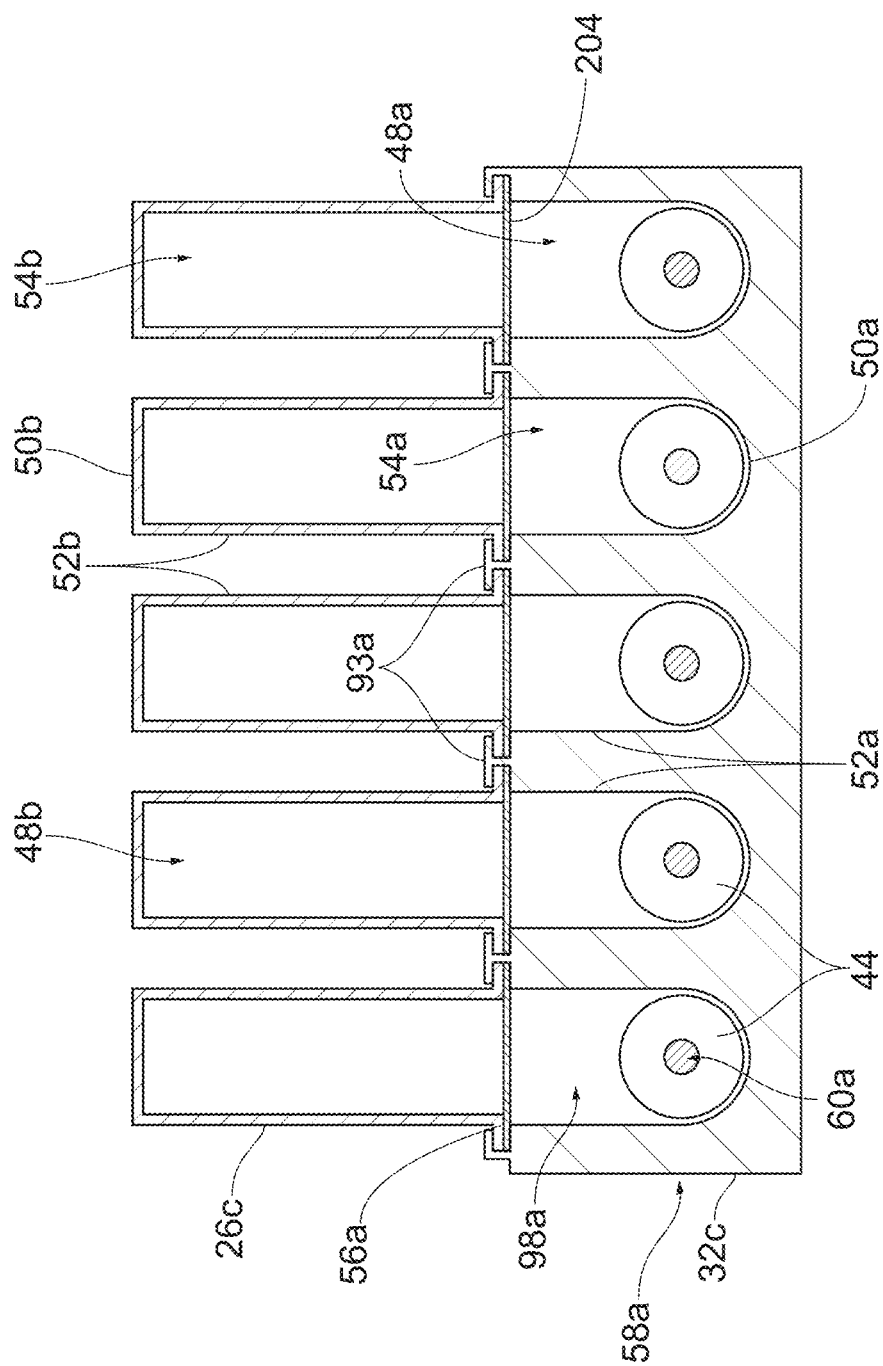
FIG. 24 is a cross-sectional view of a rack with disposable containers installed at the rack.
Figure 25:
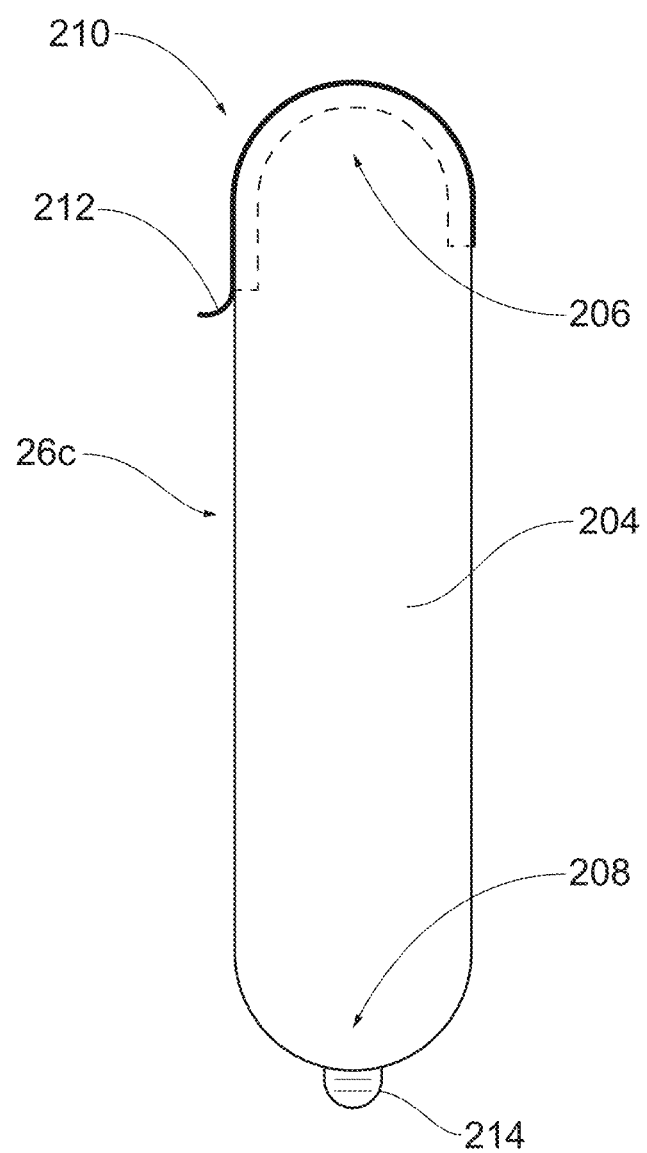
FIG. 25 is a top plan view of a removable lid of a disposable container of FIG. 24.

Optionally, and such as shown in FIGS. 24 and 25, the cabinet 22 may include a rack 32c for receiving a plurality of refillable or disposable containers 26c, where the rack 32c provides a series of channels 98a for receiving and supporting the containers 26c. The rack 32c is configured to mate with the plurality of disposable containers 26c such that, when the containers 26c are installed at the rack 32c, the inner chambers 48b of the containers 26c are in fluid communication with the channels 98a such that ingredients are contained between the rack 32c and the containers 26c. Thus, the channels 98a of the rack 32c form an arcuate base 50a, side walls 52a, and end walls 54a of an inner chamber 48a of the rack that, in cooperation with the inner chamber 48b of the container 26c, hold the ingredients within the cabinet 22. The channels 98a of the rack 32c form the outlet 58a and socket 60a configured to rotatably receive opposite ends of the auger 44 so that, when a container 26c is installed at the rack 32c and ingredients are disposed in the channel 98a, the ingredients may be dispensed out of the outlet 58a via rotation of the auger 44 in a similar manner as described above. Thus, when installed within the cabinet 22, the rack 32c receives the auger 44 through the outlet 58a and along the channels 98a and the auger 44a is not within any portion of the containers 26c. As discussed below, this allows for easier installation and replacement of containers 26c as the auger 44 and rack 32c may remain in place as an empty container 26c is removed and refilled or replaced.

The rack 32c includes a series of retaining rails 93a along an upper edge of each of the side walls 52a. The rails 93a are configured to receive corresponding flanges or lips 56a of the containers 26c to help, when the containers 26c are installed at the rack 32c, maintain the connection between the rack 32c and the container 26c. The rails 93a may be configured, such as via a gasket, to seal containers 26c to the rack 32c such as to prevent leaking at a seam between the containers 26c and the rack 32c. Optionally, the sealing feature may be provided by the container 26c, such as via a gasket along the lip 56a of the container 26c.

The containers 26c configured to mate with the rack 32c include the inner chamber 48b formed from a base 50b, a pair of sidewalls 52b extending from opposite sides of the base 50b, and a pair of end walls 54b extending from opposite ends of the base 50b between the sidewalls 52b. An edge of the sidewalls 52b and the end walls 54b forms the lip 56a and defines an opening to the containers 26c. When installed at the rack 32c, the inner chambers 48b of the containers 26c are in fluid communication with the inner chambers 48a of the rack 32c and cooperate to contain the ingredients therein.

Prior to being installed at the rack 32c, the containers 26c may be sealed, such as via a removable cover 204, to maintain the freshness of ingredients contained within the container 26c while stored (such as in the cooler 15) and prior to being installed at the rack 32c for subsequent dispensing. The removable cover 204 is configured to seal the container 26c while the container 26c is stored and remains attached at the container 26c even when initially mated with the rack 32c. As shown in the illustrated example, the container 26c is installed at the rack 32c upside down (i.e., with the opening to the inner chamber 48b facing down over the opening to the inner chamber 48a of the rack 32c). To prevent ingredients from spilling and/or fluids from leaking prior to the container 26c being fully installed and/or sealed at the rack 32c, the removable cover 204 is not fully removed until the container 26c is fully installed at the rack 32c. To install the container 26c at the rack 32c, the lip 56a of the container 26c is received along rails 93a of the rack 32c on opposing sides of a respective channel 98a and the container 26c is slid along the upper edge of the channel 98a until the end wall 54b of the container 26c is substantially aligned with the end wall 54a of the rack 32c. Optionally, the rack 32c may include a rear flange or rail to provide a stopper and/or rear sealing element between the upper edge of the channel 98a and the container 26c at the end wall 54b. Once the container 26c is fully installed over the channel 98a, the removable cover 204 may be fully removed from the container 26c to bring the container 26c into fluid communication with the rack 32c and allow the ingredients within the container 26c to fall into the channel 98a. To assist in removing the removable cover 204 from the container 26c, the removable cover 204 may include a tear line or removable portion 210 at a first end 206 of the top at an end of the container 26c configured to be inserted first into the rails 93a of the rack 32c. Prior to installing the container 26c at the rack 32c, a user may remove the removable portion 210 to partially unseal or loosen the removable cover 204 from the container 26c. Optionally, the removable portion 210 includes a flap or grasping portion 212 for a user to grasp when removing the removable portion 210. Even with the removable portion 210 removed, ingredients and fluids should still be prevented from spilling from the container 26c, but detaching the removable portion 210 makes subsequent full removal of the removable cover 204 from the container 26c easier. The removable cover may include a pull tab 214 at a second end 208 of the top 204 opposite the first end. Once the container 26c is fully installed at the rack 32c, a user may fully remove the removable cover 204 from the container 26c by pulling on the pull tab 214 to slidably remove the removable top 204 from the container 26c. Optionally, the removable top 204 may be integrated into the rack 32c or any other suitable configuration may be implemented to prevent spilling and leaking of ingredients and fluids from the container 26c prior to the container 26c being fully installed at the rack 32c.

In addition to providing the containers 26a, 26b, 26c to the cabinet 22, the user provides one or more of the empty bins 28 to respective ones of the staging stations 144. As discussed above, the bins 28 are positioned between adjacent ones of the guide rails 146 to maintain a lateral position of each bin 28 within the staging region 130. Fore-aft position of the bins 28 is maintained by aligning the magnet 142 of the first support 182a (FIG. 29) with the catch or magnet 142 of the support bed 138 (FIG. 10). Once an empty bin 28 is properly positioned within the staging station 144, the system may automatically sense presence of an empty bin and send a station-ready notification 352 to the dispenser controller 17 that an empty bin 28 is available within the staging station 144.

The dispenser controller 17 receives the station-ready notification 352 and executes a set of the dispensing instructions 332 corresponding to a food item of one of the customer orders 312 for filling the bin 28 with the ingredients. The dispensing instructions 332 are generated by the system controller 16 based on a recipe associated with one of the food items of the customer order 312. For example, where the customer selects a pizza with the first ingredient and the second ingredient, the dispensing instructions 332 will include steps for dispensing the first ingredient and the second ingredient. As discussed above, the dispensing instructions 332 include positioning steps 334a associated with movements of the bin 28, and dispensing steps 334b associated with actuating respective ones of the drives 36 to dispense ingredients from the containers.

As shown in FIG. 32, and illustrated in FIGS. 10-12, the positioning steps 334a include a begin-position step 334a instructing the positioning system 134 to move one of the bins 28 from the staging station 144 at the front of the conveyor 24 to the main track 160 in the dispensing region 132 (FIGS. 10 and 11). Here, the first support 182a of the bin 28 travels to the main track 160a along one of the connecting tracks 160b aligned with the staging station 144 of the bin 28. The dispenser controller 17 then executes one or more position steps 334a instructing the positioning system 134 to move the bin 28 laterally along the main track 160a to position the bin 28 beneath one of the outlets 58 or chutes 112 associated with the ingredients of the particular recipe, as shown in FIG. 12. For example, in a first position step 334a, the bin 28 is positioned beneath a first container 26a, 26b including the first ingredient. As previously discussed, the system controller 16 and/or the dispenser controller 17 may query an ingredient map 356 to determine the dispense positions of the bin 28. After each position step 334a, the dispenser controller 17 executes a dispense step 334b instructing the drive 36 associated with the dispense position to activate, thereby rotating the auger 44 of the respective container 26a, 26b to eject the ingredient from the outlet 58 of the container 26a, 26b.

Figure 33:
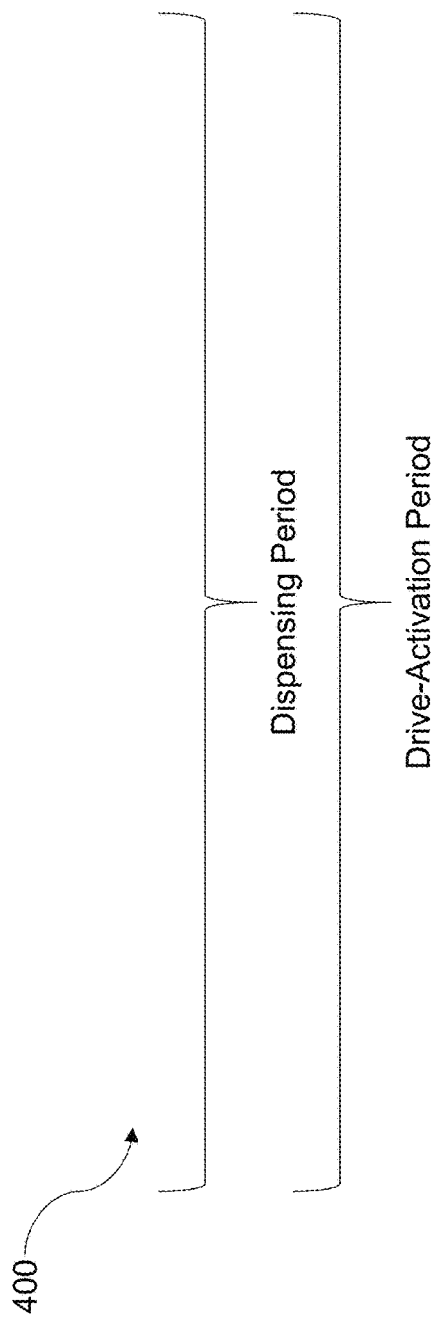
FIGS. 33-36 are schematic views showing different modes of operating a dispenser according to the principles of the present disclosure.

The dispensing system 10 may be configured as an open-loop system or as a closed-loop system 10. In one mode 400 of operation, illustrated in FIG. 33, the dispensing system 10 may be configured as an open-loop system where the dispense steps 334b include activating the drive 36 for a fixed drive-activation period and at a first dispensing rate based on an estimated dispensing volume of the ingredient associated with the fixed drive-activation period and the first dispensing rate. The estimated dispensing volume may be approximated based on previous measurements associated with the fixed drive-activation period, the first dispensing rate, and the respective ingredient. For example, tests may be run to determine an approximate or average amount of Italian sausage that is dispensed when the drive 36 is activated for a first dispensing period at a first dispensing rate. Thus, in this example, a drive-activation period is the same as the dispensing period.

Figure 34:
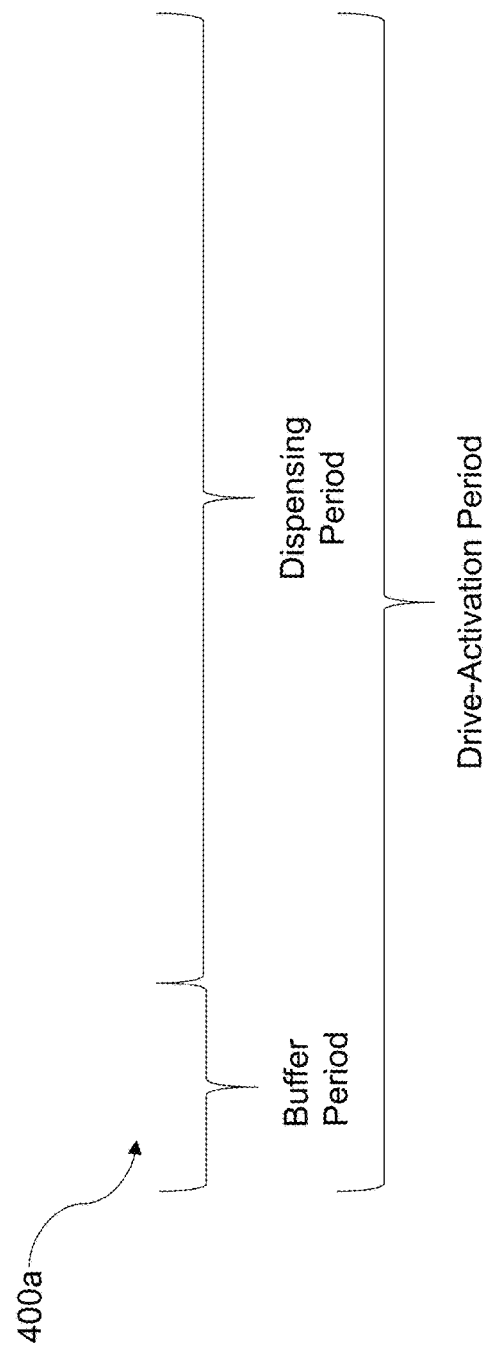

In another mode 400a, illustrated in FIG. 34, the dispensing system is configured as a partially-closed-loop system.

While the previous open-loop example is suitable, in some instances it may result in less consistent dispensing of ingredients where ingredients are not initially dispensed from the outlet when the drive is activated. For instance, there may be a buffer period between the time the auger 44 begins rotation and the time the ingredients are initially ejected from the outlet 58. Accordingly, in the second implementation, the drive 36 is initially activated to rotate the auger 44, but the dispensing period does not begin elapsing until the area sensor 164 detects the first piece of ingredient passing through the dispenser opening 162. Here, the area sensor 164 transmits a notification signal 354 back to the dispenser controller 17 to begin the dispensing period. Accordingly, unlike the previous example where the dispensing period is the same as the drive-activation period, in the second example the drive-activation period may also include an initial buffer period preceding the dispensing period, where no ingredients are dispensed.

Figure 35:
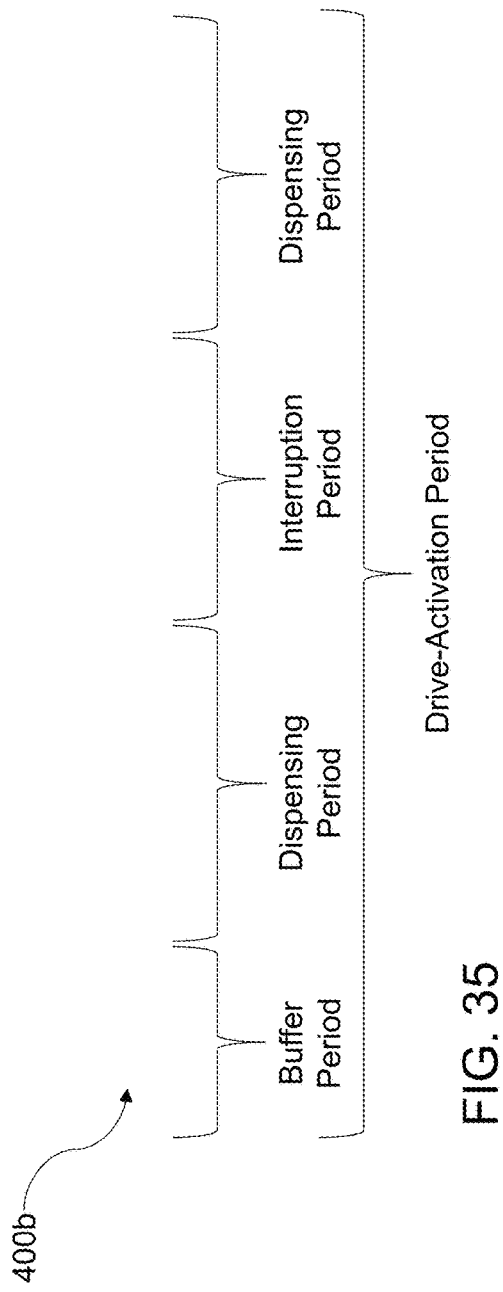

In another mode 400b, illustrated in FIG. 35, the system 10 is configured as a fully closed-loop system. While the previous example provides more accurate dispensing by measuring the dispensing period from the point in time when the area sensor 164 indicates a first piece of ingredient passes through dispenser opening 162, the accuracy of the dispensed volume may vary where there are interruptions in the flow of the ingredient from the outlet 58. For instance, where pieces of the ingredient are incrementally dispensed, there may be interruption periods between the dispensing of a first portion of the ingredients and a second portion of the ingredients. In the third mode, these interruption periods are accounted for by the area sensor 164 and the dispenser controller 17. For example, as provided above, the dispensing period is started when the area sensor 164 senses the first piece of the ingredient. However, unlike the previous example where the dispensing period elapses continuously from the time when the area sensor 164 is initially tripped, in this example the dispensing period elapses only while the ingredients are passing through the area sensors 164. For example, a first portion of the dispensing period may elapse as a first portion of the ingredients falls through the area sensor. If the flow of the ingredients is interrupted prior to the completion of the dispensing period, then the dispenser controller 17 instructs the drive 36 to continue rotating and pauses the dispensing period until a second portion of the ingredients falls through the dispenser opening 162. Here, drive 36 continues operating until the dispensing period has fully lapsed. Accordingly, the drive-activation period of the third example includes the buffer period and the dispensing period, where the dispensing period may be interrupted by one or more interruption periods.

In some examples, the interruption periods are directly associated with a period when the area sensor 164 is not tripped. However, in other examples the dispensing period is only interrupted when the area sensor 164 remains untripped for a threshold period of time. For example, where a threshold interruption period is set at 0.5 seconds, the dispensing period may continue running for any interruptions that last less than 0.5 seconds.

Figure 36:
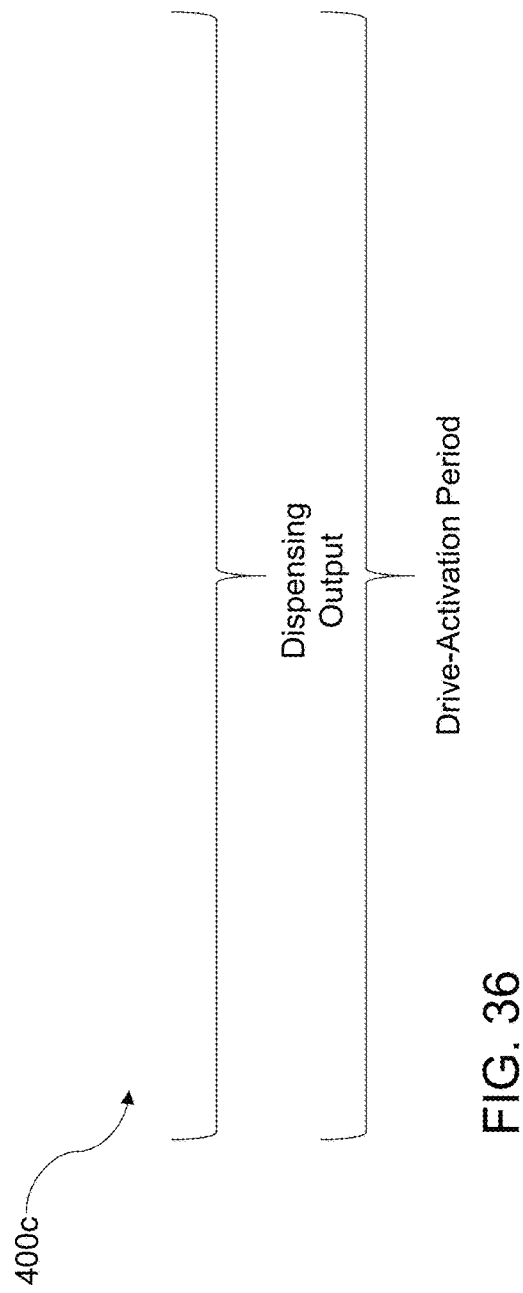

In yet another mode 400c, shown in FIG. 36, the system 10 may be configured as a closed-loop system that has a variable dispensing period dependent upon a measured dispensing output, such as a dispensing rate, dispensed volume, or dispensed weight. For example, a dispensing rate is measured by the area sensor 164 based on a number of beams of the sensor array 166 that are broken for a period of time. A greater number of sensor beams being broken indicates that a greater volume of an ingredient is passing through the area sensor 164 and the dispenser opening 162 at any given time. Thus, where the area sensor 164 indicates that the ingredients are passing through the dispenser opening 162 at a greater rate, the dispenser controller 17 may reduce the dispensing period, and vice versa.

The system may determine or calculate or estimate the volume or weight of a dispensed ingredient as measured by the area sensor 164 differently based on the type of ingredient that is being dispensed. Different types of ingredients may be dispensed using a specified dispensing technique configured to dispense a more accurate measure of that particular ingredient type. For example, the system may utilize a linear dispensing technique (such as for sliced peppers) that provides a direct correlation between the time beams of the sensor array 166 are broken and the weight of the topping dispensed. The system may utilize a spherical dispensing technique (such as for sausage or beef) where pulses from the sensor 164 are interpreted as diameters of spheres passing by the area sensor 164. The total volume of spheres dropped may be calculated and a weight may be determined based on the density of the ingredient. Optionally, the system may track the weight of the ingredients dispensed by assigning each sensed ingredient as having the same weight regardless of the time a beam is broken or how many beams are broken when the ingredient is sensed. Furthermore, the area sensor 164 may be used to perform size filtering, where a beam of the sensor array 166 being tripped for a given period of time correlates to a size category of the ingredient. For example, a 5 millisecond trip of the beam may be associated with a small mushroom and that subcategory (i.e., small) may be assigned a weight for tracking.

The system may include a microcontroller, such as at the dispenser controller 17, that collects and tracks data for dispensing of individual ingredients or categories of ingredients and that adjusts dispensing times based on the collected data. For example, the microcontroller may store the dispensing periods for the ingredients and generate and update best fit curves for the dispensing periods and subsequently dispense ingredients according to the best fit curves. For example, a best fit curve may indicate an average or median time for dispensing a particular ingredient to achieve a desired dispensed volume or weight. While monitoring the ingredient passing through the area sensor 164, the system may, for example, slow down the rate of dispensing the ingredient as it approaches its average or median time to more precisely dispense the target weight or volume.

In other examples, the variable dispensing period may be directly related to a measured weight or volume of the dispensed ingredient. Here, the dispensed weight or volume may be directly measured using one or more weight sensors implemented in the conveyor 24 or the bins 28. When weight sensors are implemented into the conveyor 24, the weight sensors may be configured to measure a weight within the dispensing region 132. As such, bins 28 can be loaded and removed from the staging region 130 while bins 28 within the dispensing region 132 are being filled and measured. Additionally, weight sensors in the dispensing region 132 may be used to calibrate the dispensing techniques that use the area sensor 164. Thus, the weight of the dispensed ingredient measured using the weight sensor may be compared to the weight of the dispensed ingredient estimated using the area sensor 164.

The use of a variable dispensing period may be implemented in any of the preceding examples in place of the fixed dispensing period. For example, the dispenser controller 17 may utilize a continuous dispensing period, a buffered dispensing period, or an interrupted dispensing period that is fixed (estimated dispensing rate) or variable (measured dispensing rate).

In either of the closed-loop modes 400b, 400c, the system 10 may also be configured to operate in a pulsing mode during the dispensing period. Here, the drive 36 is pulsed during the dispensing period to incrementally dispense the ingredient from the hopper 40. This pulsed or incremental operation allows for further refinement of dispensing resolution by allowing the ingredients from a first pulse period to be dispensed and measured prior to initiating a second pulse period. This mode is particularly beneficial for dispensing ingredient from the containers 26a in the upper level 30a of the cabinet 22, as the delay or lag between the time the ingredient is ejected from the outlet 58 to the time the ingredient passes through the dispenser opening 162 and/or is received within the bin 28 can be accounted for by allowing the system 10 to measure the dispensed ingredients incrementally.

In the present example, the instructions 332 may include a first position step 334a for moving the bin 28 to a first position on the main track 160a associated with the first ingredient, a first dispense step 334b for dispensing the first ingredient, a second dispense-position step 334a for moving the bin 28 to a second position on the main track 160b associated with the second ingredient, and a second dispense step 334b for dispensing the second ingredient. After execution of the position steps 334a and the dispense steps 334b, the dispenser controller 17 instructs the positioning system 134 to return the bin 28 to the staging station 144 in an end-position step 334a. Here, the bin 28 is moved from the main track 160a back to the starting staging station 144 along the connecting track 160b aligned with the staging station 144.

Upon return to the staging station, the sensor magnet 188 of the bin 28 trips a position sensor within the staging station 144 to indicate the dispensing instructions 332 have been executed and the bin 28 is ready for retrieval from the staging region 130. To disengage from the bin 28, the positioning system 134 executes a "wiping" step, where the carriage 170 is moved in the lateral direction beneath the support bed 138. As the carriage 170 moves laterally, one of the bumpers 184 of the bin 28 contacts an adjacent one of the guide rails 146 on the top of the conveyor 24 to obstruct lateral movement of the bin 28.

Accordingly, the carriage 170 moves away from the obstructed bin 28 to disengage the magnets 142 of the carriage 170 from the magnets 142 of in the second support 182b of the bin 28. With the carriage 170 disengaged from the bin 28, the bin 28 can be removed from the staging region 130.

A number of implementations have been described. Nevertheless, it will be understood that various modifications may be made without departing from the spirit and scope of the disclosure. Accordingly, other implementations are within the scope of the following claims.

The invention claimed is:

1. A system for dispensing ingredients, the system comprising:
   a cabinet that is refrigerated via a cooling system;
   a conveyor disposed beneath the cabinet and including a dispensing region in communication with an interior of the cabinet through a dispenser opening, the conveyor being at ambient atmosphere, wherein the cabinet is insulated from the conveyor by an air curtain formed across the dispenser opening by the cooling system;
   a plurality of containers removably disposed within the cabinet, each of the containers having an outlet disposed above the dispenser opening and including an ejector operable to dispense an ingredient through the outlet; and
   one or more bins removably received within the conveyor, the bins operable to be moved by the conveyor between a first position corresponding to a first one of the containers in the dispensing region and a second position corresponding to a second one of the containers in the dispensing region.

2. The system of claim 1, wherein the ejector of each container is powered by a respective drive.

3. The system of claim 2, wherein the cabinet includes a plurality of the drives, each of the drives configured to selectively engage a respective one of the ejectors.

4. The system of claim 1, wherein the conveyor includes a positioning system operable to move the one or more bins between the first position and the second position.

5. The system of claim 4, wherein the conveyor includes a support bed having a support surface, the one or more bins slidable upon the support surface and the positioning system disposed on an opposite side of the support bed from the support surface.

6. The system of claim 5, wherein each of one or more bins includes a first magnet and the positioning system includes a carriage having a second magnet, the second magnet configured to engage the first magnet through the support bed.

7. The system of claim 4, wherein the conveyor further includes a staging region disposed adjacent to the dispensing region and accessible from an exterior of the conveyor, and wherein the positioning system is operable to move the one or more bins between the first and second positions in the dispensing region and a third position in the staging region remote from the first and second positions.

8. The system of claim 1, further comprising an ingredient sensor attached to one of the cabinet and the conveyor and operable to sense passage of at least one of the ingredients from at least one of the containers to the dispensing region.

9. A system for dispensing ingredients, the system comprising:
   a cabinet including a first level having a plurality of first containers and a second level having a plurality of second containers, each of the plurality of containers having an ingredient;
   a conveyor disposed beneath the cabinet and including a dispensing region in communication with an interior of the cabinet through a dispenser opening;
   a plurality of ejectors, each of the plurality of ejectors in communication with one of the plurality of containers and operable to dispense the respective ingredient of the container through the dispenser opening to the dispensing region of the conveyor;
   a chute panel disposed within the cabinet, the chute panel including a plurality of chutes each configured to guide the ingredient dispensed from a respective one of the plurality of containers to the dispenser opening; and
   a bin removably received within the conveyor, the bin operable to be moved by the conveyor between a first position corresponding to a first one of the containers in the dispensing region and a second position corresponding to a second one of the containers in the dispensing region.

10. The system of claim 9, wherein the plurality of first containers are disposed above and staggered with respect to the plurality of second containers.

11. The system of claim 9, wherein the cabinet includes a rack configured to removably receive the plurality of containers.

12. The system of claim 11, wherein the rack includes a plurality of channels extending from a first end to a second end, each of the plurality of containers slidably received at least one of the channels.

13. The system of claim 9, wherein the cabinet includes a plurality of drives, and each drive of the plurality of drives is configured to selectively engage one of the plurality of ejectors to power the respective ejector.

14. The system of claim 9, wherein the conveyor includes a positioning system operable to move the bin between the first position and the second position.

15. The system of claim 14, wherein the conveyor further includes a staging region disposed adjacent to the dispensing region and accessible from an exterior of the conveyor, and wherein the positioning system is operable to move the one or more bins between the first and second positions in the dispensing region and a third position in the staging region remote from the first and second positions.

16. The system of claim 9, further comprising an ingredient sensor attached to one of the cabinet and the conveyor and operable to sense passage of at least one of the ingredients from at least one of the containers to the dispensing region.

\* \* \* \* \*